(12) United States Patent
McKeever

(10) Patent No.: US 11,017,602 B2
(45) Date of Patent: May 25, 2021

(54) SYSTEMS AND METHODS FOR UNIVERSAL AUGMENTED REALITY ARCHITECTURE AND DEVELOPMENT

(71) Applicant: Robert E. McKeever, Trenton, NJ (US)

(72) Inventor: Robert E. McKeever, Trenton, NJ (US)

( * ) Notice: Subject to any disclaimer, the term of this patent is extended or adjusted under 35 U.S.C. 154(b) by 0 days.

(21) Appl. No.: 16/512,985

(22) Filed: Jul. 16, 2019

(65) Prior Publication Data

US 2021/0019944 A1 Jan. 21, 2021

(51) Int. Cl.
  *G06T 19/00* (2011.01)
(52) U.S. Cl.
  CPC ........ *G06T 19/006* (2013.01); *G06T 2200/24* (2013.01)
(58) Field of Classification Search
  CPC combination set(s) only.
  See application file for complete search history.

(56) References Cited

U.S. PATENT DOCUMENTS

| 9,064,326 B1* | 6/2015 | Loxam | G06K 9/00671 |
| 2014/0253743 A1* | 9/2014 | Loxam | G06T 11/60 |
| | | | 348/207.1 |
| 2016/0098860 A1* | 4/2016 | Basra | G06F 3/011 |
| | | | 345/633 |
| 2016/0133230 A1* | 5/2016 | Daniels | G06F 3/147 |
| | | | 345/633 |
| 2018/0130259 A1* | 5/2018 | Leefsma | G06Q 10/101 |
| 2018/0276899 A1* | 9/2018 | Liao | G06K 9/00671 |
| 2019/0129715 A1* | 5/2019 | Ding | G06T 19/006 |

* cited by examiner

*Primary Examiner* — Motilewa Good Johnson
(74) *Attorney, Agent, or Firm* — Wolf, Greenfield & Sacks, P.C.

(57) ABSTRACT

Provided are various systems and methods that establish a self-service AR generation and publication platform. The platform is configured to allow novice users to build AR experiences for rendering to other users. The platform encodes the AR experiences under a universal data format that decouples generation functions from later visualization responsive to a recognizable visual trigger. Access to the file triggers request, retrieval, rendering and display of the user defined AR Media and associated options set for that specific AR Experience. Also provided is a AR universal browser which public and private users can execute to view, share, load, and experience user generated AR Media (e.g., generated on the platform). The browser can provide the connections, logic and security needed to initialize and load the specific aggregation of data for the AR experience.

20 Claims, 53 Drawing Sheets

FIG. 11A

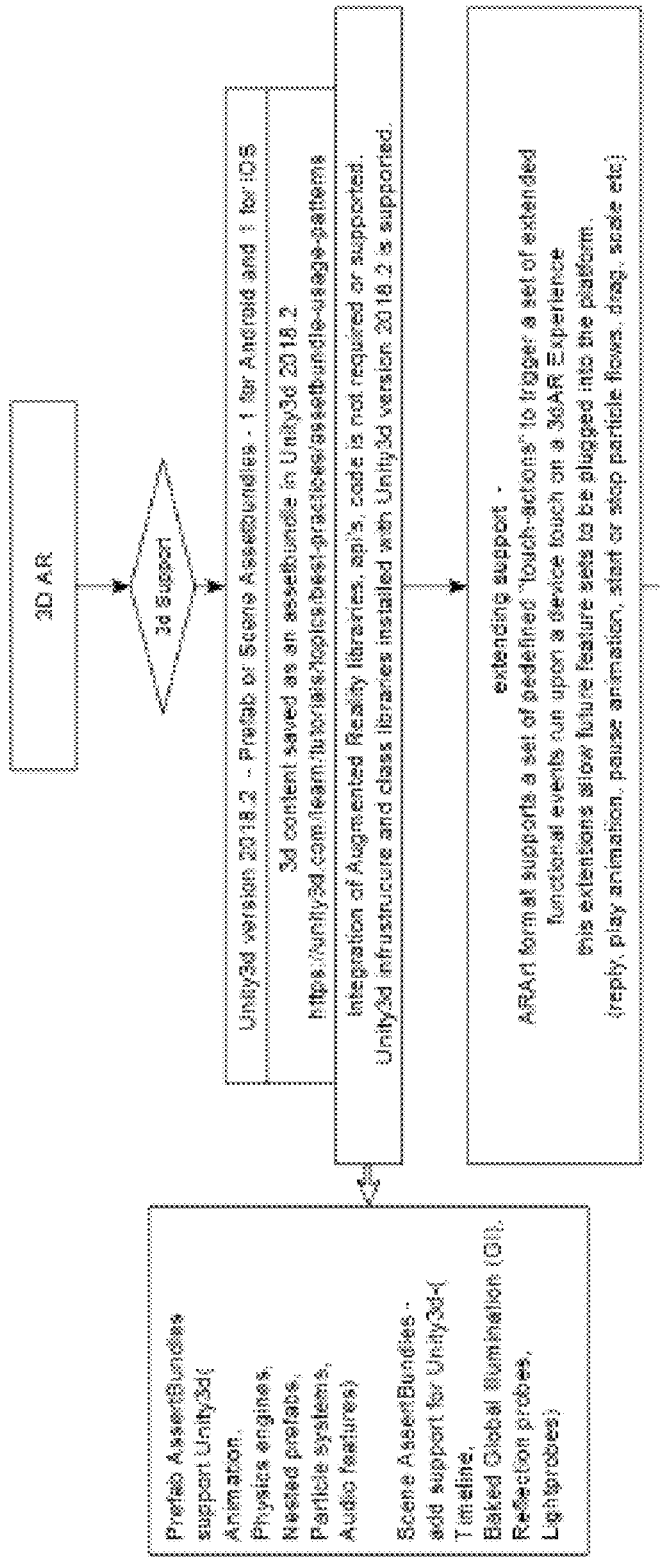

demo ARCloud Settings

- ARCloud Profile
- Membership
- View All ARClouds

ARCloud Billing

- Subscription
- Payment Method
- Invoices

Send Invitation

E-Mail Address

SEND INVITATION

ARCloud Members (3)

| Name | Role |
|---|---|
| ARArtisan | Member |
| Robert McKeever | Member |
| You | Owner |

Video AR — AR Cloud Scan

Video AR – Cloud Scan Display – UI Mute

Video AR – Cloud Scan Display – UI Flip on

AR Cloud Scan Target Image

3D AR Display AR Cloud Scan (Default Parallel to target)

3D AR Display AR Cloud Scan "FLIP" on (Perpendicular to target)

SYSTEMS AND METHODS FOR UNIVERSAL AUGMENTED REALITY ARCHITECTURE AND DEVELOPMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A number of conventional systems exist for developing augmented reality ("AR") content. Although tools and development environments exist for creation, distribution and consumption of the such content, the ability to generate such AR content often requires extensive experience and programming knowledge. Further, the ability to updates and/or re-use AR content is quite limited. In addition, the various platforms and systems that exist for developing AR content each have proprietary features that further limits development of AR to those having knowledge and experience in each respective platform. This can result in further challenges when considering hardware/software updates that occur regularly.

SUMMARY

The inventors have realized that AR content creation and consumption has traditionally been limited to a one off or custom project basis. Even minor changes in the AR environment or minor changes in an AR viewer's hardware can require complete re-development an AR project. Further the ability to re-use the original development efforts, even for minor changes has been limited or even non-existent. In some examples, conventional development is often abandoned rather than updating applications or content to work with new devices, viewers, etc.

Stated broadly various aspects of the disclosure are directed to an AR content generation system and content publication platform. According to various embodiments, the system leverages a content generation architecture and a content browser/query engine that facilitates universal encoding of AR functions and features, and in further embodiments allows for even novice users to define and publish AR experience that establish a content target (e.g., an image) for recognition and AR content (e.g., interactive 360 degree visualizations) that can be triggered on recognition of the content target. Additionally, system enables end users to find and re-use developed AR functions, completed executables, etc. Various embodiments solve issues with some known conventional AR systems and improve the ability of even novice user to design, generate, and distribute AR enabled content.

In further embodiments, users can interact with an AR publication platform. For example, the platform (which can be a component or form an entire AR content generation system) invokes a proprietary AR content management format and scalable cloud infrastructure to support AR generation. In further example, the platform is architected to support generation of AR content by users having no coding knowledge. According to various embodiments, the defines AR data files according to a universal format, that enables any AR enabled application to identify the resources needed to stream or render AR content. In further embodiments, the system pre-programs/encodes AR functions, so that end user can simply identify a content target (e.g. an image for subsequent image recognition) and AR content or functionality they wish to integrate. For example, the system presents user interfaces to the end user in which they identify an image and AR media (e.g., 360 degree visualizations), and the system builds the AR data file and functions needed for later image recognition mapping to the AR media and rendering/interactions with the same.

According to some embodiments, the system can be configured to identify existing code modules (e.g., AR functions or AR media) based on functionality associated with the module, execution environment, location identifiers, location commonality, etc. Once identified the system enables selection, re-use, modification, and updating through sequences of user interfaces that reduce the complexity of coding or building AR content to simple selections of options displayed in the user interface.

In further embodiments, the platform provides (or users can download) a universal execution application configured to execute any AR modules developed on the platform. In yet other embodiments, the universal execution application allows users to access and/or integrate prior modules or other AR formats, for example, using a browser to search and identify modules with common functionality.

Various embodiments provide universal functionality with respect to imaged based AR (extending the value of a still image); a proprietary AR content management format that enables universal use and reuse; scalable AR Cloud infrastructure for media delivery (e.g., transcoding and/or rendering); a SaaS subscription model for AR deployment; branding and call to action options; ability to update AR content instantly; and simplified development for users (e.g., supported by automatic coding selections, automatic definitions, and architecture, among other options) that enables even novice users to create AR content (e.g., including AR video integrated content) on a mobile device and go live with an executing application in under a minute. In further embodiments, the system enables even novice users to create AR content for target images, that can be published publicly or shared privately (e.g., with friend(s)).

According to one aspect, an augmented reality generation and publication system, the AR system is provided. The system comprises at least one processor operatively connected to a memory, a generation component, executed by the at least one processor, configured to present at least a minimal set of selectable options for creating an AR experience, wherein a first option of the minimal set defines a content target (e.g., an image for recognition and trigger), a second option of the minimal set specifies AR content to associate with the content target, a third option of the minimal set defines access restrictions for the AR experience wherein the generation component is further configured to generate a universal format data file having a plurality of data structures for recording definitions for each selection of the minimal set of selectable options that are associated with pre-generated executable logic for each option and respective AR content, an integration component, executed by the at least one processor, configured to define and manage mappings between the pre-generated executable logic for each option, the plurality of the data structures in the universal format data file, and transcoded AR content (e.g., video file, transparent video file, 3D video file, etc.), wherein the generation component defines a system signature for the content target (e.g., image) for subsequent matching to a device generated signature of the content target, and wherein the system is configured to communicate the associated universal format data file responsive to a match between the system signature and the device signature of the content target to retrieve the AR content for rendering on the device.

According to one embodiment, a browser component configured to access AR experiences stored on the system. According to one embodiment, the browser component is configured to access analytic information to sort and display a subset of highly rated by access AR experiences. According to one embodiment, the generation component is configured to access defined AR content for direct rendering on a user device without image recognition. According to one embodiment, the generation component is configured to link a newly captured image on the device to the AR content being directly rendered; and store the newly captured image and AR content as a new AR experience. According to one embodiment, the system is configured to accept access control restrictions in response to publication of the new AR experience. According to one embodiment, the system further comprises an access control component configured to define a storage container (e.g., cloud) for the user created AR experience; and define user access to the storage container. According to one embodiment, the access control component is further configured to control functions executable on the AR experiences within the storage container based on a user role. According to one embodiment, the access control component defines a plurality of user roles including at least one of: audience role where members can access an AR experience that a cloud owner or a member has published; creator role assign to content creator users automatically, and where members can create, edit, or publish an AR experience; publisher role where members can publish content live for public or private use; or owner role where members can invite others, assign roles, create additional data storage repositories (e.g., clouds) and manage subscription and billing. According to one embodiment, the system further comprises a publication component configured to manage a status of the AR experience, wherein the status specifies a first access restriction for other users. According to one embodiment, the system further comprises a publication component configured to define public or private access to the AR experience. According to one embodiment, the publication component is configured to select content containers and/or user groups for access to the AR experience.

According to one aspect, a computer implemented method for augmented reality generation and publication is provided. The method comprises operatively connected to a memory, presenting, by at least one processor, at least a minimal set of selectable options for creating an AR experience, wherein a first option of the minimal set defines a content target (e.g., an image for recognition and trigger), a second option of the minimal set specifies AR content to associate with the content target, and a third option of the minimal set defines access restrictions for the AR experience, generating, by at least one processor, a universal format data file having a plurality of data structures for recording definitions for each selection of the minimal set of selectable options that are associated with pre-generated executable logic for each option and respective AR content, defining, by at least one processor, mappings between the pre-generated executable logic for each option, the plurality of the data structures in the universal format data file, and transcoded AR content (e.g., video file, transparent video file, 3D video file, etc.), defining, by at least one processor, a system signature for the content target (e.g., image) for subsequent matching to a device generated signature of the content target, and communicating, by at least one processor, the associated universal format data file responsive to a match between the system signature and the device signature of the content target to retrieve the AR content for rendering on a device.

According to one embodiment, the system further comprises accessing AR experiences stored on the system. According to one embodiment, the system further comprises accessing analytic information to sort and display a subset of highly rated AR experiences. According to one embodiment, the system further comprises accessing defined AR content for direct rendering on a user device without image recognition. According to one embodiment, the system further comprises linking a newly captured image on the device to the AR content being directly rendered and storing the newly captured image and AR content as a new AR experience. According to one embodiment, the system further comprises accepting access control restrictions in response to publication of the new AR experience. According to one embodiment, the system further comprises defining a storage container (e.g., cloud) for the user created AR experience, and defining user access to the storage container. According to one embodiment, the access control component is further configured to control functions executable on the AR experiences within the storage container based on a user role. According to one embodiment, the system further comprises defining a plurality of user roles including at least one of: audience role where members can access an AR experience that a cloud owner or a member has published; creator role assign to content creator users automatically, and where members can create, edit, or publish an AR experience; publisher role where members can publish content live for public or private use; or owner role where members can invite others, assign roles, create additional data storage repositories (e.g., clouds) and manage subscription and billing. According to one embodiment, the system further comprises managing a status of the AR experience, wherein the status specifies a first access restriction for other users. According to one embodiment, the system further comprises defining a public or private access to the AR experience. According to one embodiment, the system further comprises selecting content containers and/or user groups for access to the AR experience.

According to one aspect, an AR experience system is provided. The system comprises at least one processor operatively connected to a memory, a browser component, executed by the at least one processor, configured to receive an AR experience data file matching a recognized content target (e.g., image), request the AR experience defined in the data file and render the communicated AR content according to default settings defined in the data file, and enable content re-orientation responsive to user selection in an user interface.

According to one embodiment, the browser component is configured to present AR experience navigation options to a user device. According to one embodiment, the browser component includes a downloadable application executable on a respective user device. According to one embodiment, the application is configure to have a plurality of execution modes including at least one of: scan mode for image recognition of content targets; camera mode for executing a last viewed AR Experience and enabling the user to create a new content target from a new image capture by their device; showcase mode for accessing and displaying a feed of publicly accessible or permissioned AR Experiences and upon selection loads the AR format into an active AR program slot (e.g., for use in the camera mode); or communicator mode for directly loading and rendering AR Experiences (e.g., from their clouds or clouds which they have been invited to). According to one embodiment, the browser component is configured to execution image recognition functions to match a visualized object on a camera of the device to a content target of an AR experience. According to one embodiment, the browser component is configured to request an AR data file associated with the AR experience from an AR system. According to one embodiment, the browser component is configured to parse the returned data file, and initiate one or more calls for media streams defined in the data file, and renders the media streams and optionally the content target within a three dimensional display on the users device. According to one embodiment, the browser component is configured to recognize content targets visualized by the device's camera; request a data file associates with an AR experience; and render an AR indicator in the display for user selection. According to one embodiment, the browser component is configured to display the AR experience responsive to selection of the AR indicator.

According to one aspect, an AR experience system is provided. The system comprises at least one processor operatively connected to a memory, a browser component, executed by the at least one processor, configured to generate a signature on a plurality of objects visualized by a device, communicate the signatures to an AR system, receive an AR experience data file matching a communicated signature, control execution of the AR experience defined in the data file.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objectives, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. Various aspects, embodiments, and implementations discussed herein may include means for performing any of the recited features or functions.

BRIEF DESCRIPTION OF THE FIGURES

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

Figure 11A:
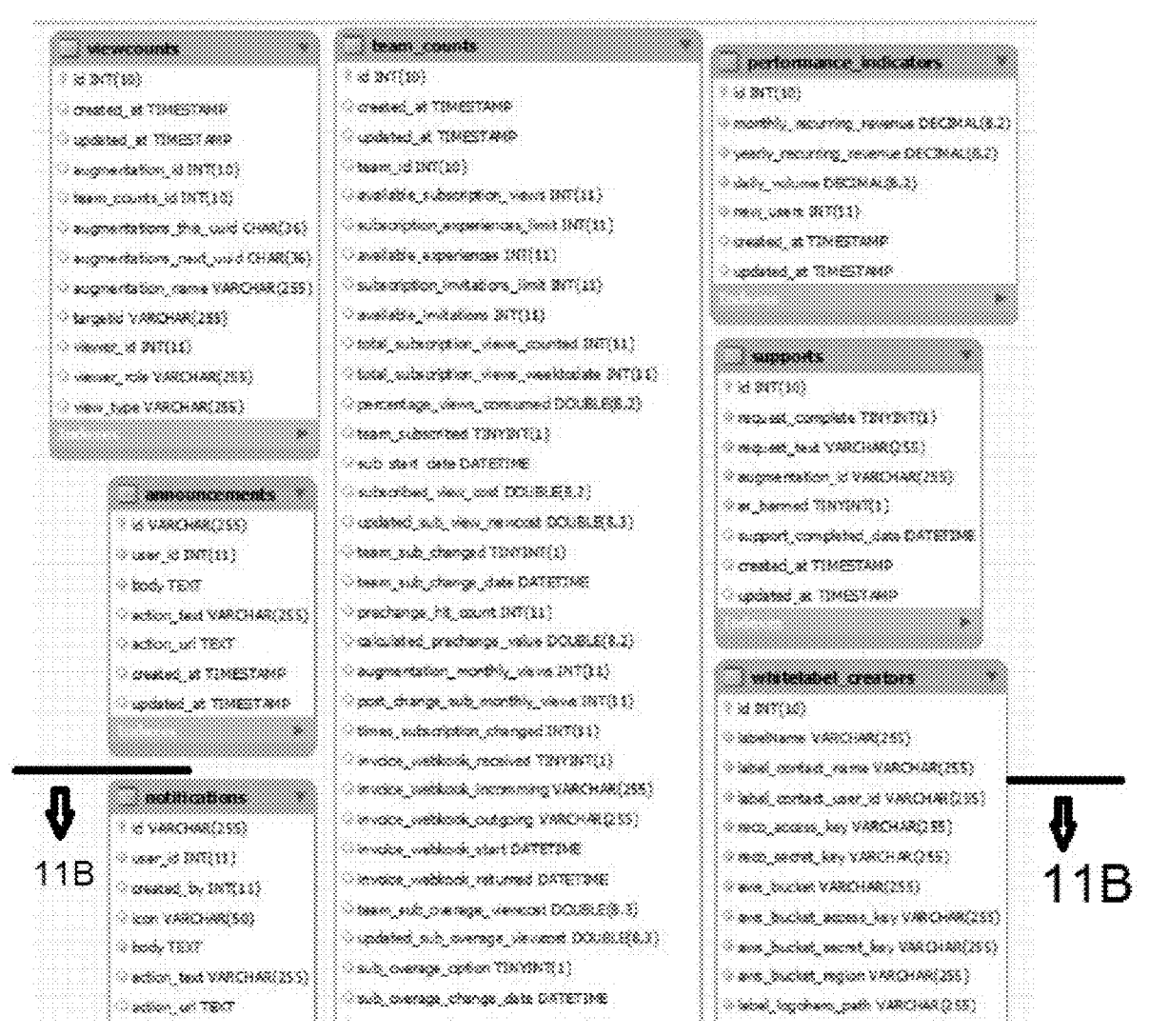

FIGS. 10A-B and 11A-B are example data structures, formats, and data elements, according to some embodiments;

FIGS. 15A-B show an example process for generating AR content based on a 3D AR type, according to one embodiment;

FIGS. 21-22 are example screen captures showing additional administrative options, according to one embodiment;

Figure 26:
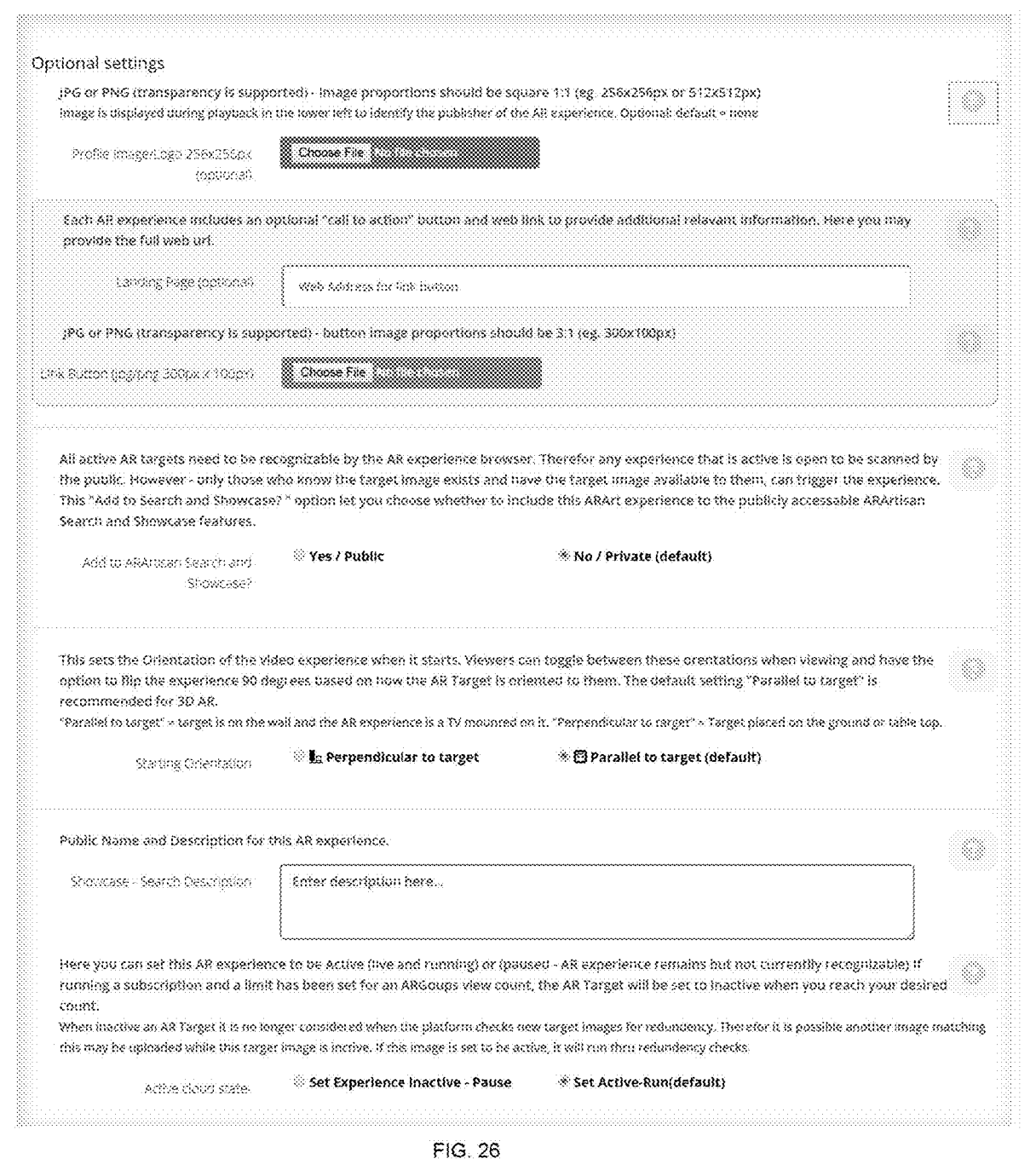

FIGS. 23-26 show screen captures of user interfaces for creating AR experiences, according to one embodiment;

DETAILED DESCRIPTION

Various aspects of the current disclosure describe functionality for a AR developer ecosystem/distribution platform. According to various embodiments, the platform is based on a standardized format which allows users to create public and private AR experiences. For example, the platform connects 2D images to Video or 3D Content with intuitive selections in system generated user interfaces. In various embodiments, the programmatic challenge for building AR is virtually eliminated, and the user requirements can be as little as upload a target image and a video or Unity3d scene via selection in the interface displays to create their own AR experiences.

In further examples, users can publish their AR experiences via the platform's cloud or the platform can make such content/programs publicly available.

According to one embodiment, an AR system hosts the platform, and the system is configured to manage content creation and publication. The content can be generated under a universal format, such that the content created on the system can be re-used by permissioned users, and the content can be updated, without need of re-programming the AR content and/or a respective AR application.

In further embodiments, the AR developer ecosystem/distribution platform can be supported by the AR system. The AR system can be further configured to publish AR content/applications for use, execution, viewing, etc., by other users of the platform (and in further examples, users not registered with the system if unrestricted publication is enabled).

In yet other embodiments, the system can include a browser and/or query engine for accessing created AR content/programs. Users can search through existing AR content on the system (and for example, know they can executed the content developed under the universal format).

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Figure 1:
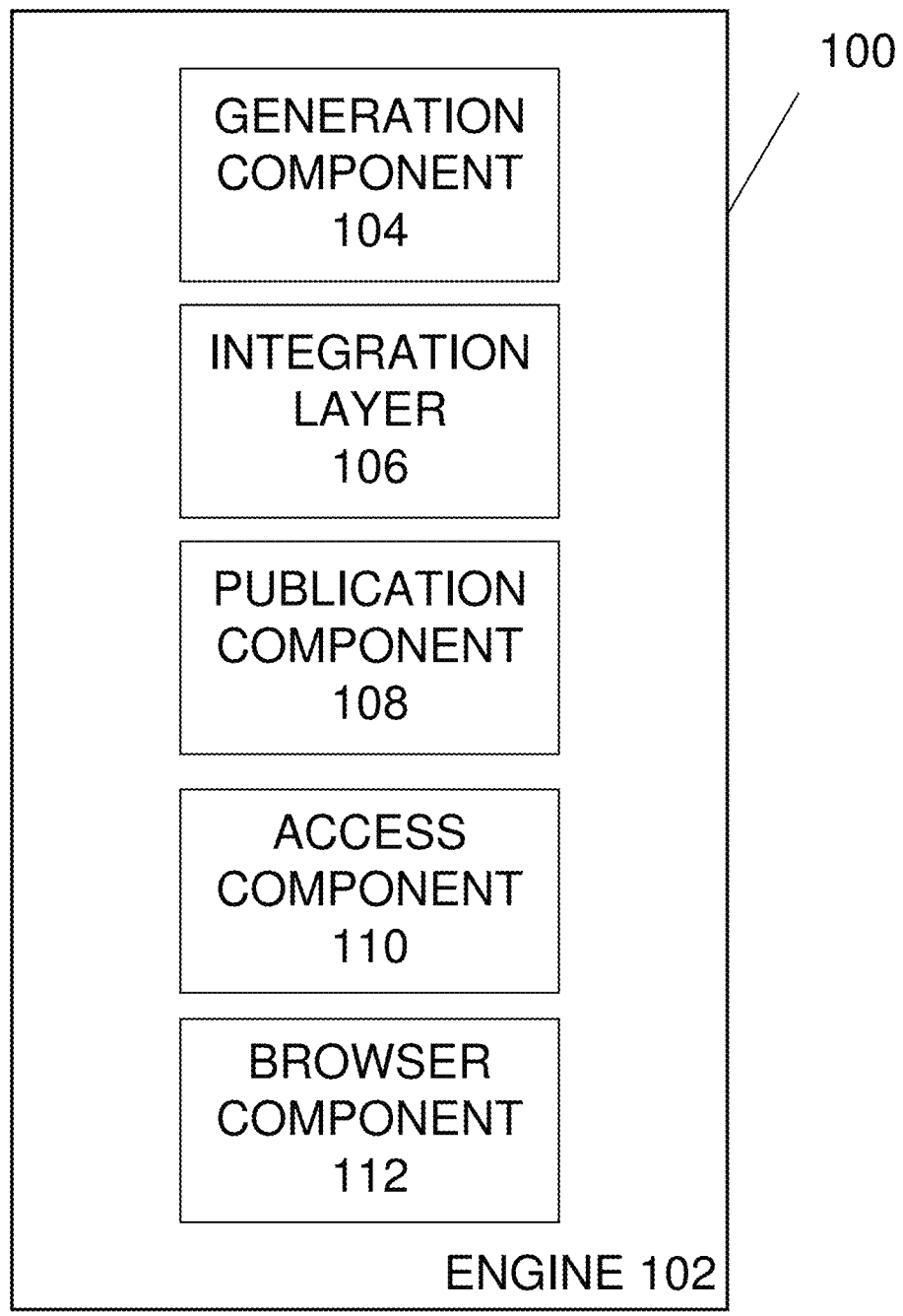
FIG. 1 is block diagram of an example system, according to one embodiment.

FIG. 1 is a block diagram of an example AR system 100. In various embodiments, system 100 can be configured to manage AR content creation, publication, control user access, manage cloud repositories of content, control user access to content, and enable browsing of AR content (e.g., by location, function, execution, operations, among other options). In further embodiments, the system 100 is configured to enable users without programming knowledge to create their own AR experiences and distribute them to any audience. In various embodiments, system 100 can include an AR engine 102 instantiated on a computer system, where the AR engine is configured to execute the operations and/or functions discussed herein. In further embodiments, the system 100 and/or engine 102 can include a plurality of specialized components instantiated by the system and/or engine configured to perform various ones of the functions discussed herein. In some examples, any of the system, engine or components can executed any of the functions discussed.

According to one embodiment, system 100 and/or engine 102 can include a content generation component 104. The content generation component 104 can be configured to enable end users to build custom AR content via selections in user interfaces presented. According to various embodiments, the content generation component is configured to accept user specification of a content target (e.g., 2D image, etc.) and an AR execution (e.g., video, 3D models, 360 degree visualization (e.g., rotatable view), expanding view, transitions into view of exploded components/layers, etc.) to associate with the content target.

According to various examples, simple selections in the user interface trigger the system to automatically associate a content target (e.g., a 2D image) with AR execution/functions (e.g., a flip button configured to (with Toggle) rotate and offset video display to be placed either, flat on the target image or rotated 90 degrees and positioned to the top of the target image (e.g., which allows viewing of both target image and video at the same time)). Other example functions include spin effect integration (e.g., during execution a spin button—(e.g., toggle button) rotates the experience 360 degrees around its center), perspective change of a target visualization, etc.

According to various embodiments, a variety of functions are available on the system for simple selection in a user interface to create AR based functionality associated with a content target. In various examples, the user can upload an image and integrate various features (e.g., video, effects, etc.) into a content target for AR style operation.

In some settings, the content generation component 104 can be connected to an integration layer/application programming interface ("API") layer 106 and/or various APIs to manage integration of AR execution/functions into an executable program or process. For example, the content generation component can be configured to access programmatic skeletons defining rotation functionality for a 2D image, or automatically call a third party service via an API that integrates such functionality with the system supplied content target. In the example of an API call, the system is configured to automatically resolve programmatic requests (e.g., program design sections and/or optimizations) via skeleton program elements or selections and/or universal formatting selections or frameworks that would be requested by the third party service in order to build executable functions, processes, and/or programs. In such a manner, various embodiments of the system eliminate the need for a user to be able to program the respective function and instead the system automatically builds the desired function into an executable operation and visualization that is selectable in a user interface when operating. In some examples, this can include translation of the content target (e.g., 2D image) into a 360 degree visualization, and in other examples can include generation of perspective visualizations of the same to provide a pulled backed visualization of the AR experience (e.g., functionality) and the content target (e.g., 2D image).

According to some embodiments, the content generation component is configured to facilitate creation of a number of different kinds of media content. For example, the system can be configured to guide users through generation of various content types (or AR experiences). For example, the AR experience types enabled by the system include: Video AR (e.g., HD video as MPG4 and QuickTime integrated with a user specific content target) which are transcoded and integrated with, for example, their supplied AR target image as well as any optional experience components; transparent Video AR (e.g., HD video as MPG4 and QuickTime prepared w/mask on the top half of the frame and RGB video on the bottom half); the can also enable Adobe After Effect templates allowing any user prompts to enable import and save as scheme; 3D AR is configured to consume users' Unity3d Prefab or Scene Asset Bundles where Prefab bundles allow Multi object assets with animation, sound and embedded Unity functionality, among other examples.

In further embodiments, the system 100 and/or engine 102 can include a content publication component 108 configured to publish AR content for access or use by any user designated/identified in a publication request by the content generator. In some embodiments, content publication component 108 is configured for at least two publication modes. In a first publication mode content is made available/ executable on the content generator's device (e.g., mobile phone). In this device publication mode, the content generator can test their AR experience on their device before broader publication to a user group or population. Once the user is satisfied, the user can engage the second mode of publication, which is configured to make content available to other users. In other examples, the content generator user can skip testing and published content to user groups, including a user cloud directly.

In some embodiments, an access component 110 is configured to manage user access to various AR experiences generated and/or published on the platform. According to one embodiment, the system 100, engine 102, and/or access component is configured to define logical groupings referred to as "clouds" that specify which users can access AR content included within a respective cloud. Each user can create a variety of clouds and host any or all of their content within their respective clouds. The cloud construct is highly versatile and can be created with a variety of limitations on access (e.g., for a specific user or group of users one AR experience per period of time, 2 or more AR experiences can be accessed per period of time, etc.). In further examples, the system enables the content generator to specify subscription like limitations on a cloud by cloud and/or user by user basis. According to one embodiment, as each user is registered for the platform each user is assigned a private cloud unaccessible by other users. The content generator can create public or limited access clouds in which to make their content accessible.

In further embodiments, the cloud construct is managed by the system and/or access component and enables a cloud owner to invite others to join their cloud and assign roles to the members they invite. According to one embodiment, the roles include audience—members can access an AR experience that the cloud owner or a member has published (e.g., "Pushed to Communicator"); creators—members can access the cloud via the platform./system and create or edit content; publisher—in addition to creator abilities, publisher members can publish content live to the cloud for public or private use as well as publish an experience to members (e.g., push to AR communicator); and owner—can invite others, assign roles, create additional clouds and manage subscription and billing.

According to one embodiment, the system 100 and/or engine 102 can include a browser component 112. The browser component is configured to accept search criteria entered by end users and return AR content results that match user specified criteria. The users can then access the results returned and participate in the AR experience on their own device. Alternatively, the users can access the functions and features of the AR experience and adapt that AR experience into one of their own. According to various embodiments, the system wraps a browser around the content generated on the system (e.g., around a website hosting system generated AR experiences). For example, the browser becomes the vehicle by which AR experiences may be found, and in further example, the vehicle by which user clouds can be navigated to find AR experiences. In some implementations, the browser provides a variety of features to expose AR experiences dynamically. In one example, the browser includes a "most popular" visualization for surfacing the top 40 AR experiences to any user accessing a web-site hosting system generated AR content. In another example, the browser can be configured with a display category for most recently created, etc., and may in other examples, track updates by content generators previously viewed by a respective user.

Various embodiments of an AR creation and publication system can incorporate any one or more of the components discussed above. In other embodiments, the system can include any one or more of the functions discussed and include any combination of those functions. Optionally, the system can include an execution component (not shown) for executing AR experiences on a respective user device. As discussed the system can be configured to allow end users with little or no experience to develop their own AR experience or content in moments, allowing a content creator to go live with new AR content without the hurdles of conventional approaches.

Figure 2A:
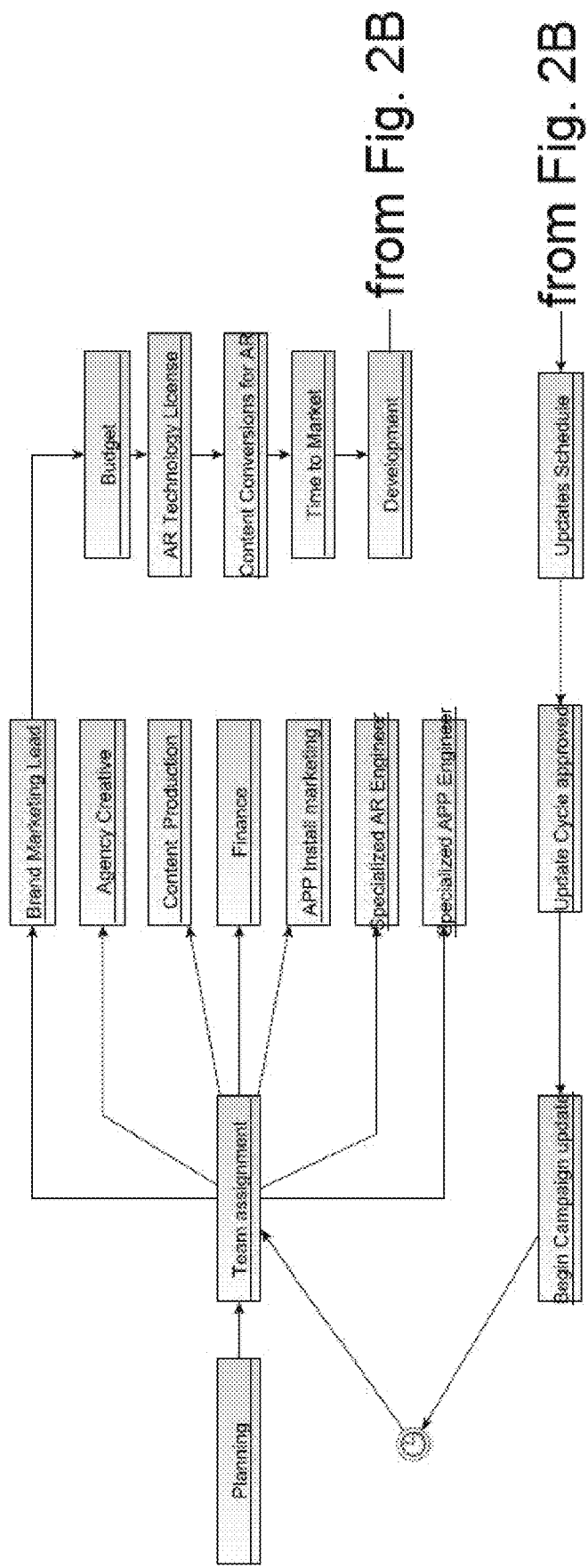
FIGS. 2A-B illustrate AR creation flow under conventional approaches.
Figure 2B:
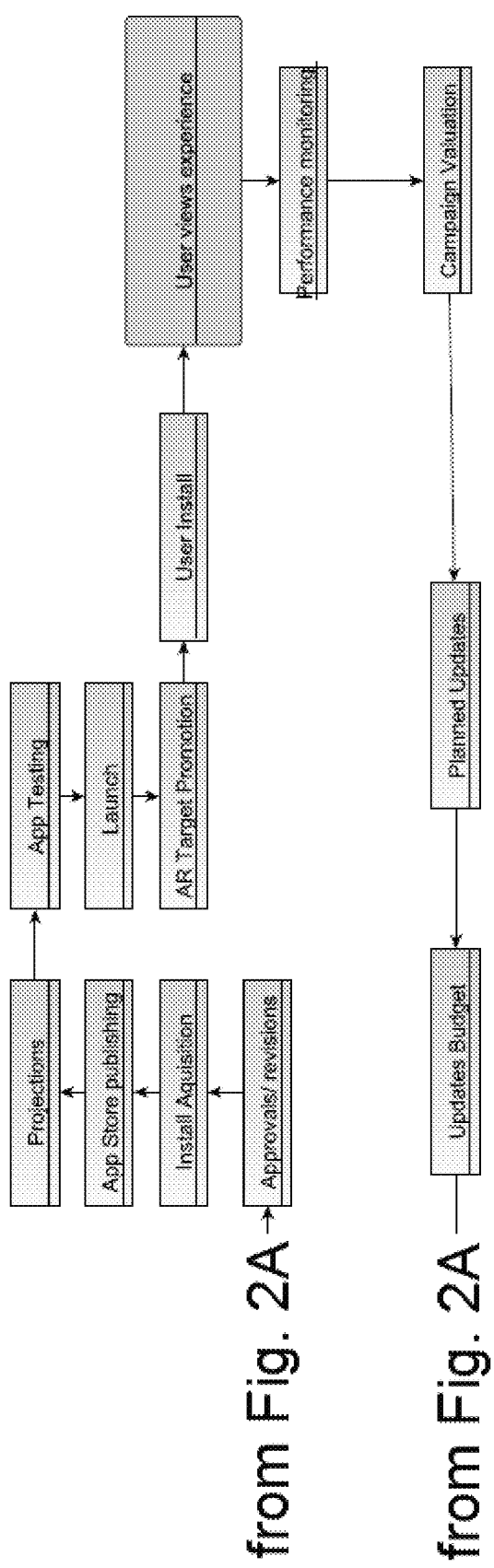

FIG. 2A-B illustrate an AR creation flow under conventional approaches. In such conventional approach the development cycle for AR content typically last 2-3 months and can even exceed that benchmark. As shown the development approach is bogged down, for example, by requiring specialized AR engineers, budgeting, technology licensing, conversions of content for use with AR, among other challenges. The application development phase can also require a significant amount of time, especially where revisions of the content or architecture are required (and need approval). Testing phases can absorb a significant amount of time, before any user can even view an experience.

Accordingly, various embodiments described herein eliminate the programming complexities that plague conventional approaches, using for example, default selections, pre-generated code/functionality, that can incorporate a content target, and integrate user specified video object (e.g., standard video, transparent video (e.g., shown over the content target via display masks, 3D video, interactive functions, etc.) into user specified content targets.

Figure 3A:
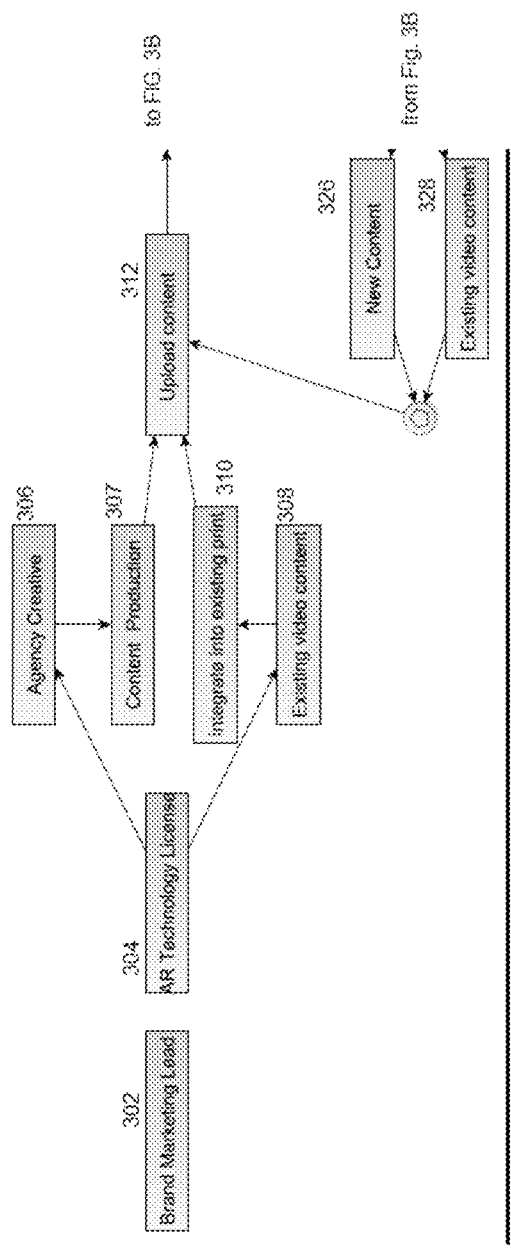
FIGS. 3A-B are an example flow diagram of the new development paradigm enabled by various embodiments.
Figure 3B:
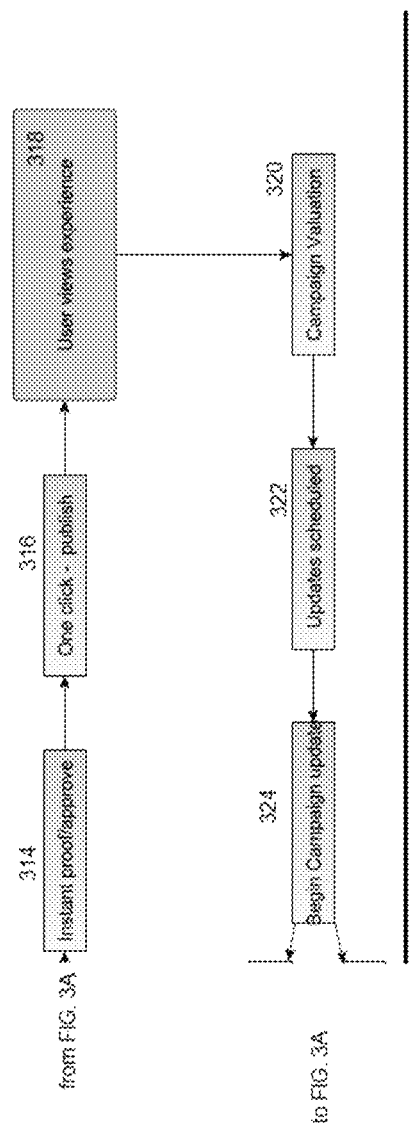

Shown in FIGS. 3A-B, is an example of the new development paradigm enabled by various embodiments of the system. As shown in FIGS. 3A-B augmented reality experiences can be created and published for downstream users in as little as 1 minute. For example, a brand manager or marketing lead 302 can begin the production pipeline by accessing an AR creation and publication system (e.g., 100 of FIG. 1). The AR technology licensing is already in place on the system 304, thus the first step for any system user is developing a creative at 306 (e.g., agency creative—which can be content generated by the user (e.g., produced video, animations, audio, etc.)) and content production at 307. In various examples, such creatives are already in existence for many users. Thus content production is reduced, in such examples, to accessing generated video and/or images to augment (e.g., 308 and 310), and uploading the content at 312.

In various embodiments, the system (e.g., 100 of FIG.) provides user interfaces for integrating/augmenting content with a variety of AR experience types. The AR experiences types that can be integrated include linking content to Video AR (e.g., HD video as MPG4 and QuickTime) which are transcoded and integrated with their supplied AR target (e.g., image) as well as any optional experience components (e.g., call to action images (e.g., executable links to additional material to view, interact, or execute), branding images or description, among other options); transparent Video AR (e.g., HD video as MPG4 and/or QuickTime prepared w/mask on the top half of a visualization frame and RGB video on the bottom half of the frame—for example, this format can be pre-defined (and for example, pre-coded for selection in the UI) on the system and the system incorporates an Adobe After Effect template allowing customer an easy import option (e.g., input and save as scheme in the user interface)) to establish functional AR content; 3D AR that integrates any users' or system AR content bundles (e.g., Unity3d Prefab or Scene Asset Bundles (e.g., user generated AR content on third party systems); and where prefabricated bundles allow multi object assets with animation, sound and embedded functionality (including for example embedded Unity functionality); and wherein the scene asset bundles enable the ability to integrate non-linear animation editor functions (e.g., via third party system (e.g., API to Unity platform and timeline functions) which can include code for pre-generated or realtime mixed lighting environments and/or reflection probes.

Optional experiences can include, for example, touch-actions options (e.g., can be included as plugins—where default touch-action for video is pause and a default touch-action for 3D is null as to accept in further example native Unity touch events). Additional touch actions can be added, for example, starting an AI character's path finder function; adding pinch scaling; adding mixed video and 3d content; extend functionality to 3rd party Unity toolsets and classes, among other options. Various touch-actions plugins could be added for functionality which is not natively supported or extends natively supported functionality (e.g., exceeds unity's native capability or requires specific code libraries or library support to extend Unity's Event System), and can include support to further simplify a user's ability to view or create interactive AR.

At 314, content generators can instantly approve their AR content (and for example enter a local publication mode to their own device for viewing/debugging). In the selection based production line, the code being used and/or the functions being integrated are pre-generated and pre-tested, limited the issues for content generation to look and feel decisions, and further limiting technical implementation issues. At 316, if the content generator approves, a one click publication option is available. In other examples, the content generator can create a local publication to their own device to test for themselves the AR content/experience before publishing to a cloud, user group, etc.

According to various embodiments, once published authorized users (e.g., cloud based, publically available, subscription limited, etc., multiple limitations can apply) can view the experience at 318. Optionally, process 300 may continue with updates to a particular AR experience, content, or even in view of updated hardware/software. According to various embodiments, an AR system and process 300 enables seamless updating of AR content/experiences. For example, executing AR experiences can generate AR content valuation information at 320, for example, for any AR base campaign. Over time, the content creator may also wish to update the AR experience/content (e.g., updates scheduled at 322). The AR content/experience and/or the underlying code for the content can be updated at 324 (even, for example, while older versions are still available for viewing). In various examples, new content (e.g., 326), new or existing video (e.g., 328) can be integrated into the AR experience (e.g., via upload at 312) and the updated experience published via the forgoing steps for further viewing by users. The optional updating steps can be triggered again and again at any subsequent time. In various examples, AR content can be continuously updated via execution of the optional steps and revisiting and revising and/or updating AR content or target images/video is readily done via selection in the system generated user interfaces.

Figure 4:
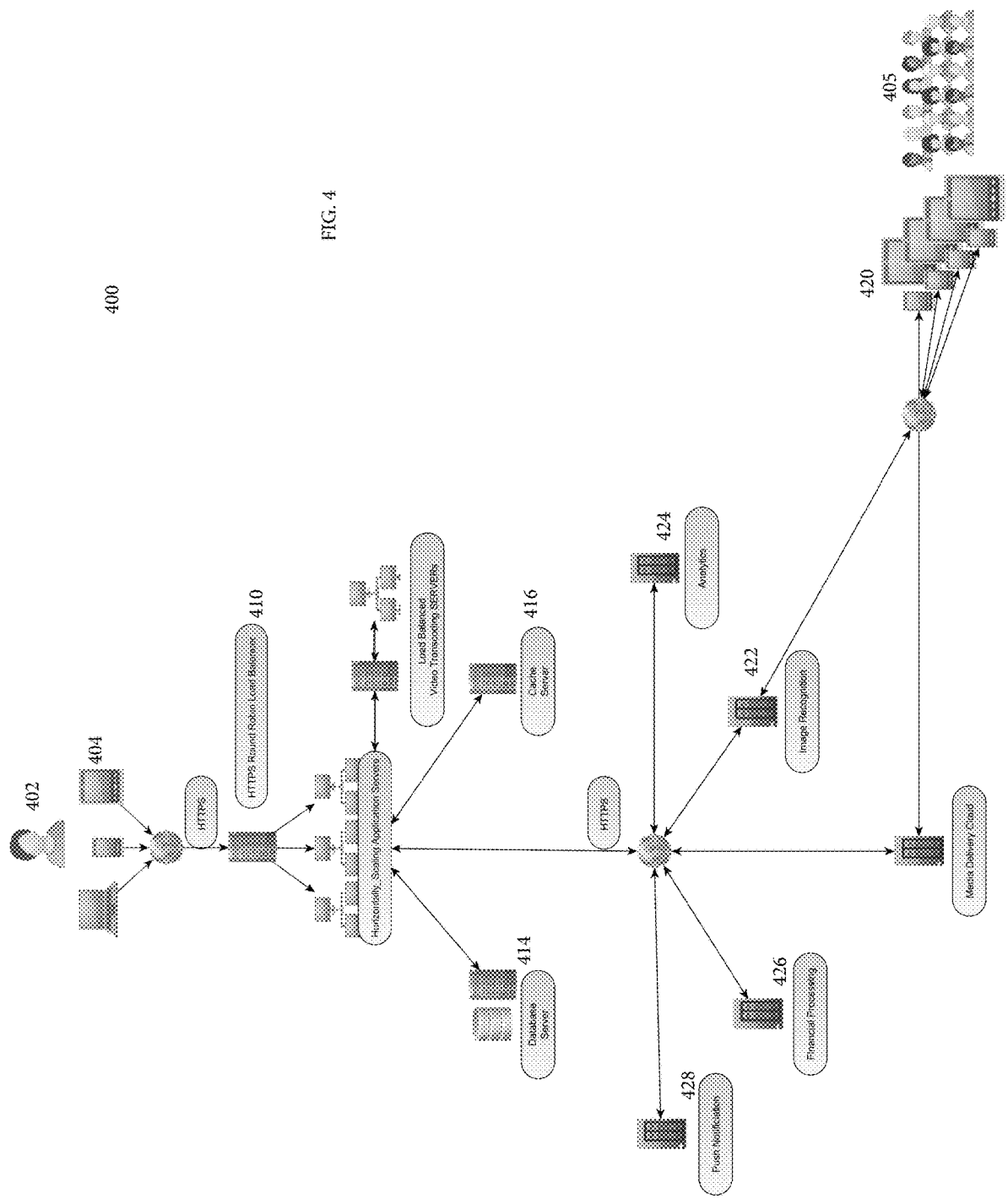
FIG. 4 is a block diagram of various system components, according to one embodiment.

FIG. 4 is a block diagram of various system components for an example AR platform 400, according to one embodiment. FIG. 4 illustrates the service architecture for the AR platform. For example, at 402 shown is a content creator and the devices (e.g., 404) they can use to access the AR platform. Content creators can use their respective devices to access computer networks to connect to the AR platform 400. The AR platform is supported by horizontally scaling application servers (e.g., 410). According to various embodiments, the AR platform can include a plurality of load balanced video transcoding servers (e.g., 412) that support content generation, browsing, and/or media retrieval. The application servers and transcoding servers can be connected to database servers 414 and cache servers 416 to support operations. For example, media content being developed on the platform can be cached on cache servers 416 as it is being develop, edited, and/or prepared for publication.

According to various embodiments, the content creator 402 can build any type of AR experience and link that AR experience to a variety of content targets. When content consumers (e.g., 405) access such content targets on their respective devices (e.g., 420), the applications executing on their devices trigger image recognition operations (e.g., via 422) enabling mapping of a recognized content target (e.g., image) to AR content to render available from the platform.

According to various embodiments, analytic services can be executing on the platform for example at 424. In some examples, content consumers 405 can scan content targets on their devices in a camera mode of operation to trigger image recognition at 422. In other examples, content consumers 404 can browse AR content stored on the database servers 414. Content consumers can execute any AR content once identified in the browser.

In some embodiments, responsive to identifying AR content (e.g., standard video, transparent video, 3D video, etc.) the viewing user can capture their own image as a content target and create a new AR experience with little more than capture of a new still image.

In still other examples, content consumers 405 can receive messages linking content targets and/or AR content to applications running on their devices. By accessing links within such messages, content consumers can execute AR experiences existing on the platform 400.

In various embodiments, the platform 400 can include financial processing services 426 that can be used in conjunction with subscription services, limitations on access, or to authorize access to various ones of the stored AR experiences. In some embodiments, users can request system notifications of new AR content. In one example, content consumers can subscribe to specific content generators, and receive push notifications 428 when new content is available for viewing. In further examples, various subscriptions limit execution of AR content to a threshold number for a period of time. The system may notify such users when the period of time expires and access to new content will be granted (e.g., via push notification at 428).

Figure 5:
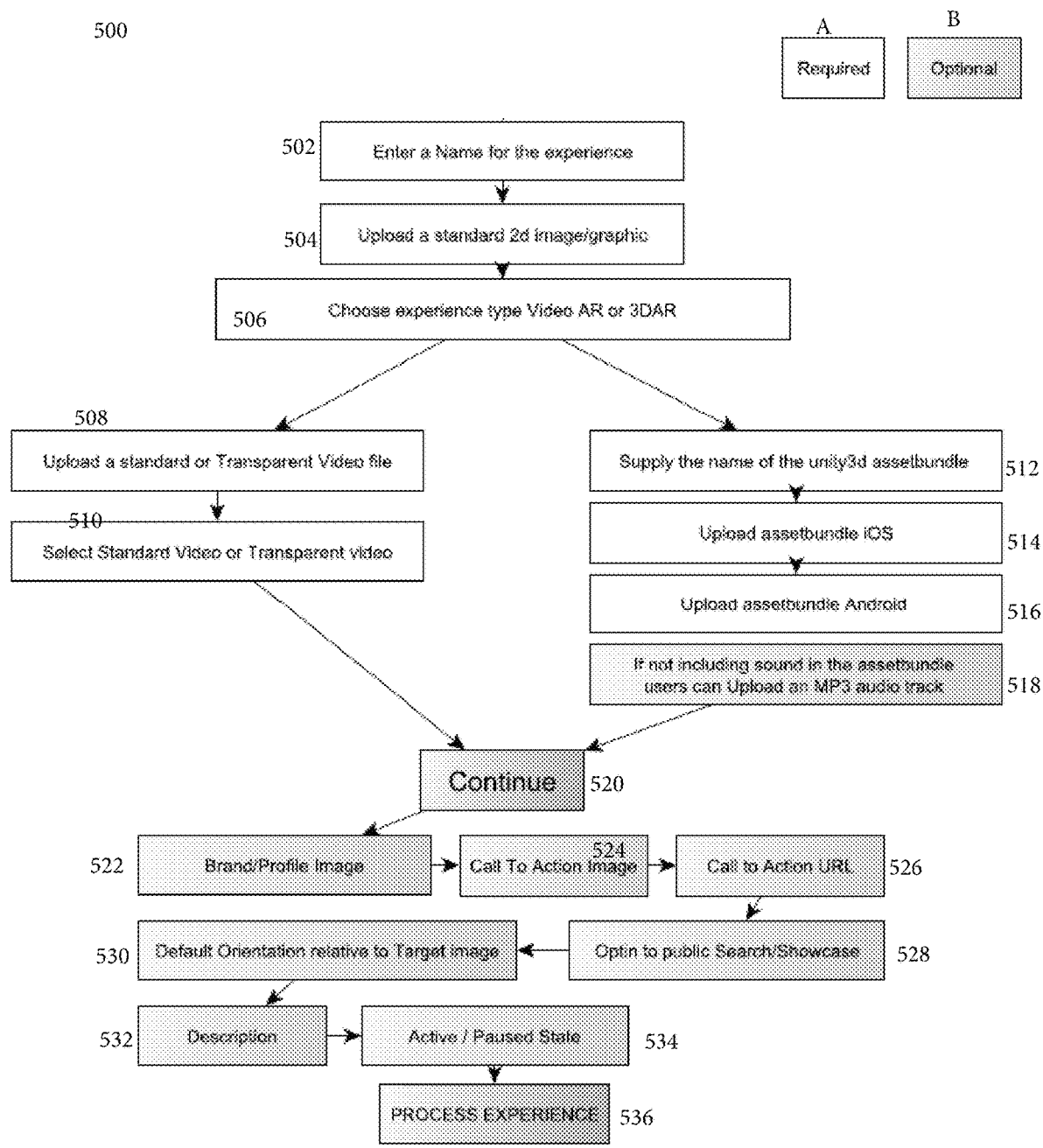
FIG. 5 is an example process for generating AR experiences, according to one embodiment.

Shown in FIG. 5, is an example process 500 for generating AR experiences. According to one embodiment, process 500 begins at 502 with specifying a name for a new AR experience. Process 500 can continue at 504 with upload of a standard two dimensional image and/or graphic. According to various embodiments, the image or graphic is used by the system as a content target. For example, image recognition functions can identify the content target and execute mappings to AR content responsive to identification. In some examples, this can be done via an AR application (e.g., AR Browser) executing on a user device. According to some embodiments, an AR platform provides access or enables download of a local application for browsing, accessing, and/or executing AR content. In one example, the AR application is configured to trigger image recognition functions on a given content target and execute mappings based on the identified image to AR content (e.g., video, simulations, three dimensional transitions, etc.). In one example, the AR application includes a number of operating modes. In a scanning mode a user can trigger the application to enter image identification functionality. This scanning mode be executed automatically and/or triggered by a user in a user interface.

According to one embodiment, process 500 for generating AR experiences continues after specifying a content target at 506 with selection of an AR experience type. For example, an AR system/platform enables selection of a variety of experience types. The experience types can include video AR, three-dimensional AR, among other options. Depending on an AR experience type selected process 500 can branch. Shown by way of example is a branch for a video AR experience and a branch for three-dimensional AR experience. Other branches can be executed as part of process 504 for different AR experiences.

At 508, a standard or transparent video file can be uploaded. In some embodiments, the system may enable selection of the standard video or transparent video file in a user interface drop down menu (e.g., at 510). The video files may be pre-existing or already stored on the system, or may be the file or files just recently uploaded. In some examples, the system can populate dropdown menus with recently uploaded video files to facilitate user selection in the UI.

According to another embodiment, in a second branch of process 500 (a three dimensional AR experience), process 500 can continue at 512 with input of the name of a three-dimensional asset bundle. For example, the system accepts specification of asset bundles generated on different content processing platforms. In one example, the platform and/or process 500 can be executed to access asset bundles from a unity system. Asset bundles for various devices can be uploaded at 514 and/or 516. For example in iOS asset bundle can be uploaded at 514 and an android asset bundle can be uploaded at 516. In various examples, asset bundles formatted for expected devices are uploaded and can be linked for subsequent execution. At 518, if the uploaded asset bundles do not include sound already, the user can upload a sound track to include (e.g., mp3 audio track or other audio format).

Optionally process 500 can continue at 520. At 522, a brand or profile image can be integrated into an AR experience. At 524, a call to action image can also be integrated into the AR experience. At 526, a call to action URL can be associated with the experience. In various embodiments, access to the generated experience can then be specified. For example at 528 a selection can be made on the system to opt into a publicly accessible repository. In further example, the public repository can be a public search folder and/or showcase for highlighting examples of AR content.

In some embodiments, process 500 continues with specification of a default orientation of the AR content relative to a target image that will trigger execution of the AR content. In further embodiments, the user can be prompted at 530 to select the default orientation (e.g., which can include masks and separation of AR content in an upper portion of a display with display of the target image in a lower portion of the display, among other options).

According to various embodiments, process 500 can include generating a description of the AR experience at 532. AR experience description can be used in subsequent searches to identify specific AR content/experiences. Further as part of process 500, an active or paused state may be specified. In one example, on creation an active state will be assigned to an experience by default. In some embodiments, process 500 can conclude at 536 with processing of the experience for consumption by other users.

Process 500 is illustrated with light shading (a) and darker shading (b) to show that in various examples lighter shaded elements are required and darker shaded elements are optional. In further embodiments, various steps shown in FIG. 5 may be consolidated and/or executed together. In still other embodiments, various steps may be omitted or executed in different order.

According to one embodiment, once the content generator has created an AR experience (e.g., by linking a content target with AR content (e.g., post execution of process 500)), an AR system can stage the experience for publication. In various embodiments, the system presents a visualization representing the AR experience, and details the operations being executed to prepare the AR experience. For example, the system builds a data file for accessing the render-able content of the AR experience, and processes the AR media (e.g., standard video, 3D video, transparent video, etc.) vis transcoding servers to, for example, a lightweight and/or stream-able format.

Figure 6:
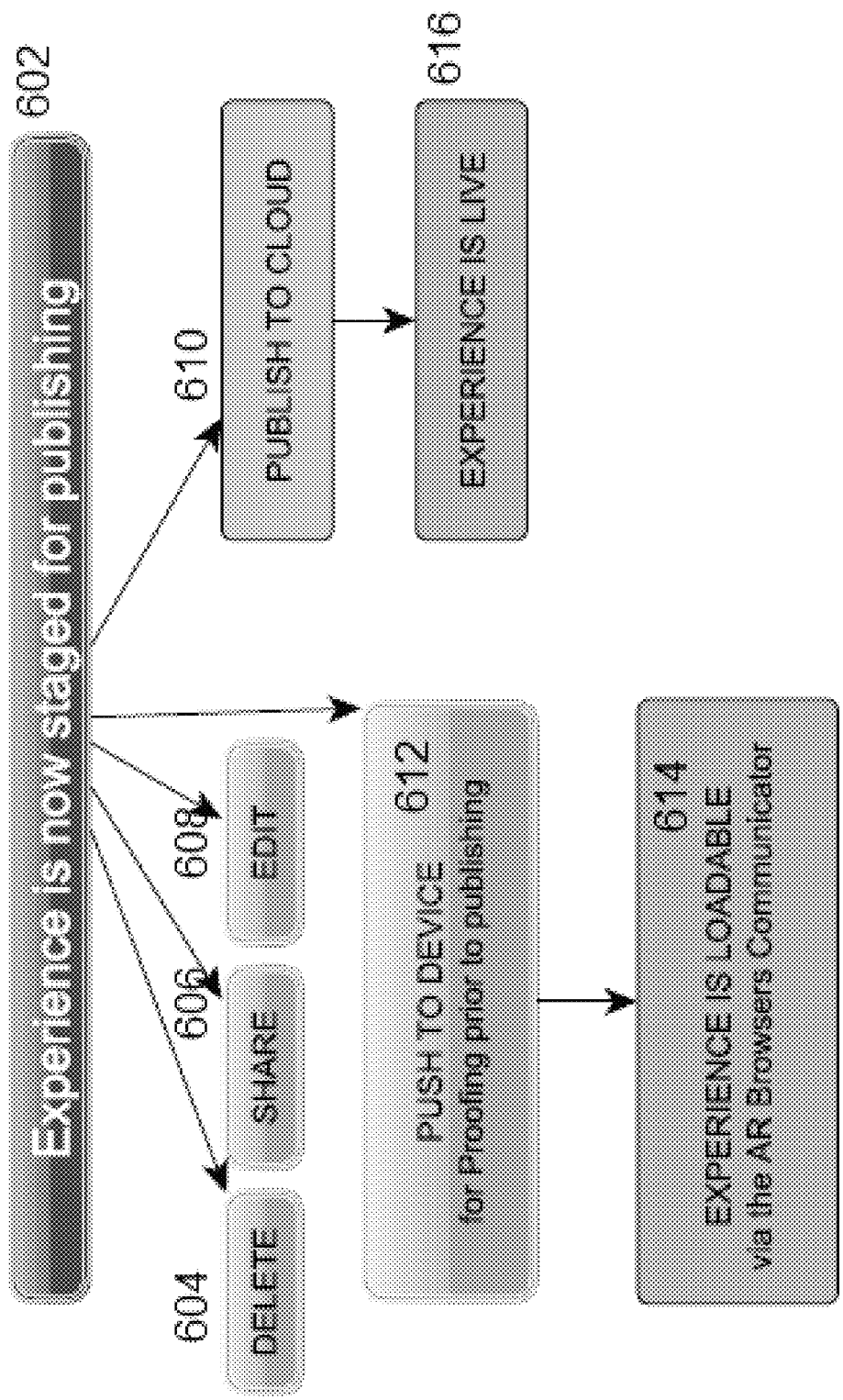
FIG. 6 is an example process flow for staging AR experiences for user consumption, according to one embodiment.

Shown in FIG. 6, is an example process flow for staging AR experiences for user consumption. At 602, a candidate experience is staged for publication. For candidate experiences, the content generator can delete at 604, share with other users at 606, and/or edit at 608 the candidate experience. Further, the content generator can push the AR experience to their own device for viewing prior to publication at 612. Once pushed to their device, AR experience is executable, for example, via a local AR application. In one example, the system provides an application including browser functionality, and the browser functionality can be used to execute the candidate experience locally, for example, in an execution mode of operation.

According to another embodiment, once staged the AR experience can be published to cloud structures at 610. As discussed above, cloud structures can be used to define user access groups, limitations on access, or other limiting parameters. According to some examples once an AR experience is published to a cloud, the experience is live for end-user execution (e.g., at 616).

Implementation Examples

Figure 7:
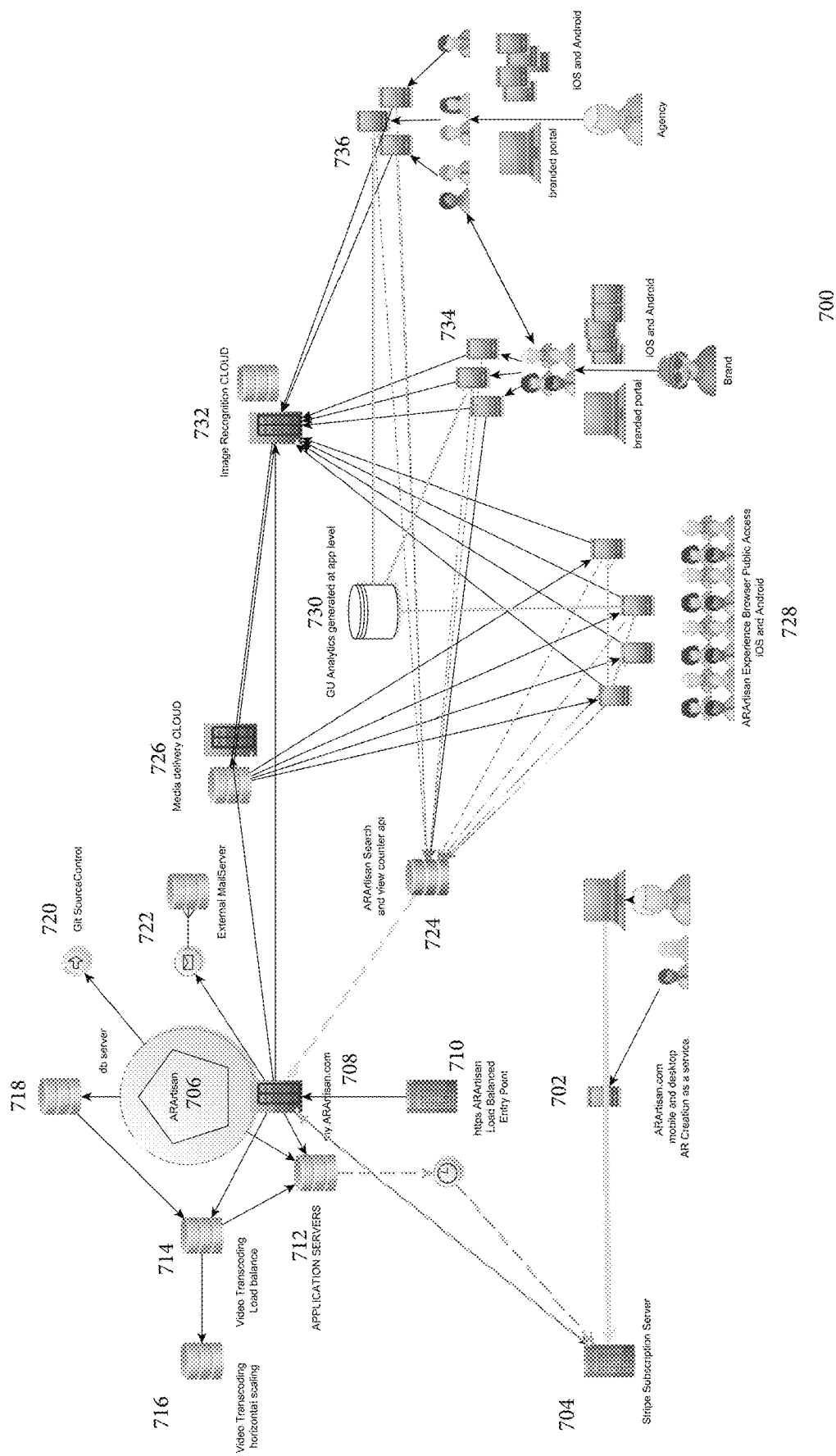
FIG. 7 is an example implementation of an AR system/platform, according to one embodiment.

Shown in FIG. 7 is an example implementation of an AR system/platform 700. According to one embodiment, system 700 can support any number of architectures where content generating users create AR experiences for access by content consuming users. In one example, this is done in the context of a brand creating AR advertising campaigns. In other examples, a brand can work with an agency to develop AR content to reach consumers.

Returning to FIG. 7, system 700 is an example embodiment showing the relationship between content generators, content consumers, brands, agencies, and other potential players who can access the system 700 to create or consume content. FIG. 7 illustrates communication between the various elements of the system and respective users. The communication pathways shown in FIG. 7 are provided as examples and additional communication pathways can be provided in other embodiments.

At 702 a content generating user can access a website hosted by the system/platform. The content generating user can access the website using any device (e.g., mobile, desktop, laptop, PDA, etc.). Shown at 704 is a subscription/payment server. In some examples, the payment server 704 can be a Stripe subscription server.

If the user is authorized (e.g., using a free version, or paid through the payment server), the user can access the hosted site (e.g., myarartisan.com) and the underlying system 706. Access to the website and system can be load balanced via load balanced entry points at 710. The system 706 can communicate with a variety of servers and or services (e.g., application server 712, video transcoding servers 714, horizontal scaling servers 716, database servers 718, etc.) to support content creation and/or content consumption.

According to various embodiments, the system provides the functionality and user interfaces to enable and facilitate content generation. In various embodiments, the streamline user interface presented by the system eliminate the need for programmatically generating AR content, reducing the formerly complex programming effort into a simple UI selections. For example, content generating users can specify target images or other target content on which to integrate AR content with user interface prompts. The integrated content can be saved as an AR experience, for example, on the database hosted by DB server 718. In various examples, the resulting code (e.g., as automatically generated based on UI selections and content selections) from the AR experience generation can be saved and or versioned using git source control at 720.

Once AR experiences have been created on the system, content consuming users can access them (assuming authorization). In some examples, the system provides an application with browser functionality that enables end users to navigate existing AR experiences for which they are authorized. For example, this includes content for which they are subscribed, or have paid for access, or has been designated publicly accessible. In further examples, brand or agency based AR experiences may require access through a branded portal in order to access the AR experience for a particular brand or agency. In other examples brand and/or agency experiences have limited access based on requiring image recognition of content located at a brand and/or agency location in order to participate in a linked AR experience.

In some embodiments, the system 706 can include search and view counters, or can include application programming interfaces for providing search and view counter functionality (e.g., 724). In further embodiments, content consumer users can access public AR experiences and browse for experiences on which they are authorized. Once an experience is identified, users can trigger communication from a media delivery cloud 726 that provides access to/rendering of the AR experience and content.

In other embodiments, the system provides access to AR experiences via image recognition on target content. For example, in a scan mode of operation an application on the end-user device can map an image to an AR experience on the system. For example, an AR experience can be accessed using an image recognition cloud. The image recognition cloud (e.g., 732) is configured to map system defined images to executable/render-able AR content. In some examples, the user application can recognize the content target (e.g., via image recognition cloud 732) and map the content target to an AR experience hosted on a media delivery cloud (e.g., 726).

According to some embodiments, users may access a branded portal hosting images mapped to AR experiences. In one example, such branded portals and mapped images can also be accessed through brand owned/managed physical locations and image recognition taken on physical or digital images existing at the physical locations. In another example, an agency space (e.g., hosted website, physical locations, and/or physical images) can include content targets (e.g., pictures, sculptures, or other items on which image recognition can be executed and mapped to AR experiences).

According to one embodiment, an AR system can be configured to distribute an application that end-users run to access AR content/AR experiences. In some examples, the application is configured to generate analytics at the application level and communicate the analytics to the system (e.g. 706). In further examples, the system can also collect analytic data on use, search, and other execution information. The various analytics can be shared or accessed with content generating users, brands, and agencies (who may also be content generators).

FIG. 7 illustrates example components and example users according to one implementation. An AR system/platform can include other architectures, different components, and may support a variety of different users. Other architectures in other embodiments can also provide AR generation and consumption services.

Example Environment and Implementation

Various embodiments of the system support image based augmented reality: AR that utilizes a mobile device video camera feed to see and recognize AR target images (i.e., content targets). Upon recognition, the system's AR Browser triggers a chain of events resulting in the creator's media content being rendered and displayed in such a way as to be "Connected to" or "Pinned to" the content target image which triggered the AR experience. As the creator's media content is played, the AR engine can be configured to maintain the media in position relative to the target image, continually matching the virtual camera which is rendering the media experience with the device cameras' video feed of the user's point of view. In other words, the user's visualization of the AR content on their device can change perspective, point of view, etc. by moving their device in the real world to trigger movement of the content in the AR content space.

According to various aspects, the AR system/platform provides a unified format which allows access to an array of supporting technologies (e.g., via plugins, APIs, RPC, etc.) that a development team would conventionally have to use along the way to generating their own AR content. Various embodiments of the system have defined a set of most useful AR options that are made selectable by UI display, creating a cohesive system which supports the broadest user base (e.g., the AR system/platform eliminates the need for coding knowledge). Various embodiments automatically (via programmatic logic and/or default selections) handles redundant development steps, simplifies the publishing and deployment steps via background execution within the core of the system. Further embodiments couple those processed steps with users selections via prompted options in the UI (e.g., identify content target, identify AR experience type, etc.) to define the user's input options, which results in a customized AR experience both useful and relevant to the users, and that can be completed in minutes as opposed to conventional development that requires months and design/engineering teams.

Various embodiments enable a self-service augmented reality platform accessible by any number of users. The users of the platform are given direct access to create, view, deploy, manage, share, edit, update and delete their own Augmented Reality ("AR") experience. According to various embodiments, the system guides users through systematic creation and deployment of Augmented Reality Experiences without the need for coding or API integration by users (e.g., based on proprietary formats, pre-coded functionality, and dynamic user selections or same, among other options).

According to one aspect, the technical requirements, data management, integration with image recognition based augmented reality, as well as cloud-based media storage and delivery of instantly updatable augmented reality experiences are all handled from within the core of the cloud-based system/platform. Various embodiments enable the removal of the coding task and daunting technology for even novice users—for example, through the automation of production and development tasks associated with the use of image based augmented reality technology. In some examples, the system's purpose is to create and publish image based augmented reality technology without technical prerequisites, reducing development to basic web-form entry and upload interface that guides any user through AR content creation. Stated broadly, the system allows new levels of accessibility to image based augmented reality technology for users to create and publish their own dynamic AR experiences—and even for experienced developers, the system eliminates difficult options that lead to programming errors, incompatibility, and development challenges. Even with expert developers, the system improves conventional approaches for AR content generation and publication. For example, the system reduces error in development, and/or reduces the development time required to go live. In addition, the system provides custom AR Cloud(s) (dynamic data containers for access and storage) which the system is configured to manage and supply to users.

Example Platform Overview

According to one embodiment, an AR platform/system can be provided as a data processing system ("ARArt Platform") for receiving, monitoring, recording, modifying and delivering user supplied information in the form of text, digital imagery, digital video, 3d geometry, animation and digital audio ("AR Media") related to the creation, manipulation, processing and generation of electronically delivered Augmented Reality Experiences ("AR Experiences"). In some embodiments, AR experiences are generated on the system with a proprietary data format which facilitates loadable packages of user provided AR Media and display options—which are connected to a recognizable (e.g., image recognition) visual trigger. Upon such recognition (e.g., of a visual trigger) the system is configured to initiate the transfer of a low-bandwidth format file (which for example, does not store the AR Media) that begins an event cycle: 1) request, 2) retrieve, 3) render and 4) display the user defined AR Media and associated options set for that specific AR Experience. According to various embodiments, the system enables this data cycle to execute within one second.

In addition, various embodiments of the system organize the user's AR Experiences into structured AR groups ("ARClouds") to allow segmentation of the AR Experiences into user defined sub groupings. These subgroupings are configured to support a matrix of existing and potential future use cases related to publishing AR Experiences as a communication tool (e.g., AR for business communication, AR for advertising, AR for personal communication, and AR for social communication).

According to one embodiment, the system enables an ARCloud's owner (e.g., content creator) to invite other users to join the ARCloud, and further enables the user with the owner role functions to manage the invitees' (e.g., ARCloud Users) access rights to the ARCloud through assignment of authorized roles. For example, these roles include: "Audience" which allows direct private viewing or proofing of AR Experiences on a respective device prior to deployment; "Member" which allows Viewing, Creation, Editing and Direct to Device Deployment of AR Experiences; and "Publisher" allowing Viewing, Creation, Editing, and Publishing of AR Experiences to the ARClouds.

According to some embodiments, the standardized formatting for ("ARArt format") the platforms supports multiple configuration options (e.g., programmed to accept content targets specified by users, and pre-programmed to accept an AR executable (e.g., video augmentation) to integrate with the content target) and various types of AR Experiences. These configurations allow users to build, manage, deploy and publish an array of AR Experiences based on selections in system displayed user interfaces and without the users need to implement computer code, engage in software development processes or have any mobile application publishing knowledge in order to immediately utilize augmented reality technology as a communication tool to suit their needs.

Figure 8:
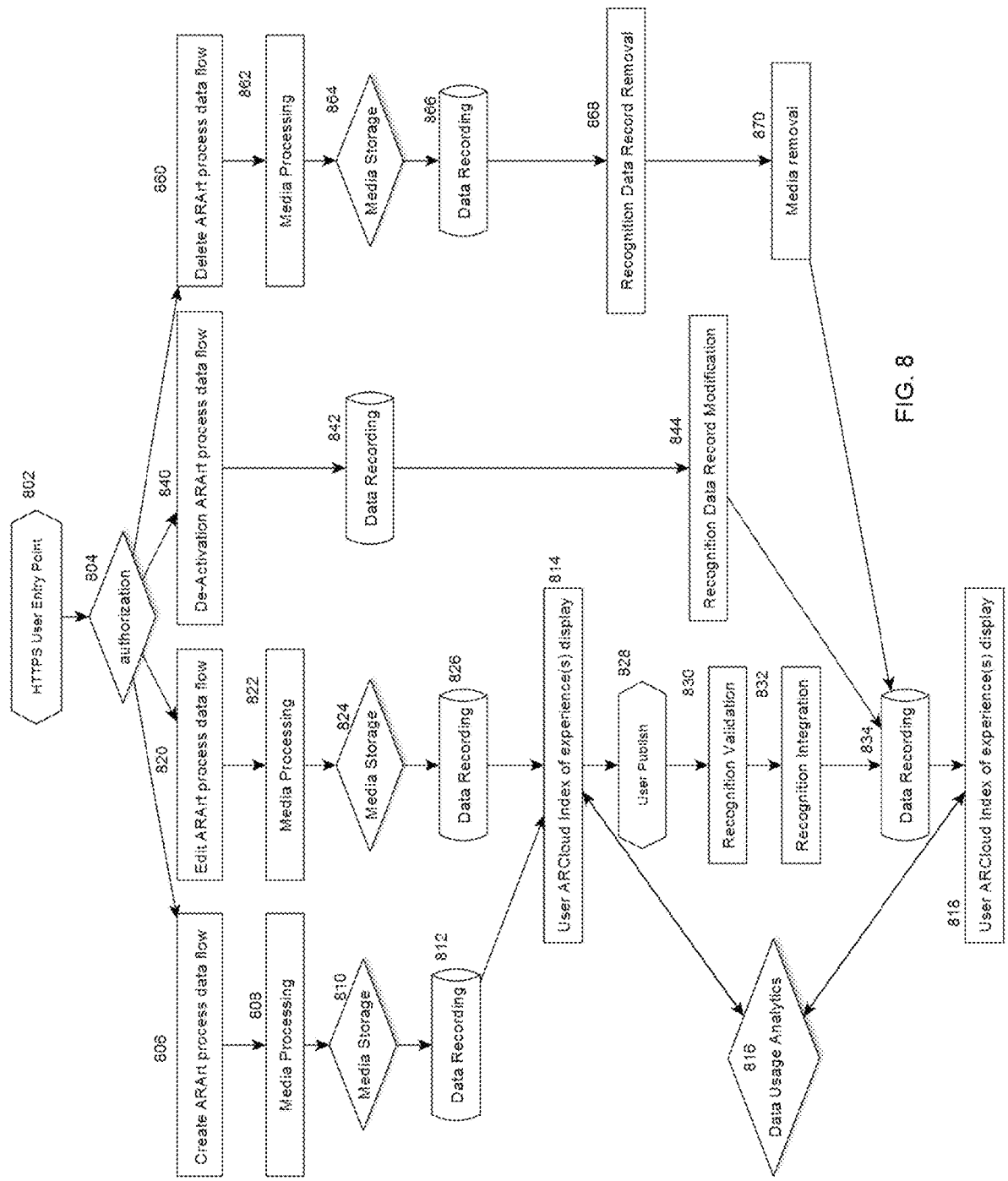
FIG. 8 a process flow architecture for the ARArt Platform example embodiment.

FIG. 8 is a process flow architecture for the ARArt Platform example embodiment. As shown once a user accesses the system (e.g., ARArt Platform), via, for example, an http entry point 802. The user is tested for authorization (e.g., 804), and once authorized given access to creation and modification functions. For example, at 806 the user accesses a create AR content process flow (e.g., "create ARArt process dataflow"). The create branch continues with media procession at 808 (e.g., video, image, 3D video, content mapping, GPS tracking and linking to experience, content target identification, call to action definition, etc.). In various embodiments, processing can include various one of the steps describe above (e.g., see FIGS. 3, 4, 5, 7, among other options). Once processing is complete, the processed media is saved at 810 and data regarding the experience recorded (e.g., 812) for indexing the created AR experience (e.g., at 814) to facilitate search and navigation functions. Any use of a created experience is monitored (e.g., at 816), which can be used to update data for indexing the respective AR experiences (e.g., at 818 or via re-execution of 814). Other branches for the process flow include an edit branch at 820, including media processing at 822, and storage of the modified media at 824, and any data describing the experience or modifications to the experience to 826. As in the create branch, an index of experiences can be displayed at 814 that includes the updated and/or edited content.

In various examples, the modifications made during the editing branch, may require publication (e.g., at 828) to allow other users to access the AR experience. Once published, other users (e.g., registered with the ARArt platform or unregistered users for public content) can access the AR experiences, via image recognition on a content target (e.g., at 830-832). In various embodiments, steps 830 and 832 to can be executed to develop and validate mappings between a content target (e.g., an image) and AR content to be displayed. Such image recognition can be functionality provided through a separate AR application that executed on a respective user's device. In some examples, users can download the AR application once access to the ARArt platform is granted or authorized. Additional data for respective experiences can include identification information (e.g., title, description, function description, AR type, etc.), which can be captured (e.g., at 834) and used for further indexing (e.g., 818). In some embodiments, the process of FIG. 8 can include de-activation branch (e.g., 840) and/or delete branch (e.g., 860). The de-activation branch continues with data capture of the status for the experience (e.g., data recording 842) and modification of recognition data (e.g., 844—for example, to stop further image recognition functions and execution of any associated mappings). Similarly, the delete branch (e.g., 860) results in the deletion of AR experience functionality (e.g., 862-870).

FIG. 8 illustrates a number for process steps and branches, in other embodiments, additional or fewer branches may be configured for execution, and various one of the steps illustrated can be omitted, consolidated, and/or re-ordered for execution. Various steps described in FIG. 8 can be used to call other processes (e.g., processes described in greater detail below with respect to AR content processing and AR type process flows).

In various embodiments, the AR platform/system is configured to provide a universal development environment that limits coding requirements of conventional AR development. According to one embodiment, the platform/system is configured to manage integration of any type of AR content with a variety of content targets. In order to achieve codeless integrations, the system provides various default options for AR visualization (e.g., rendering the AR content in various application displays). In some aspect, the system is configured to enable a variety of visualization angles, orientations, and/or positions to facilitate the integration of unknown AR content. In various embodiments, the functionality to display a series of visualization angles, visualization orientations, and visualization positions is pre-coded and selectable in the user interface during creation of an AR experience.

According to one embodiment, the system and/or platform enables a "flip" function which sets the orientation of a video component of an AR experience when it starts. The system enables users to toggle between the pre-defined orientations to support AR experiences that have not yet been created or viewed (e.g., the orientation the end user may be in when an experience begins is unknown).

In various embodiments, the system further enables both the content creator and the audience (e.g., viewing/consuming user) the ability to establish an orientation based on this unknown. For example, the system/platform has logic to trigger a default starting orientation which a creator may set based on how the target image is being displayed, printed and the expected AR experience viewer location. On the user device side (e.g., via the AR application) the AR experience browser provide users the ability to override this at runtime and flip (rotate) the AR experience from its default orientation (e.g., "Parallel to target" to a preset flipped position, "Perpendicular to Target"—various embodiments are configured to handle these operations slightly differently (e.g., depending on AR types). In one example, video-AR "Parallel to Target" is configured to position the video in register to the target image. In another example, video-AR "Perpendicular to Target" is configured to position the video to the top of the Target and, in further example, rotate the augmentation up to rest on the page to allow both Target and Video to be viewed at the same time.

Figure 9A:
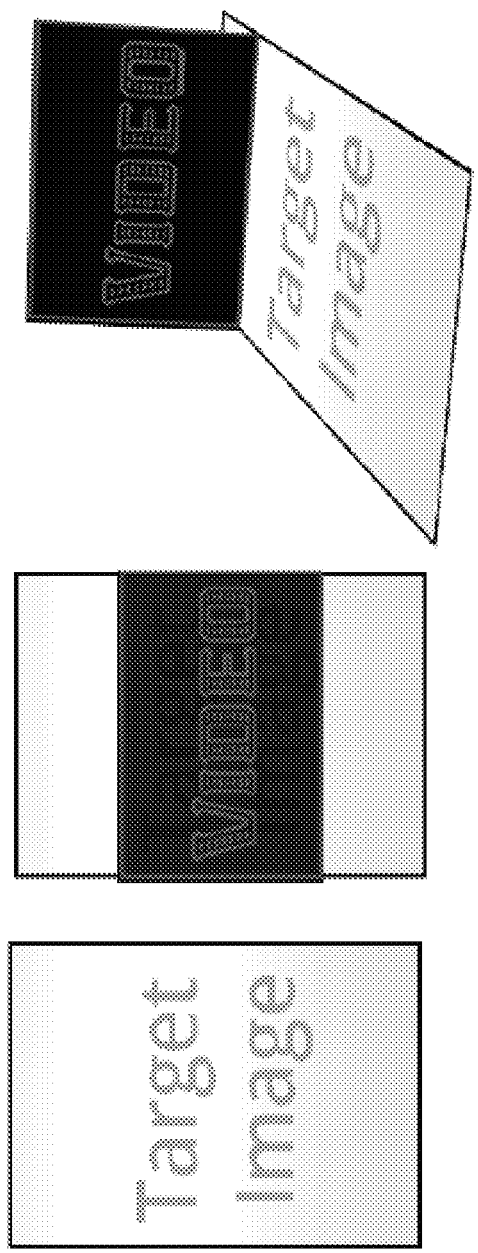
FIGS. 9A-B are example positions and orientations selectable in the user interface, according to one embodiment.
Figure 9B:
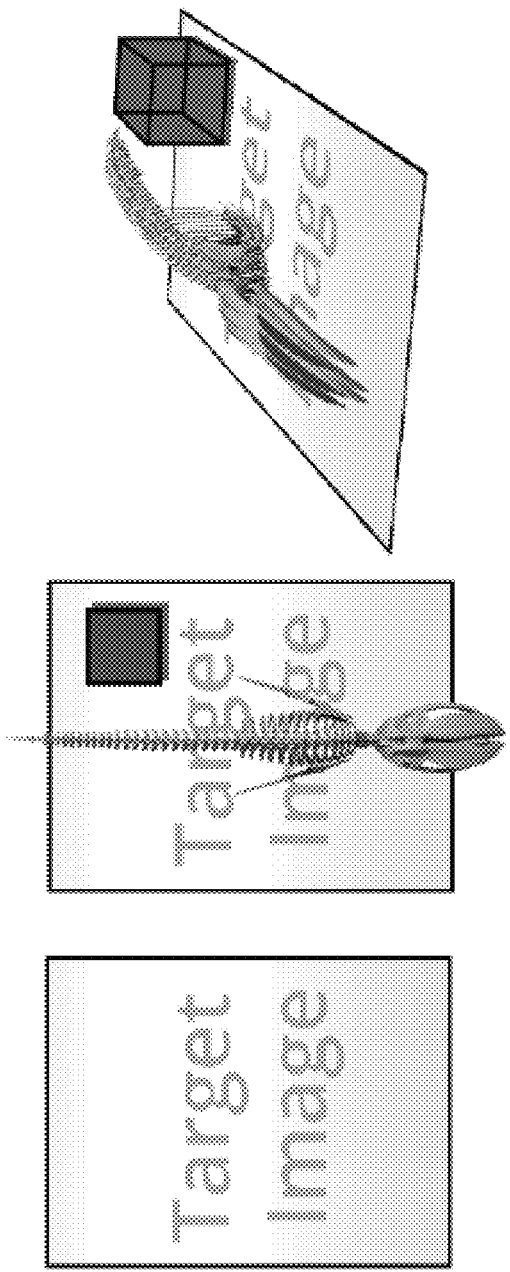
Figure 10A:
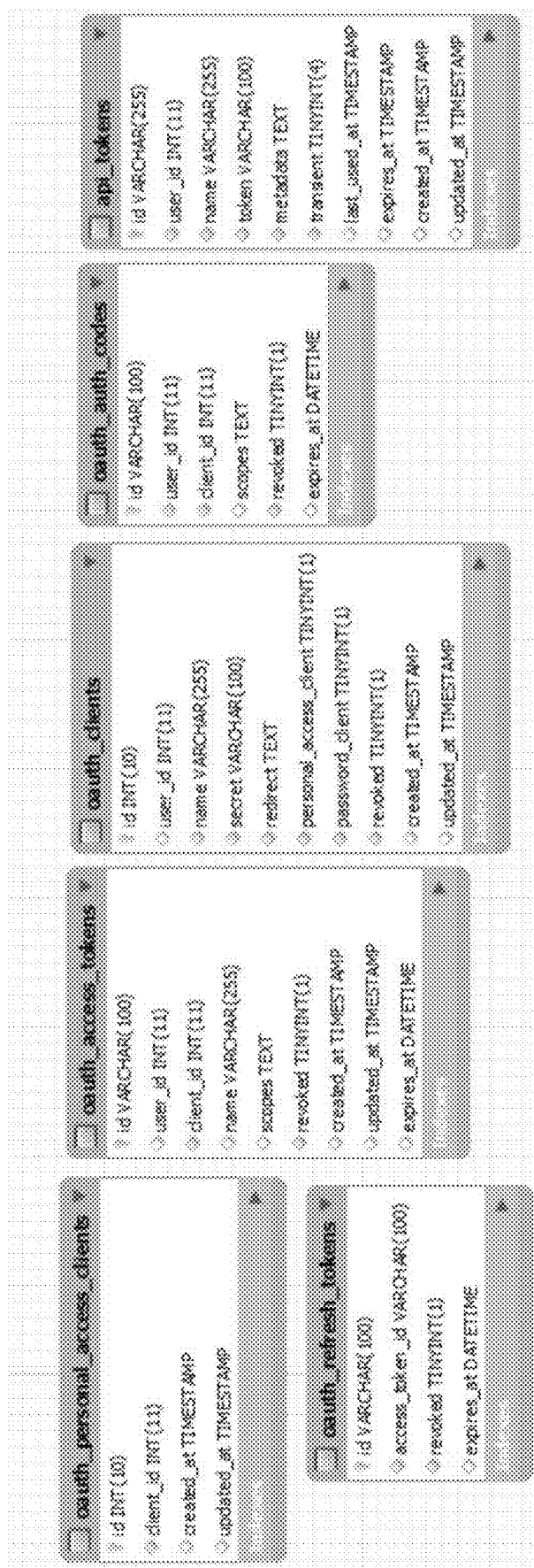
Figure 10B:
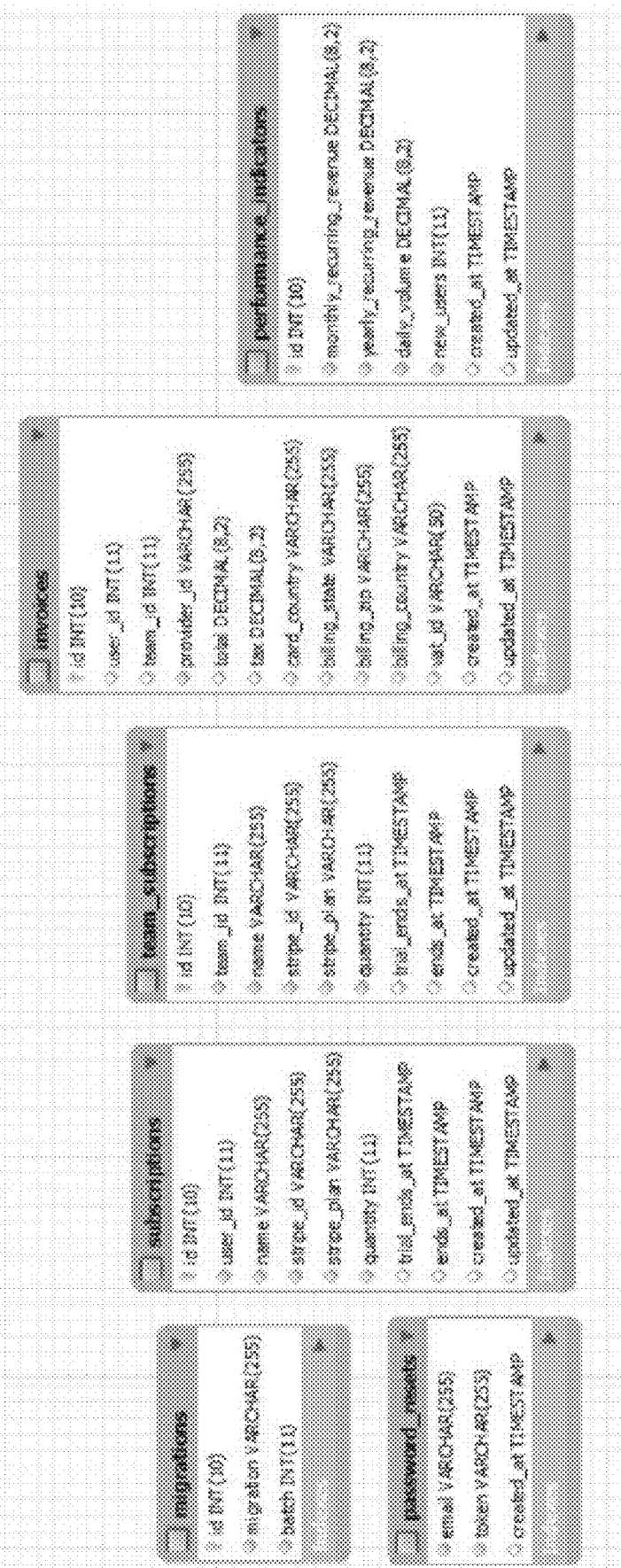
Figure 11B:
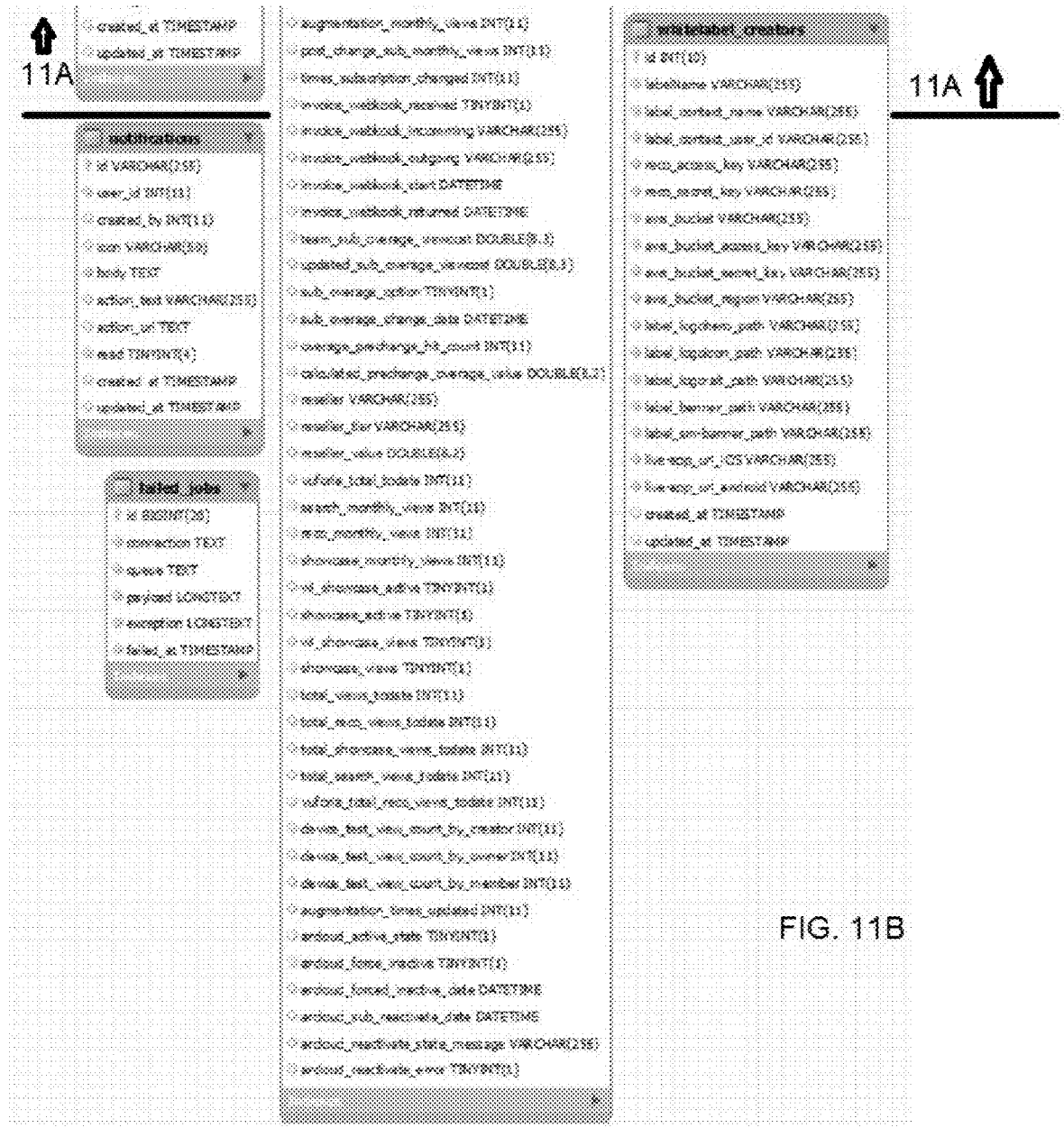

FIGS. 9A and 9B illustrate example positions and orientations that the system is configured to make selectable in the user interface (e.g., both at creation and consumption). Other combinations of the examples shown can be made available to the users of the system in other embodiments.

Example Infrastructure for AR Platform

According to various embodiments, a number of interconnected system/services can support the AR platform, as well as a variety of internal systems and/or services. For example, the system can provide public entry for non-registered users via (e., HTTPS Public Entry, and/or targeted landing pages). Further examples, include HTML5/PHP/JavaScript (e.g., via https://PlatformName.com). In various embodiments, non-registered users can access service overview, user introduction information, examples, and description information, among other examples. Additional embodiments, maintain access to login and registration links in the user interface.

Any one or more of the following features can be implemented on AR platform web-site: For example, HTTPS Public Network https://my.PlarformName.com may be a landing page with:

AR_LB PHP7.3 HTTPS Secure User Registration, Authentication and Load Balancer Entry Point.

In another example, the registration user side can require authentication to https://my.PlarformName.com and provide access to any one or more of the following:

AR_01 PHP7.3 Virtual Application Servers

AR_02 PHP7.3 Seamlessly add or reduce Application Servers to scale

AR_03-999 Seamlessly add or reduce

AR_DB PHP7.3 Server for cohesive Database recording

AR Cache PHP7.3 Server for cohesive Session Data and Memory Cache Audio/Video Transcoding Load balancer—PHP7.3 Load Balancer video/audio transcoding AVTrans_01 PHP7.3 Virtual Audio/Video Transcoding Server AVTrans_02 PHP7.3 Virtual Audio/Video Transcoding Server ARTrans_03-999 Seamlessly add or reduce Transcoding Servers to scale Local App Storage Cloud Storage Volume for temp application use Cloud Storage Volume for media Delivery External Connections to service APIs Transactional email (e.g.; MailGun.com, etc.)

Image Recognition & AR Engine (e.g.; PTC.com, etc.)

Transactional Subscription Financial Processing (e.g.; Stripe.com, etc.)

Push Notification Processing

Example Data Structures to Support Platform

According to some embodiments, the platform can include a number of data models and respective data structures to support content creation, publication, and execution by a user base. For example, the system can include any one or more of the following data elements:

Announcements system to user announcement data
api_tokens generation/renewal of API token
audios audio transcoding records (1 per user input audio file)
augmentations ARArt format data records (1 per experience)
failed_jobs transcoding Job Monitor (1 per transcoding Job)
images image processing record (1 per image conversion)
invitations image processing record (1 per image conversion)
invoices invoice records (1 per subscription invoice)
jobs A/V transcoding Job Queue (1 per transcoding Job)
migrations Database Structure History (1 per DB migration)
notifications Notification records (1 per user Notification)
oauth_access_tokens API security records
oauth_auth_codes API security records
oauth_clients API security records
oauth_personal_access_clients API security records
oauth_refresh_tokens API security records
password_resets Administration (1 per password reset)
performance_indicators Administration (1 per metric)
subscriptions User Subscription records (1 per Subscription)
supports User Support Queue records (1 per Support request)
team_counts Usage Analytics records (1 per ARCloud)
team_subscriptions ARCloud subscription records (1 per ARCloud)
team_users ARCloud User records (1 per invited user)
teams ARCloud records (1 per ARCloud)
users User records (1 per User)
videos Video transcoding records (1 per user input video file)
viewcounts Usage Analytics records (1 per experience view)
whitelabel_creators License records (1 per licensed User)

Figure 12:
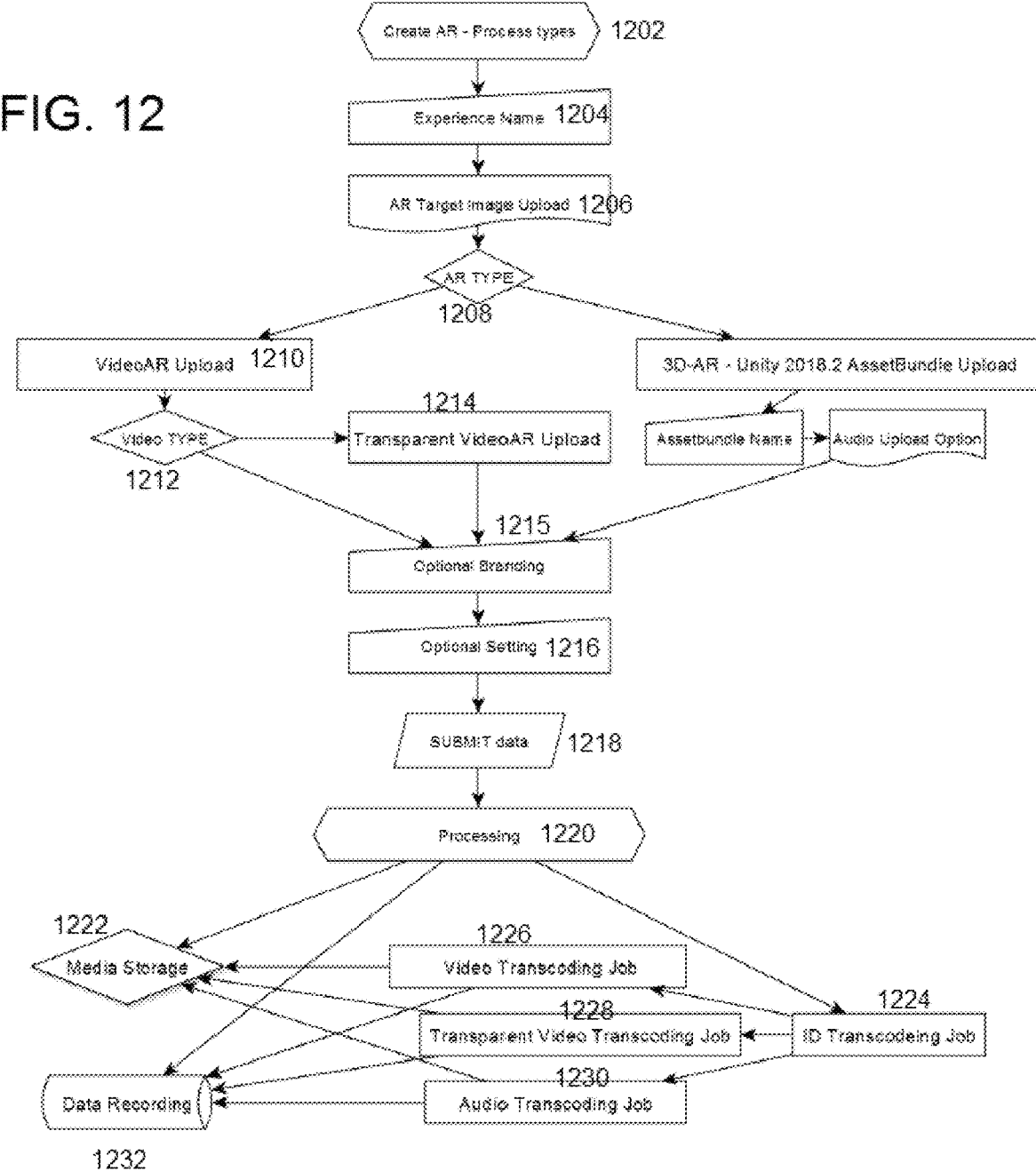
FIG. 12 is an example process flow for creating AR content, according to one embodiment.
Figure 13:
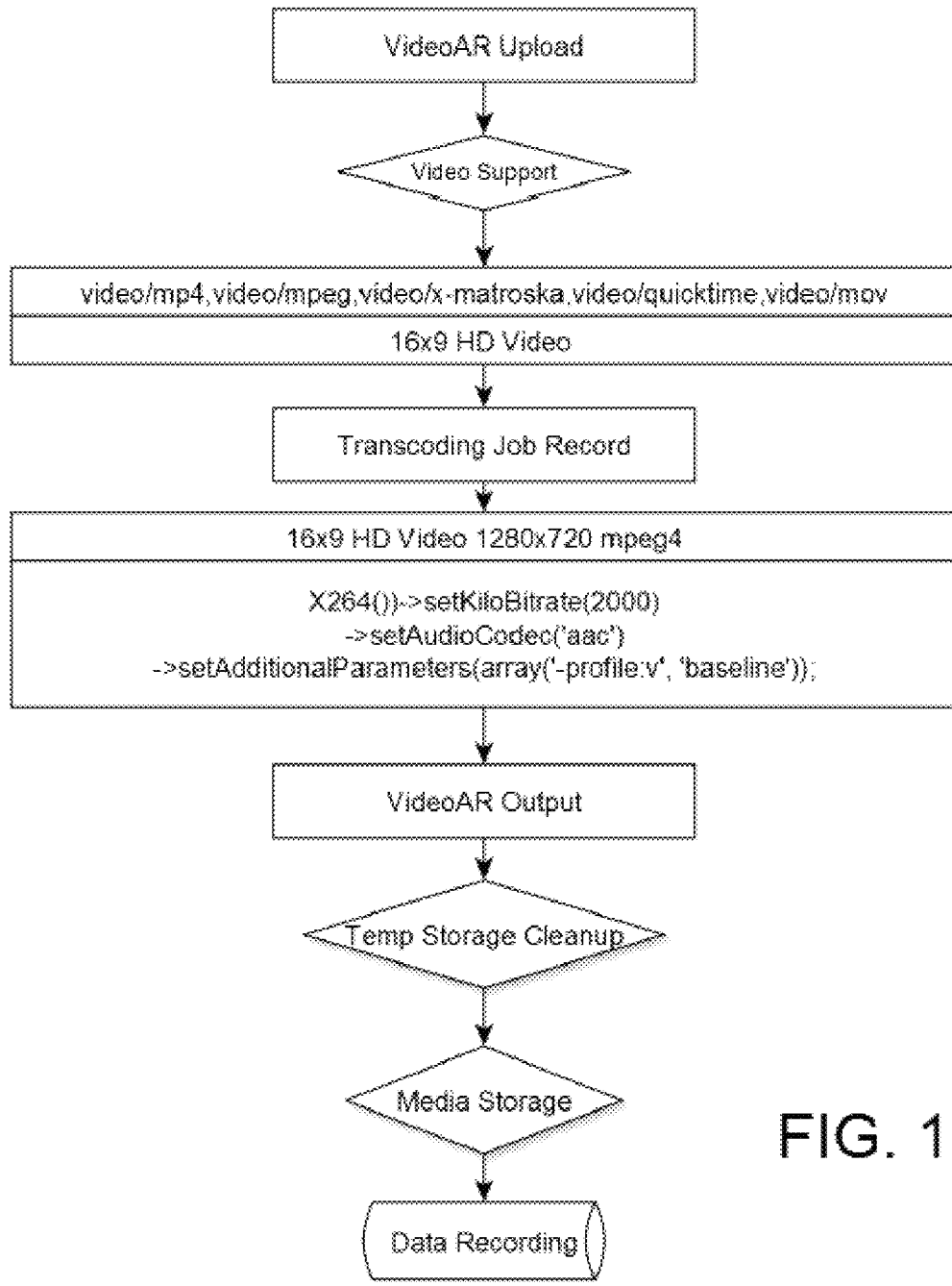
FIG. 13 is an example process flow for creating AR content, according to one embodiment.

Example data structures, formats, and elements are shown in FIG. 10A-B, and 11A-B. In some embodiments, the platform can include any one or more of the following data elements and structure:

1-id,INT UNSIGNED,binary,10,3,0 id
2-created_at,TIMESTAMP,binary,19,19,0 time
3-updated_at,TIMESTAMP,binary,19,19,0 time
4-user_id,INT UNSIGNED,binary,10,2,0 connections to user
5-name,VARCHAR,utf8,255,36,0 user input
6-armode,VARCHAR,utf8,255,8,0 user input
7-target_image_url,VARCHAR,utf8,255,90,0 user input
8-target_image_orig,VARCHAR,utf8,255,4,0 user input
9-video_url,VARCHAR,utf8,255,51,0 user input
10-audio_url,VARCHAR,utf8,255,51,0 user input
11-bundle_name,VARCHAR,utf8,255,22,0 user input
12-ios_package_url,VARCHAR,utf8,255,69,0 user input
13-android_package_url,VARCHAR,utf8,255,73,0 user input
14-gps_spot_long,DOUBLE,binary,8, −2,2 location data
15-gps_spot_lat,DOUBLE,binary,8, −2,2 location data
16-ar_logo_url,VARCHAR,utf8,255,95,0 user input
17-landing_page_url,VARCHAR,utf8,255,57,0 user input
18-cta_btn_url,VARCHAR,utf8,255,94,0 user input
19-whitelableid,VARCHAR,utf8,255,0,0
20-whitelable_logo_url,VARCHAR,utf8,255,0,0
21-analyticsid,VARCHAR,utf8,255,0,0
22-searchable,VARCHAR,utf8,255,7,0 user input
23-flip,VARCHAR,utf8,255,10,0 user input
24-active,VARCHAR,utf8,255,5,0 user input
25-alpha_vid,VARCHAR,utf8,255,5,0 user input
26-touch_action,VARCHAR,utf8,255,0,0 user input
27-discription,VARCHAR,utf8,255,255,0 user input
28-catagory,VARCHAR,utf8,255,0,0 user input
29-targetid,VARCHAR,utf8,255,32,0 recognition processing
30-rating,VARCHAR,utf8,255,0,0 recognition processing
31-size,VARCHAR,utf8,255,0,0 recognition processing
32-added_date,DATE,binary,10,0,0 recognition processing
33-updated_date,DATE,binary,10,0,0 recognition processing
34-vname,VARCHAR,utf8,255,0,0 recognition processing
35-metafilepath,VARCHAR,utf8,255,124,0 Generated ARArt Format Location
36-live_video_url,VARCHAR,utf8,255,135,0 Media Cloud Location
37-live_bundle_ios,VARCHAR,utf8,255,104,0 Media Cloud Location
38-live_bundle_android,VARCHAR,utf8,255,108,0 Media Cloud Location
39-live_arlogo,VARCHAR,utf8,255,130,0 Media Cloud Location
40-live_cta,VARCHAR,utf8,255,129,0 Media Cloud Location
41-live_target_display,VARCHAR,utf8,255,125,0 Media Cloud Location
42-as3 folder,VARCHAR,utf8,255,42,0 Media Cloud root
43-logo_id,INT UNSIGNED,binary,10,3,0 experience processing records
44-cta_id,INT UNSIGNED,binary,10,3,0 experience processing records
45-iosbundle_id,INT UNSIGNED,binary,10,3,0 user input
46-and Bundle_id,INT UNSIGNED,binary,10,3,0 user input
47-live_audio_url,VARCHAR,utf8,255,96,0 user input
48-status,VARCHAR,utf8,255,10,0 experience processing status
49-is_onReco,TINYINT,binary,1,1,0 experience processing status
50-video_id,INT UNSIGNED,binary,10,3,0 experience processing records
51-target_id,INT UNSIGNED,binary,10,3,0 experience processing records
52-audio_id,INT UNSIGNED,binary,10,2,0 experience processing records
53-bundle_id,INT UNSIGNED,binary,10,0,0 experience processing records
54-image_id,INT UNSIGNED,binary,10,0,0 experience processing records
55-count_id,INT UNSIGNED,binary,10,0,0 experience processing records
56-search_id,INT UNSIGNED,binary,10,0,0 experience processing records 57-team_id,INT UNSIGNED,binary,10,2,0 experience processing records
58-team_ARcreator_id,INT,binary,11,0,0 experience processing records
59-is_subscribed, TINYINT,binary,1,0,0 administration trigger
60-live_target_thumb, VARCHAR,utf8,255,0,0 administration process data
61-live_video_length, VARCHAR,utf8,255,0,0 administration process data
62-live_video_thumb, INT,binary,11,0,0 administration process data
63-vertical_video, VARCHAR,utf8,255,0,0 administration process data
64-flaggedContent, TINYINT,binary,1,0,0 administration trigger
65-banned, TINYINT,binary,1,0,0 administration trigger
66-actual_gps_long, DECIMAL,binary,12,2,7 location data
67-actual_gps_lat, DECIMAL,binary,12,2,7 location data
68-ar_gps_long, DECIMAL,binary,12,2,7 location data
69-ar_gps_lat, DECIMAL,binary,12,2,7 location data
70-virtual_gps_long, DECIMAL,binary,12,2,7 location data
71-virtual__gps_lat, DECIMAL,binary,12,2,7 location data
72-showcase_active, TINYINT,binary,1,0,0 administration data
73-showcase_rank, TINYINT,binary,1,0,0 administration data
74-showcase_view_count, INT,binary,11,0,0 analytics data
75-reco_view_count, INT,binary,11,2,0 analytics data
76-device_test_view_count, INT,binary,11,0,0 analytics data
77-deviceTestingToken, VARCHAR,utf8,255,4,0 analytics data
78-support_id, INT UNSIGNED,binary,10,0,0 administration data
79-whitelabel creator_id, INT UNSIGNED,binary,10,0,0 licensing records Shown in FIG. 12 is an example process flow 1200 for creating AR content. Process 1200 can be executed on an AR system/platform, and in some examples as part of the process shown in FIG. 8. Shown in FIG. 13 is another process flow 1300 for creating AR content, which shows an example process flow for generating AR content based on a content type. According to one example, a video AR content type can be created via execution of the process shown in FIG. 13. The process begins with upload of video AR content. In some embodiments, this can trigger video support functions, or trigger video support APIs for processing video content. In various examples, the video content can be encoded in MP4, MPG, x-mastroska, QuickTime, .MOV. etc. In further examples, the process can handle HD video (e.g., 16×9 HD video). The process continues with creation of a transcoding job record. As is known, transcoding of video files converts one or more formats to another and in this case is used to enable streaming of the AR content to multiple devices on multiple platforms. In one example the output is a 16×9 HD video for 1280×7 20 MPEG-4 format. Default settings are used for audio and other parameters of well. The result is a video AR output, and the process continues with temporary storage cleanup and media storage with capture of any additional data at a data recording step.

Figure 14:
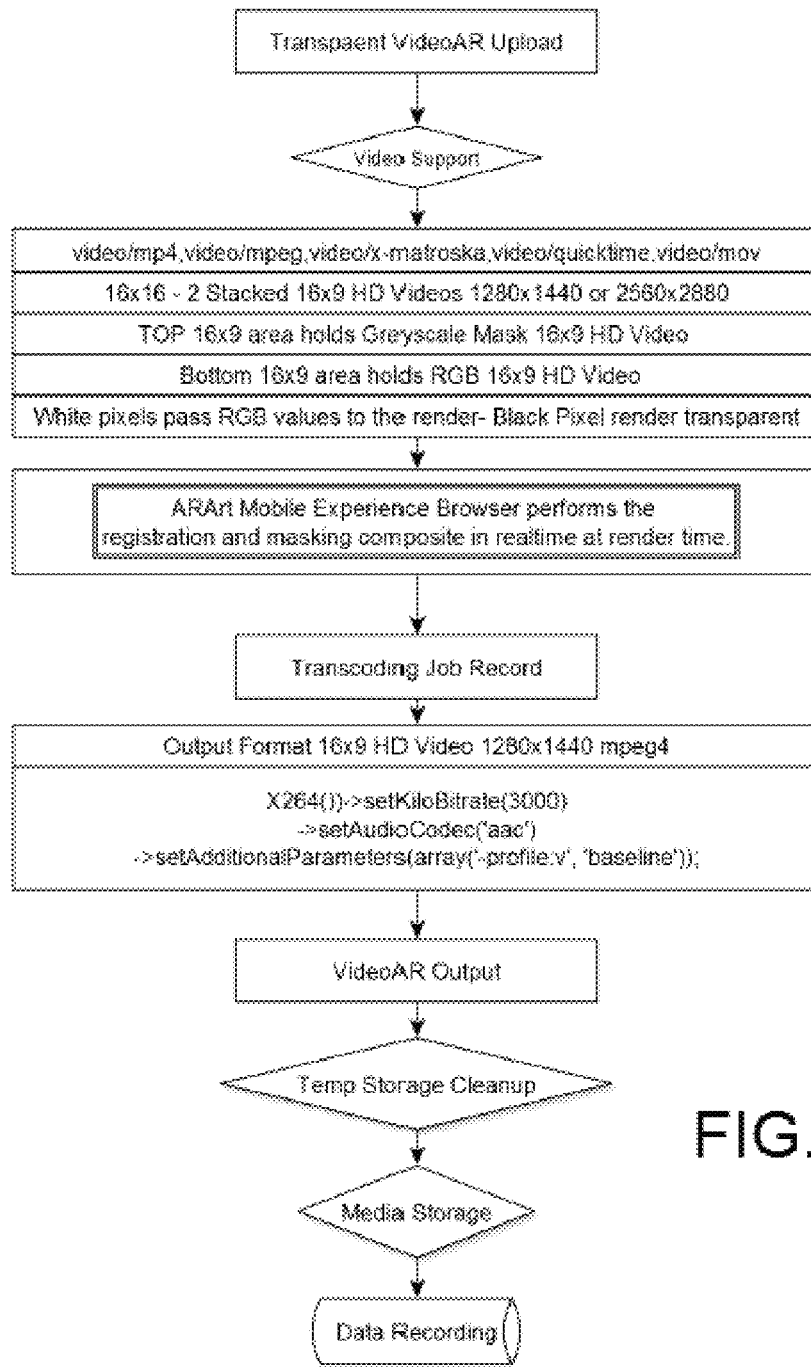
FIG. 14 is a process flow for generating a transparent video AR content type, according to one embodiment.

FIG. 14 shows a process flow for another content type, transparent videoAR. The process continues with video support which can include calling external services for processing, load balanced servers for managing execution, video transcoding servers, and/or APIs for handling transcoding. In some examples, the video supported can include MP4 video X video QuickTime video MOV, various HD video, formatted video with grayscale masking, RGB video, and various transparent transformations (e.g. white pixel passes RGB values to the rendering process black pixel rendered transparent). In various embodiments, the process executes registration and masking composites for the transcoded video in real time, and at requested rendered time. The process continues with creating a transcoding job record and generating an output format (e.g. 16×9 HD video, etc.). The output video is stored in a media storage device while temporary storage cleanup is executed. Additional data can be recorded in conjunction with the output video through a data recording step.

Figure 15B:
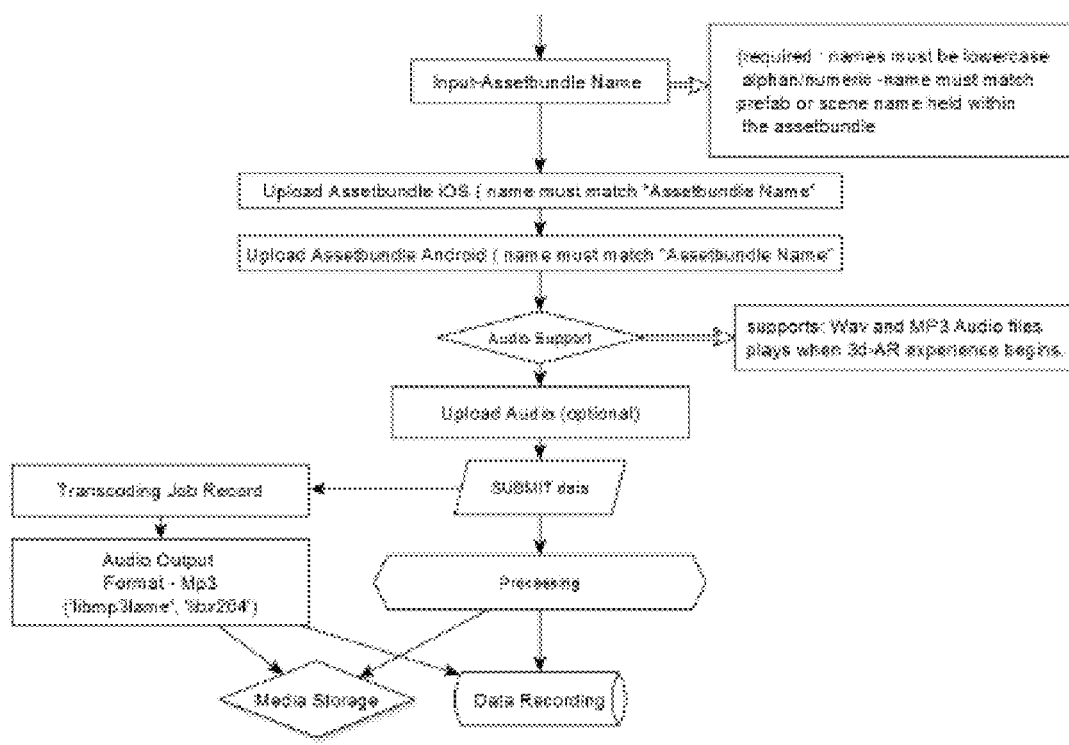

FIGS. 15A-B show an example process for generating AR content based on a 3D AR type. The process shown in FIGS. 15A-B invokes 3D support. According to one embodiment, an API can be executed to connect to the known UNITY platform to employ prefab or scene asset bundles. According to other embodiments, the platform and/or system can attach to the unity platform and call various video processing functions for use in developing AR content.

In other embodiments, different video processing platforms and/or services can be called as part of processing three-dimensional AR. According to one example, the process continues with input of an asset bundle name. In one example, the specific format as required (e.g., names must be lowercase, must match prefab or see name, etc.). In other examples different naming conventions can be used. The process continues with uploading of an asset bundle for respective processing platforms (e.g., iOS, android, etc.). Processing may include audio support functions, and provide support for WAV and MP3 audio files. In various embodiments there is an optional step for uploading additional audio. The process continues with submission of the data and construction of a transcoding job record. The output files including audio output can be saved to media storage in conjunction with processing of the video files and saving the video output to media storage, where any associated data can also be saved in the data recording step.

Figure 16A:
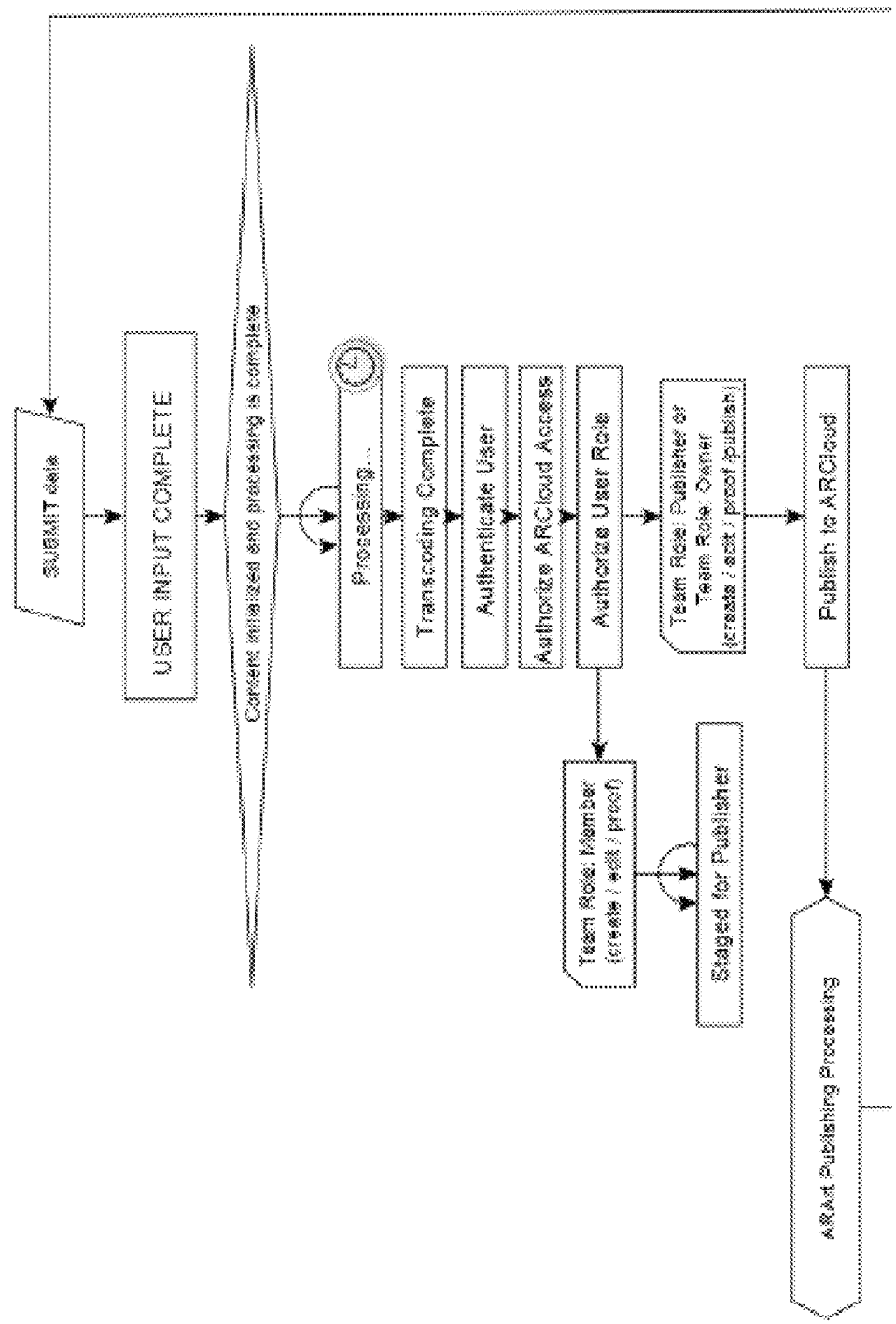
FIGS. 16A-B are an example embodiment of a process flow for publishing generated AR content.
Figure 16B:
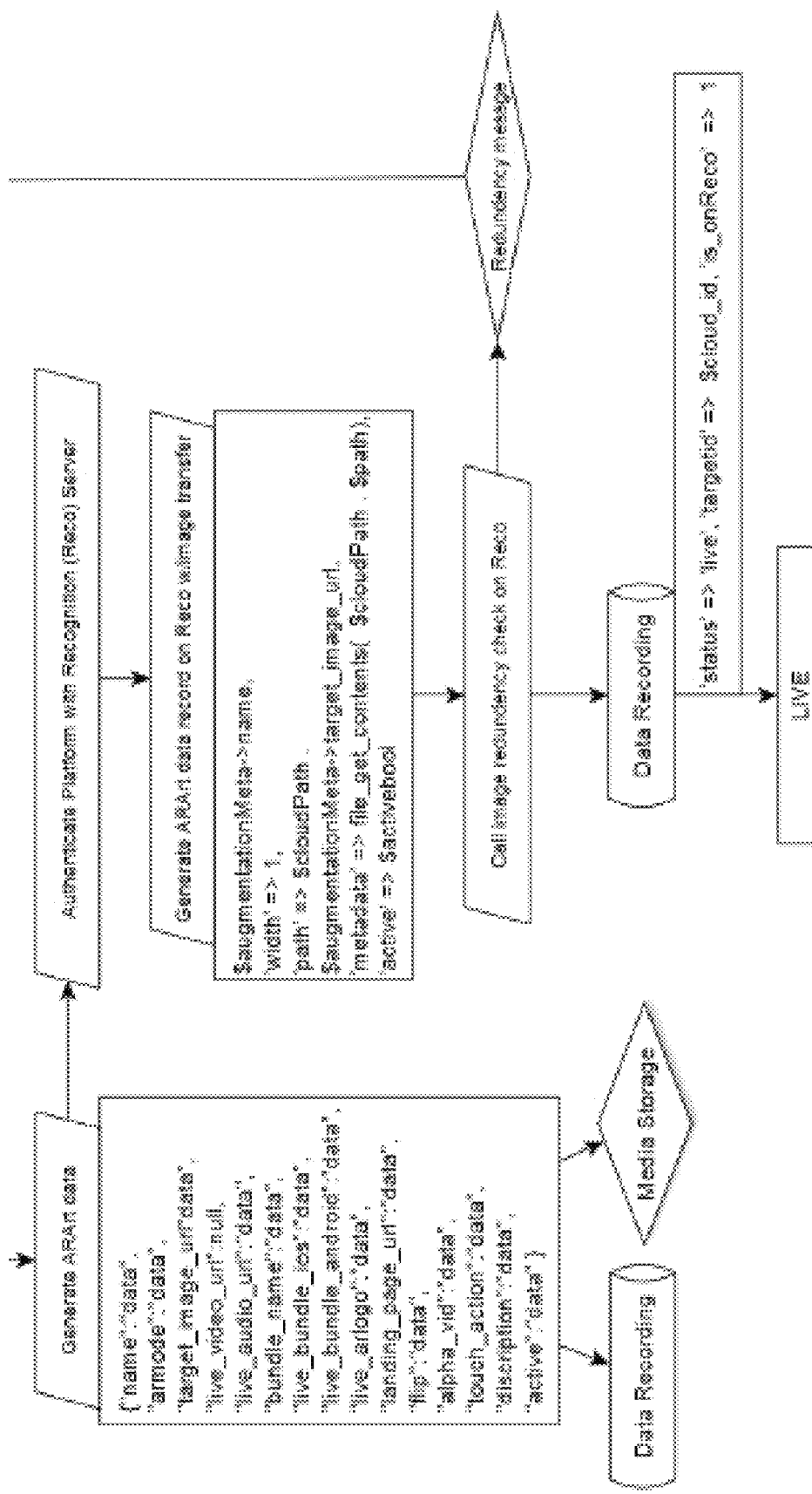

FIGS. 16A-B show an example embodiment of a process flow for publishing generated AR content. The process begins with submission of data by an end user. In one example, the system guides the user through creation of an AR experience. Once the user input is complete, content is initialized and the content processing is completed.

As part of completing processing, any transcoding, user authentication, storage access (e.g., cloud access, etc.), authorize user role, authorized user role based on team membership, is executed. Processing includes staging the processed content for content generator. Once accepted by the content generator, the AR experience can be published to a cloud structure, pushed to designated users, or can be made public.

In response to user selection, the system executes publishing processes to make the AR experience available as instructed. Making the AR experience available includes generating an AR experience data structure and may incorporate functions specific to the AR experience as discussed herein. In some examples the process may continue with an authentication platform developing a recognition profile or fingerprint. The authentication platform may perform validation checks including image redundancy checks (e.g., same image or fingerprint exists on the system already). If redundant, the process generates an error and can return to the beginning steps. Otherwise data is recorded and made available for searching to match on the AR experience. The AR experience itself is now live for execution.

Figure 17:
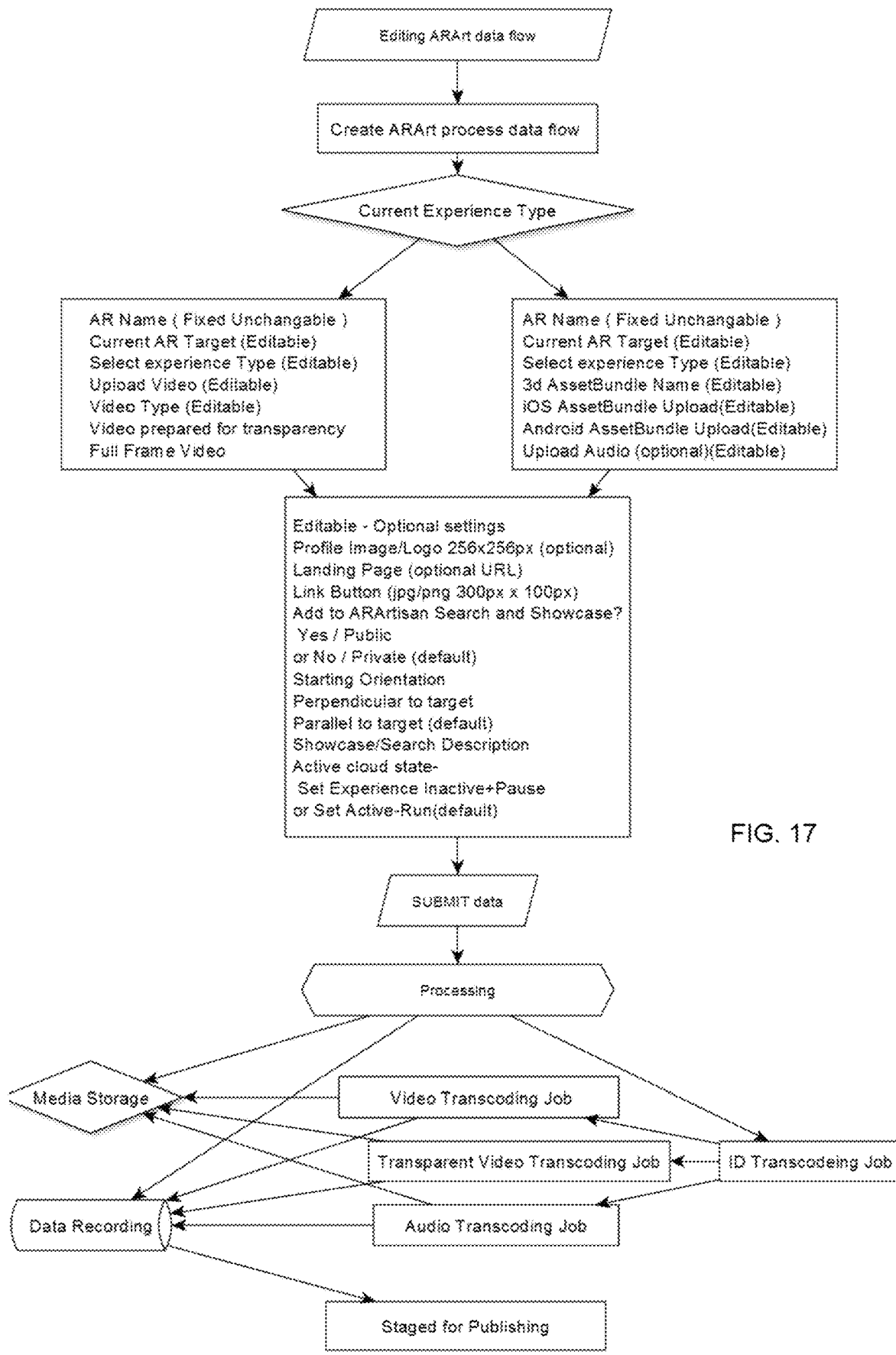
FIG. 17 is an example process for editing an AR experience, according to one embodiment.

FIG. 17 illustrates an example process for editing an AR experience. In various examples, the process shown can be called by other processes (e.g., FIG. 8). Returning to FIG. 17, the process shown provides details for fields, data records, and options that can be edited as creation. Some fields are designated as unchangeable or fixed, however other embodiments permit editing of even these features. Once edited, the submission of the new information and any processing proceeds similarly to original content generation and the processes discussed regarding those functions.

Figure 18:
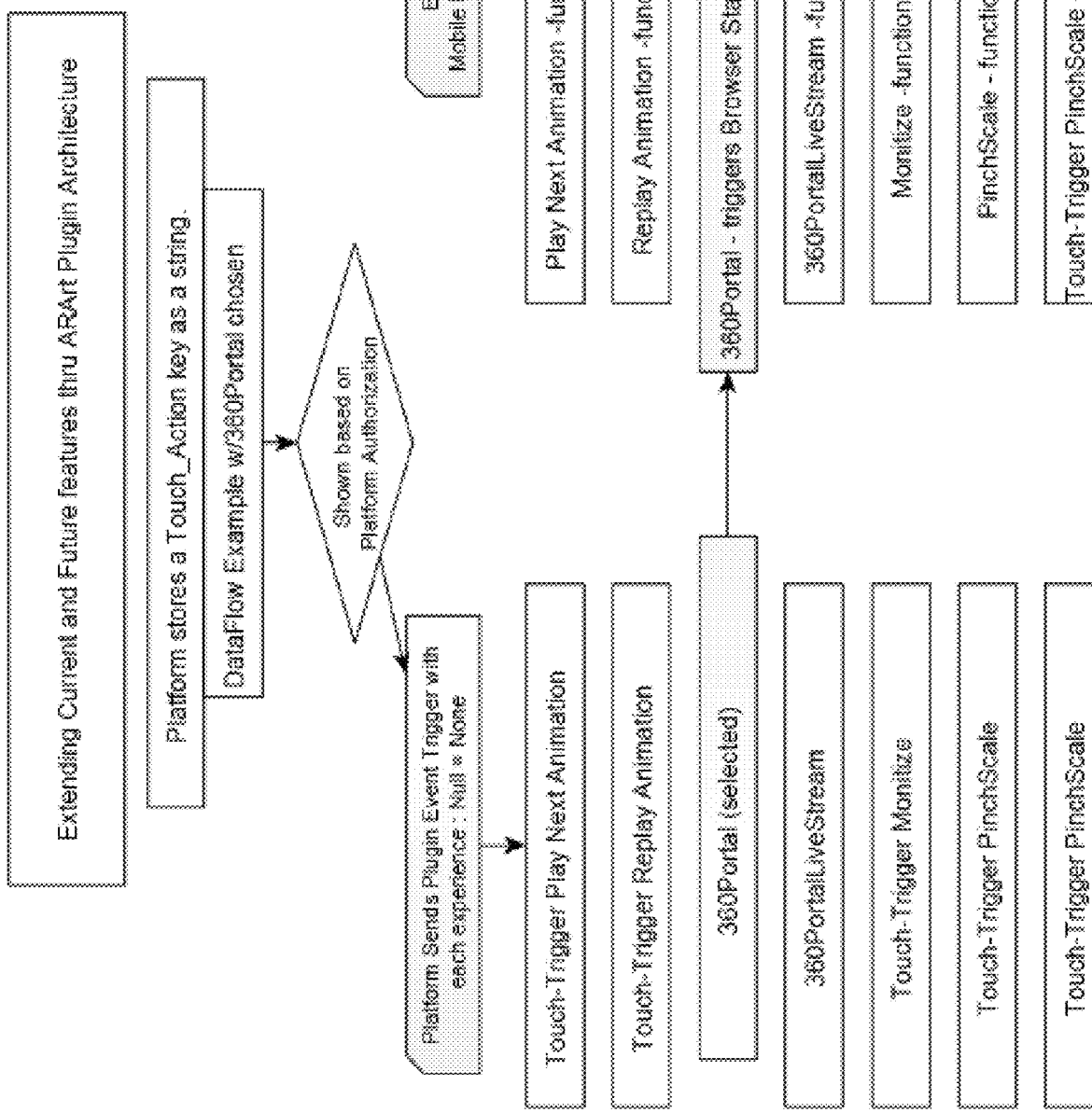
FIG. 18 is an example flow and example of trigger based execution, according to one embodiment.

Various embodiments of the system includes a set of key value pairs which allow for plugin integration. For example, the key value pairs enable triggering of plugin functionality and enables an AR experience to trigger an array of events related to how the AR experience is rendered, and or interpreted when requests are loaded. In various implementation, the system is configured to integrate plugin functionality into any offering, and provides for integration of updated functionality as device capabilities expand. In one example, the system is configured to extend a feature set to include other current and future features using this key's "value" (e.g., triggering a matched set of function which overrides the default Video-AR and 3D-AR base functions with extended or new functionality pathways and data interpreters, among other options). According to one embodiment, features integrated into the AR application (e.g., Experience Browser) are configured to listen for this key trigger (e.g., which can be sent with every AR experience). In one example, the key trigger is set to a default of null —which performs base Video-AR and 3D-AR load and render functions without modification. FIG. 18 illustrates an example flow and examples of trigger based execution (e.g., plugin integration), according to one embodiment.

According to some embodiments, the system is configured to integrate datasets representing (A) desired placement location, (B) a position of a known location relative to the desired placement location, and (C) the current user location. According to one example, the content creator (e.g., creator of the AR experience) supplies (A) the desired GPS location of the experience as the experience trigger point. In one example, (B) is derived from an offset 50 meters North and 50 meters higher in altitude of (A). Providing a vector relative to north and a point on the globe relative a user's (C) data point. The system is configured to trigger various AR experiences responsive to a user entering a defined area. In one example, a user entering a defined radius surrounding a target will be notified to the experience's proximity. The system provides this signature notification to informs the user that an AR experience is within viewable range.

According to various embodiments, active user location and the triangulation to initialize and display the experience relative to the user's position will be provided to the device during its initial plugin-based architecture path. In one example, the format includes 4 gps location sets (Long and Lat) to support Triangulation and Trilateration. In various embodiments, the AR system can surface GPS co-ordinates on the platform to enable searching by GPS coordinates to find AR experiences, and/or AR functionality to capture and re-use.

Example Functionality: Location Based 3D-AR Loading via Blockchain.

According to one embodiment, the system integrated location based blockchains to provide blockchain list distribution protocol for serverless, device driven AR Experience placement and tracking. In a blockchain (linked list) the system can continuously add/update data as GPS based positioning of AR experiences as they are created moved or removed from the AR platform. In one example, the blockchain list consists of the known coordinates of all GPS based experiences. The AR application (e.g., the AR Experience Browser) checks for contemporaneity of the data and stores the list which allows each device the ability to triangulate the experience location (and e.g., without transferring their location data repeatedly to the platform servers). According to one embodiment, this localized set of data points to refines the positioning as a user's device moves relative to the AR experience. For example, the experience is rendered with in its desired location and upon placement is tracked using optical tracking along with device motion (and e.g., device compass data) to maintain 3d tracking throughout the experience.

Example Analytic Events and Triggers

Figure 19:
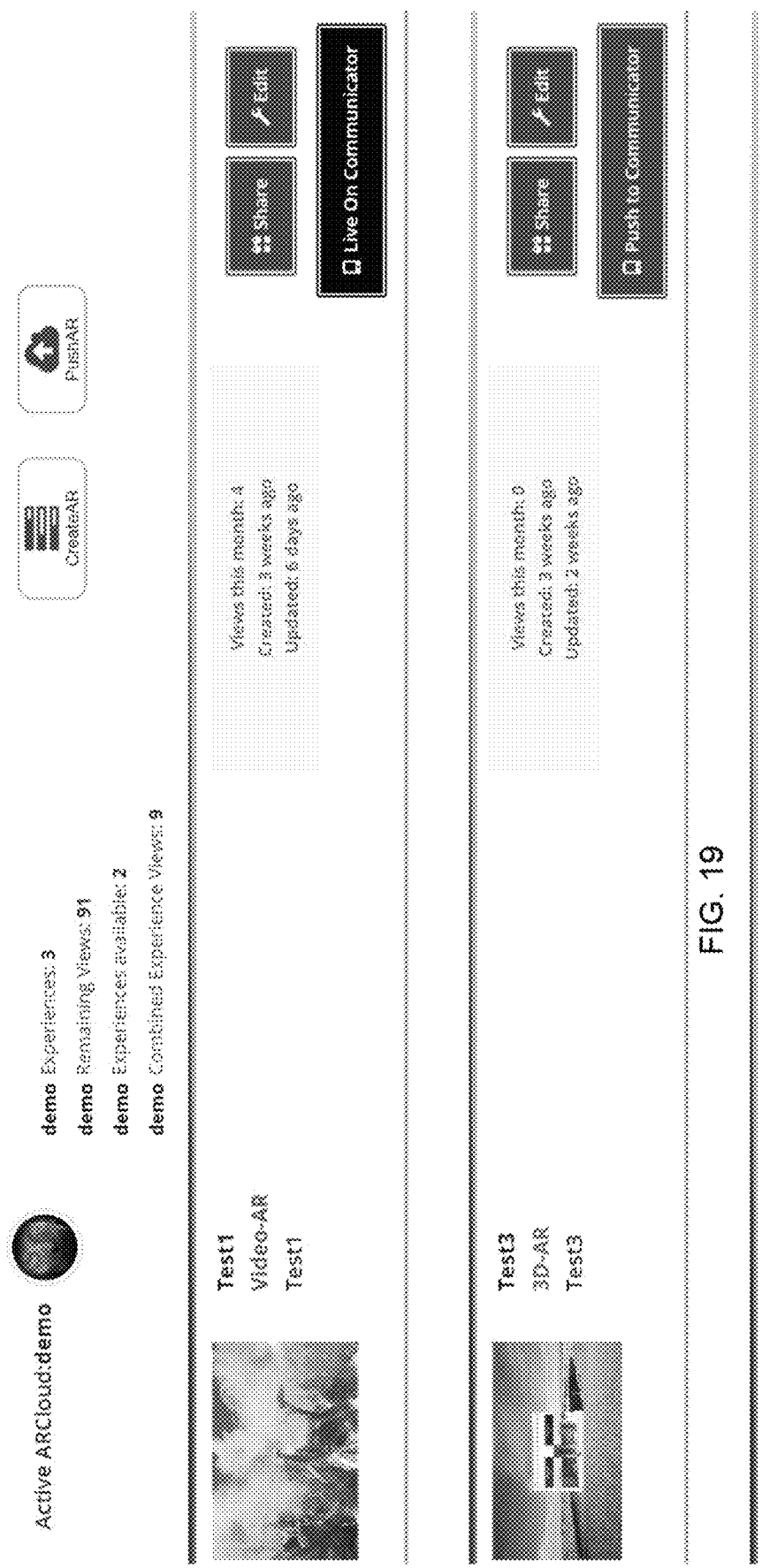
FIG. 19 is an example user interface, according to one embodiment.

According to various embodiments, the system is configured to capture analytic information on various system executions. For example, records are refactored and updated on at least one or more of the following platform events:

Cloud Create, Delete
AR Experience Published, Edited, Deleted
Subscription Created
Subscription Change
Cloud Invitation Sent
Cloud Invitation Accepted
Cloud User Removed
Cloud Deleted
Authenticated Browser Loaded Experience
Example User Interfaces: View Counts and Team Counts Display According to various embodiments, users can access a variety of UI screens and information on AR experiences. In one example, a user's Home page displays Analytics data for any active cloud containing content. Shown in FIG. 19 is an example UI providing information on: ARCloudName Experiences: 3 ARCloudName Remaining Views: 91 ARCloudName Experiences available: 2 ARCloudName Combined Experience Views: 9. Each AR Experience with in the active cloud can be displayed along with their individual Monthly View Counts, Created and Updated timestamps. For example, shown in the UI is: Views this month: 4 Created: 3 weeks ago Updated: 6 days ago.

According to one embodiment, pushing an AR experience to a device facilitates testing, proofing, pre-published review, approval, communication, and private sharing of experiences. In on example, users with Access Role of "Member" (edit and create) and Access Role of "Publisher" (edit, create and publish) may select an experience from their ARCloud to be made available on their device and the devices of those who have been authorized as ARCloud members "Audience" or higher. In various embodiments. each AR experience can be associated with a "Push to Device/Communicator" option. In some embodiments, clouds may have one experience pushed to the Communicator at any given time. The chosen experience pushed to the device is indicated as "Live on Communicator" and may be changed at any time.

According to one embodiment, testing on the system can include using a key value pair (e.g., similar to plugin integration) with key:value database relation within the AR format held as "deviceTestingToken" to be validated during API data calls.

Figure 20:
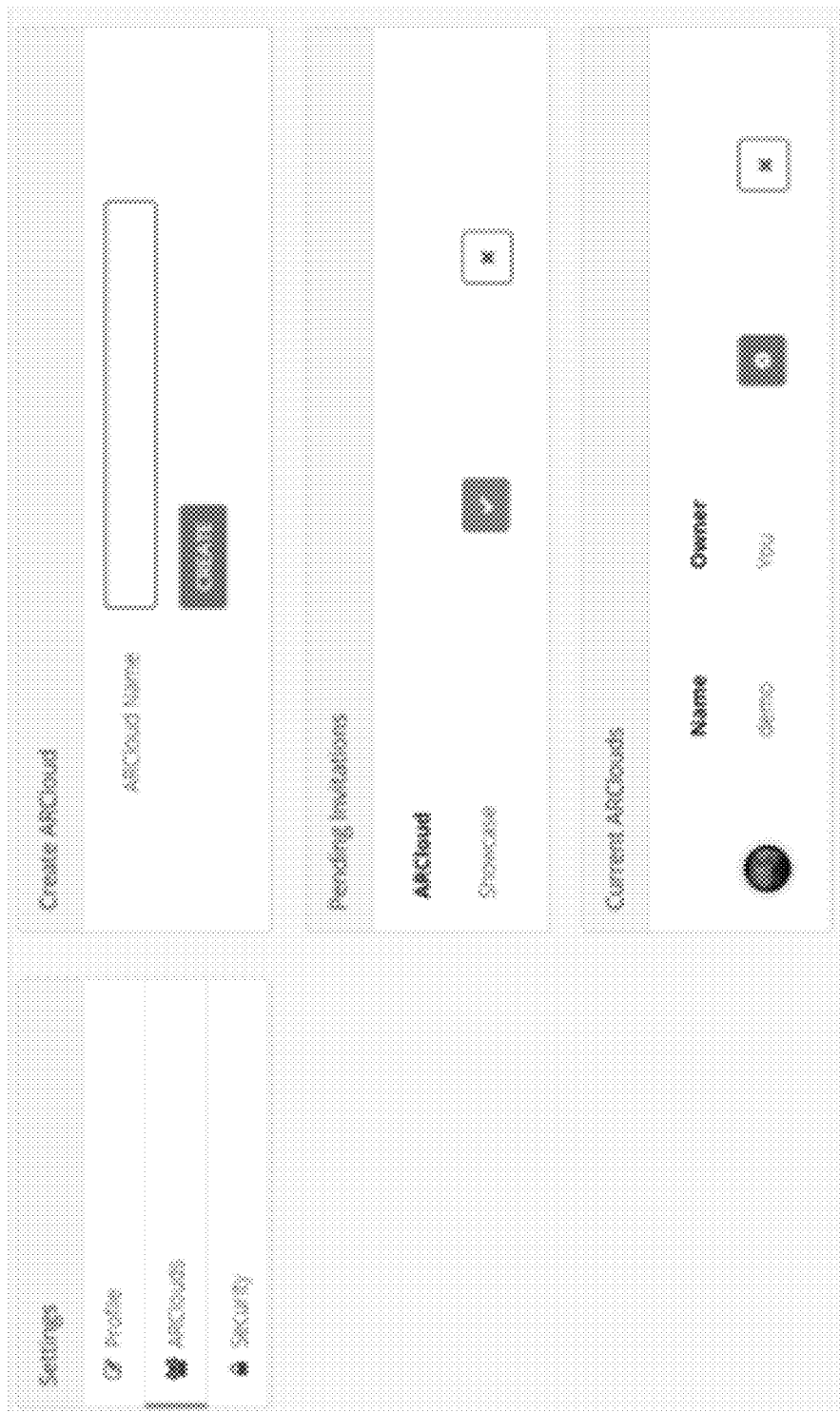
FIG. 20 is an example screen shot of a user interface for cloud repository creation and management, according to one embodiment.
Figure 21:
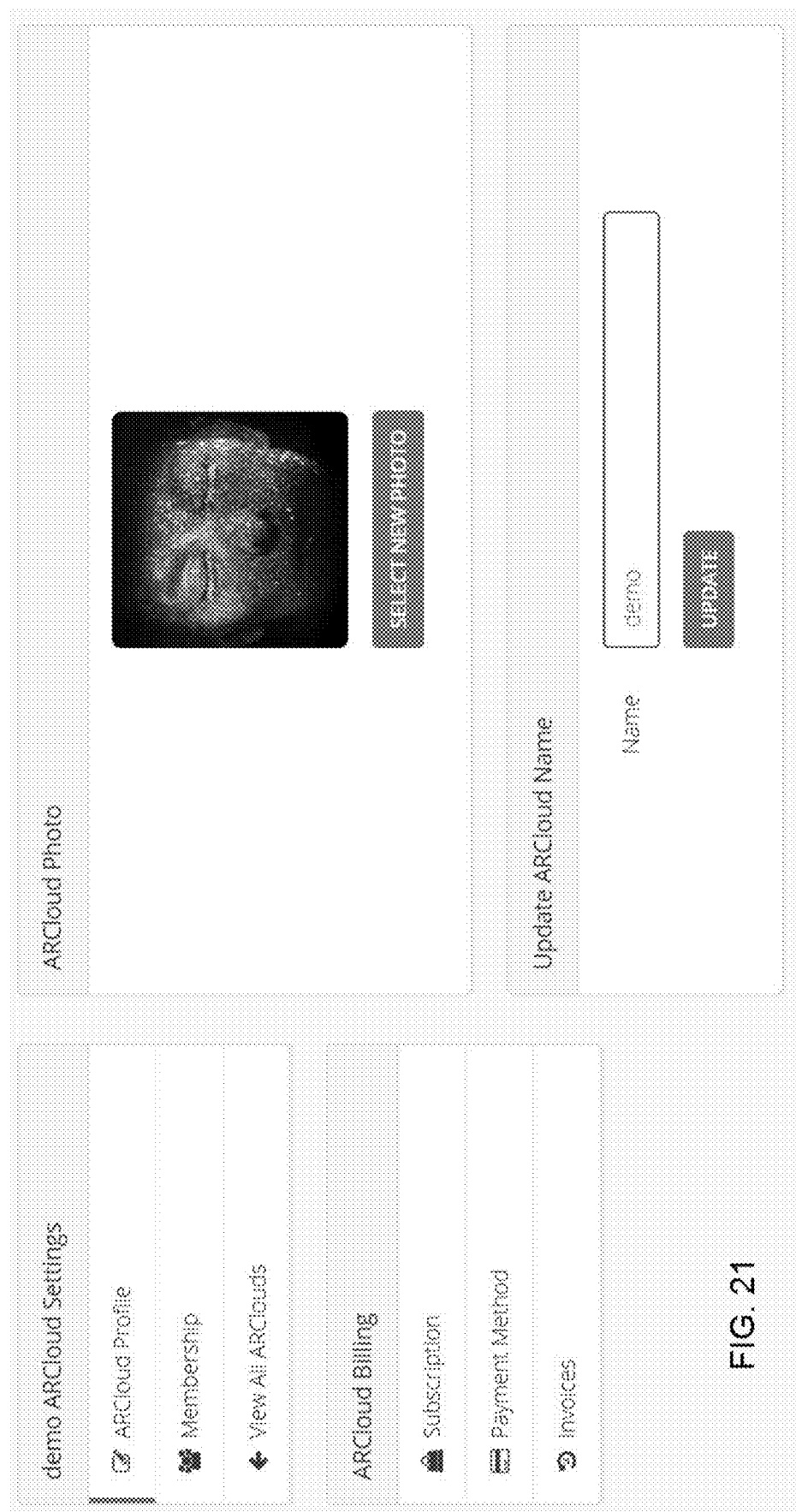
Figure 23:
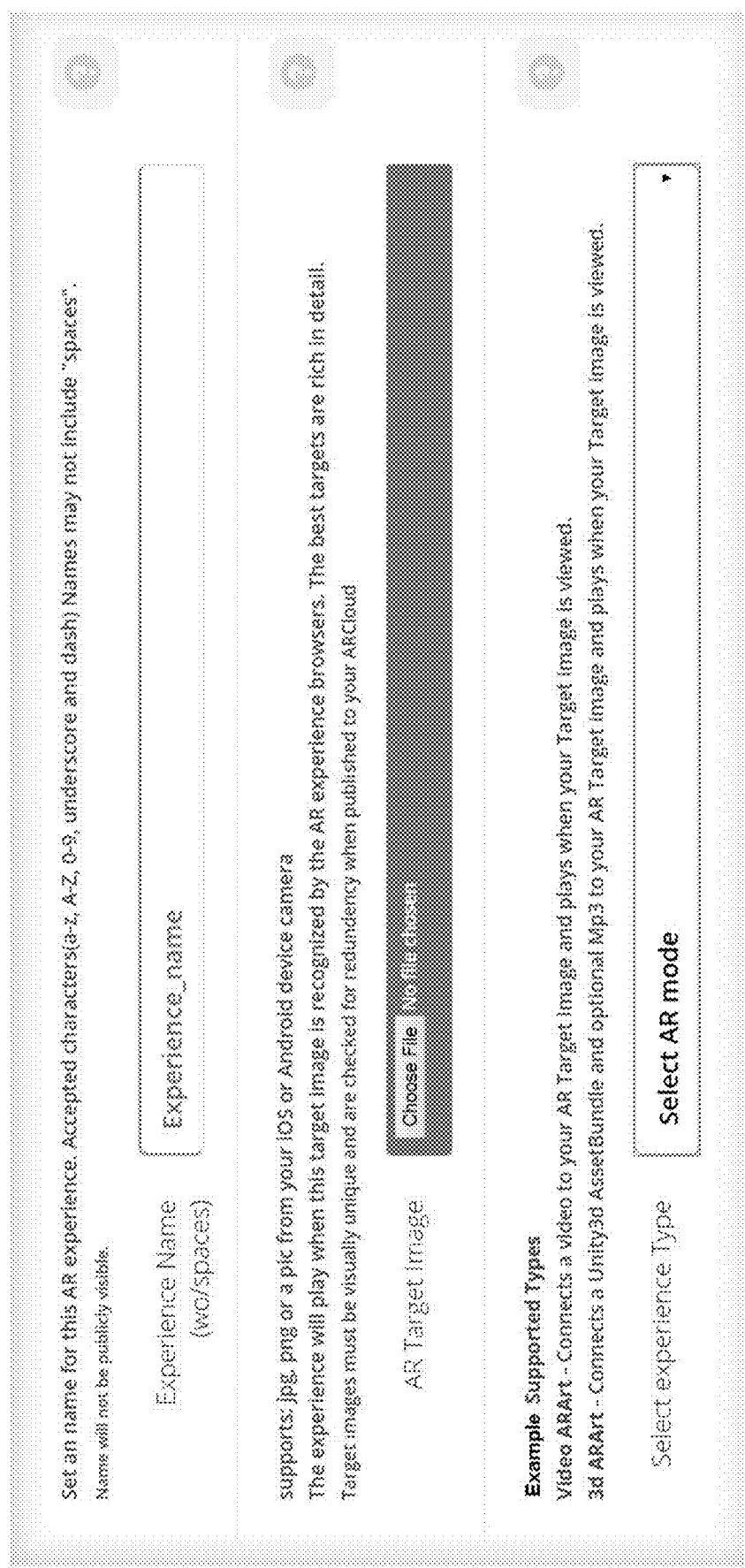
Figure 24:
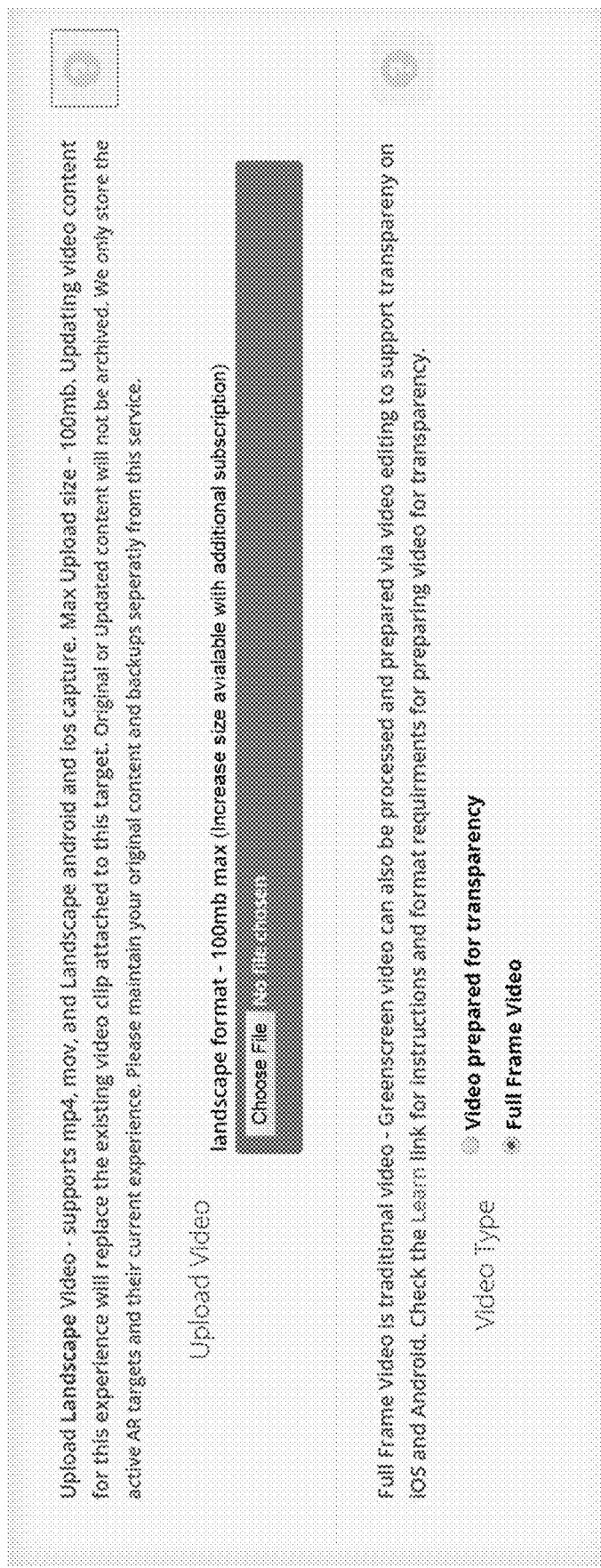
Figure 25:

FIG. 20 is an example screen shot of a user interface for cloud repository creation and management. Content creation users can create various "clouds" to store content, and specify specific users, or groups of users who can access them. Various roles can be assigned by the cloud administrator. FIGS. 21-22 are example screen captures showing additional administrative options, according to one embodiment.

FIG. 23-26 show screen captures of user interfaces for creating AR experiences. As shown, the system directs users through AR experience creation based on selection of an experience name, a content target (e.g., an image), and AR content files. According to one embodiment, the system enables generation of an AR experience in as little as three selections in the displayed user interface. According to various embodiments, users are given displays that produce AR experiences without any programmatic requirement on the end users. As discussed above, the system links pre-programmed functionality and AR effects to drop down selections. In some embodiments, different AR experience types can be selected in the user interface to trigger generation of different AR experiences (e.g., standard video integration, 3D video integration, etc.).

In other embodiments, different user interfaces can guide users through selection of content targets and integration of AR content with the content target such that, for example, image recognition executed on the content target can then trigger the integrated AR content experience. In various embodiments, the AR content can be delivered to a user device as a content stream, which limits the computing requirements on the devices being used to visualize the respective content.

Example AR Application Embodiments and User Experience Examples

According to another aspect, the system provide and interacts with a universal AR application. The AR application can be downloaded and installed on a user device. For example, the AR application can include a universal augmented reality experience browser (AR Browser) which the public and private users can execute to view, share, load, and experience user generated AR experience created through the system/platform.

According to one embodiment, the AR Browser provides the connections, logic and security to initialize and load the specific aggregation of data (e.g., defined within the system format) to execute AR experiences. For example, upon initializing the data format, a chain of events parse, define, request, consume and prepare the AR Media (e.g., user supplied information in the form of text, digital imagery, digital video, 3d geometry, animation and digital audio, etc.) required to deliver and display the AR Experience on a user's mobile device.

According to various embodiments, the Experience Browser utilizes several methods of loading AR experiences and facilitates the display of the AR Media to the user. According to further embodiments, the data flow begins with the consumption and processing of an AR file format. The data format may be delivered to the AR Browser via several defined methods or modes or operation, which can include any one or more of the following:

AR Cloud Scan: Image recognition of user-defined AR Experience trigger images which have been published thru the AR Platform.

AR Camera: Which places the last viewed AR Experience using a temporary image the user shoots with their device camera. The AR format stored as the "Active AR" or loaded experience is initialized and connects the AR Media to this temporary image.

AR Showcase: Displays a feed of publicly accessible AR Experiences and upon selection loads the AR format into the "Active AR" slot for use in the AR Camera.

AR Communicator: Authenticated users may directly load AR Experiences from their ARClouds or ARClouds which they have been invited to. These AR Experiences load AR format into the "Active AR" slot for use in the AR Camera for display.

According to one embodiment, the AR application enables AR viewing for a broad audience (e.g. with the Augmented Reality Experience browser) which interprets, manages, brands and displays AR Media based on specific data pathways defined by the system and triggered by a standardized low-bandwidth AR file format of the system. Unlike conventional web browsers which provide click based hypertext (e.g., that initiates requests on a user input click—then parses the returning data, then renders result) the AR Experience Browser provides a recognition based hyper image that upon recognition of an established AR Target triggers an AR experience. For example, upon recognition of a content target the AR application is configured to parse the returning data (e.g., AR data format and data structures), initiate the call(s) for media streams (e.g., via connected services, servers, and/or API calls) and render the collective results within a three dimensional space (e.g., between the users device and the target image). In conventional implementation, traditional web browsers are primarily a 2D local viewing experience, where the user scrolls the page of results. In contrast, the AR Application (e.g., AR Experience Browser) provides primarily a 3D mobile viewing experience, where the user orients and/or interacts with the AR experience via their movement or rotational touch controls. In another example, where traditional web browsers display result in front of user, the AR Experience Browser displayed its media in 360 degrees, for example, surrounding the target image.

According to other embodiments, the AR application is bundled and made available as an AR Experience Browser configured to connect/manage the resources needed to parse, trigger requests, load and display Augmented Reality Experience from a scalable media cloud resources (e.g., including user defined clouds of user generated AR content). As discussed, the AR system generates such experiences according to a lightweight consistent data format. In one example, this micro format file includes a set of instruction triggers which initiate decision trees upon being interpreted by the AR application. In further example, the base file format is configured to enable separation from the creation system(s) and also to offload the interpretation computations to the Experience Browser, which then handles all media loading and display needs.

According to one embodiment, the AR application forms an interpretation layer configured to enable multiple types (e.g., various AR content types) of experiences to be generated. As discussed above, various user inputs are defined and stored with in the format file when creating an experience on the AR Platform. In some examples, the AR application is programmed with parsing and branched functionality routines that query the data (e.g., from the AR data format file) upon recognition or a use of the AR camera. For example, in AR Scan mode, the application executes image recognition functions to identify images, object, people, scenes, etc. that may be associated with AR content. Upon matching any visualized (E.g., via the camera) object to a defined content target the AR application then triggers an associated AR experience. According to various embodiments, the interpretation layer enables the proper logging, audio, video, and 3D content preparation (e.g., service call, API call, function request, etc.) specifically for each AR experience type, and the AR system is also configured to deliver and support such execution with a framework that enables integration of extending features and additional functionality with the platform resources or resources connected to the platform.

An example of the lightweight file format includes at least 16 data points identified below, although in other embodiments additional data points can be included (e.g., to call additional functionality).

```
{
    "name":"",
    "armode":"",
    "target_image_url":"",
    "live_video_url":"",
    "live_audio_url":"",
    "bundle_name":"",
    "live_bundle_ios":"",
    "live_bundle_android":"",
    "live_arlogo":"",
    "landing_page_url":"",
    "live_cta":"",
    "flip":"",
    "alpha_vid":"",
    "touch_action":"",
    "discription":"",
    "active":""
}
```

The following content format type examples are provided to illustrate example functionality and encoding. The examples are provided in decrypted format for understanding (and for example, are produced with domain names removed from paths). In various embodiments, "AR mode" and "touch_action" strings enables two Trunk/Branch levels of expandability. In various examples, additional sub-branch nodes and null status trigger events based on values specific to the experience can be included to expand functionality.

VIDEO AR Example

```
{"name":"time-292c1c8852784","armode":"Video-AR",
"target_image_url":"1_23_time-292c1c8852784/278_1_time-
292c1c8852784.jpg","live_video_url":"https://s3.amazonaws.com/arartisan-media1/1_23_time-
292c1c8852784/51d4b5c3fd06445c07094ccd35453163_1_id_90.mp4","live_audio_url":null,"bu
ndle_name":"","live_bundle_ios":null,"live_bundle_android":null,"live_arlogo":null,"landing_pa
ge_url":"","live_cta":null,"flip":"flip_true","alpha_vid":"false","touch_action":null,"discription":
"","active":"true"}
```

TRANSPARENT VIDEO AR Example

```
{"name":"85d36dce132e4","armode":"Video-AR",
"target_image_url":"85d36dce132e4/85d36dce132e4.jpg",
"live_video_url":"b3c57af42baefd0c8117af084f5b5fb3_1_id_80.mp4","live_audio_url":null,"bu
ndle_name":"","live_bundle_ios":null,"live_bundle_android":null,"live_arlogo":"85d36dce132e4
_logo.png","landing_page_url":"landingpage.com","live_cta":"85d36dce132e4_CTA.png","flip"
:"flip_true","alpha_vid":"true","touch_action":null,"discription":"","active":"true"}
```

3D AR Example

```
{"name":"29fe6f19fc144","armode":"3D-AR",
"target_image_url":"29fe6f19fc144.jpg","live_video_url":null,"live_audio_url":null,"bundle_na
me":"kingschamber001","live_bundle_ios":"29fe6f19fc144/3d/AssetBundles/iOS/29fe6f19fc144
","live_bundle_android":"29fe6f19fc144/3d/AssetBundles/Android/29fe6f19fc144","live_arlogo
```

-continued

```
":null,"landing_page_url":"","live_cta":null,"flip":"flip_true","alpha_vid":"false","touch_action":
null,"discription":"","active":"true"}
```

3D AR-360 Video Portal Example

```
{"name":"053f5fcb77eb4","armode":"3D-AR",
"target_image_url":"053f5fcb77eb4.jpg","live_video_url":" 053f5fcb77eb4/053f5fcb77eb4-
360.mp4","live_audio_url":null,"bundle_name":"portal360ar010_dbvr","live_bundle_ios":"
053f5fcb77eb4/3d/AssetBundles/iOS/portal360ar010_dbvr","live_bundle_android":"
053f5fcb77eb4/3d/AssetBundles/Android/portal360ar010_dbvr","live_arlogo":"053f5fcb77eb4_l
ogo.png","landing_page_url":"","live_cta":"
053f5fcb77eb4_CTA.png","flip":"flip_true","alpha_vid":"false","touch_action":"360load","discr
iption":"360PORTAL","active":"true"}
```

As discussed above, the AR application includes a number of modes of operation to facilitate user creation and/or viewing of AR experiences. In one embodiment, the AR application includes and AR Cloud Scan mode (e.g., AR Browser "sees" a target image—that matches a content target and returns the associated AR file to the AR Browser), upon execution of the resulting AR experience that content target (e.g., the target image) becomes the center point of the AR Media display.

According to another embodiment, the AR application includes an AR Camera mode (e.g., the AR Browser returns an active (last loaded) AR experience (i.e., data file). In this mode, a user defined target image acts as the center point of the display. In response to display of the AR experience, the center point of any AR Media display is adjusted by the application based on setting stored within the format file, and the resulting rendered experience will be shown according to those stored preferences. In one example, the center point of the AR experience will remain attached to the original target image location in this mode. The loading, rendering and tracking can be performed at the device level, and, for example, initialized by methods specific to each type of experience supported.

Experience Loading via Active Experience Data Embodiment

According to some aspects, loadable lists of available AR Content are configured to pass a selected file format into a holding slot. For example, this holding slot contains a single (Active AR) format file. In some embodiments, the AR application is configured to maintain a single holding slot that is ever changing (e.g., as new content is accessed) and always holds the last loaded experience. In some examples, a user can place data in the holding slot based on taking a temporary target image captured by the AR Camera. In further example, loading (of the AR experience) can be achieved via replacement of active experience data which is accessible by the AR Camera, with the most recently accessed AR experience data file.

According to various embodiments, the active AR slot is updated upon at least one or more of the following events:
AR cloud scan target recognition stores returned AR format file
Communicator OAuth Authorized transfer of the format file to the AR Browser from a user cloud account. This examples enables proofing, approvals, viewing of published or pre published experiences.
AR Showcase and Search (e.g., access to a list of publicly accessible experiences available for Direct display) and user selected transfer of the selected experience (e.g., initiating an AR file transfer to the AR Browser). In other embodiments, updating occurs with access to a list result of publicly accessible experiences available for direct display.

According to various embodiments, the AR application is configured to provide at least one or more of the following functions:
Recognize target images or location-based triggers globally and instantly display the AR Media experience connected to them.
Load publicly accessible experiences directly into the AR Brower;
Share the experience using traditional native device sharing;
Connect the experience to external web sites via link if supplied creators or sponsors;
Display a branding ID image if supplied creators or sponsors;
Enable a user's ability to control the display orientation based on their viewing p reference;
Enable a user's ability to spin the vertical axis based on their viewing angle/preference; and
Enable a user's ability to instantly mute the audio.

In further embodiments, the AR application can provide access to cloud creator functionality (e.g., for authorized users). In various embodiments, the application validates authentication and the ability to proof or view an experience from respective clouds.

Implementation Architecture Example

To aid in decision tree logic formation and dataflow validation of the invention, a prototype of the Experience browser was created. The code and external services used to facilitate the working prototype are flexible based on development language and services selected. The working prototype utilized c# and the Unity3d development environment to build out working AR Browser prototypes for iOS and Android. Specifically, the AR Browser prototype used Unity3d 2018.2 w the/Vuforia Image recognition services to store and return the AR Format file upon image recognition. Various other embodiments use different architectures and different supporting platforms. In the prototype example, the AR Experience Browser is configured to reads Unity3d 2018.2 AssetBundles as its consumable 3d content format.

In alternative implementations, alternative Image recognition services are enabled to replace the Vuforia Image Recognition service. Further alternatives include additional 3D File formats along with their needed interpreters (e.g., services, function, and/or API calls) during development. Alternate rendering engines are introduced in yet other embodiments. Although development of existing engine or AR recognition libraries differ with the alternate embodiments, the AR Browser Data Flow structure and Art format top level decision trees remain at least mostly consistent.

Figure 27:
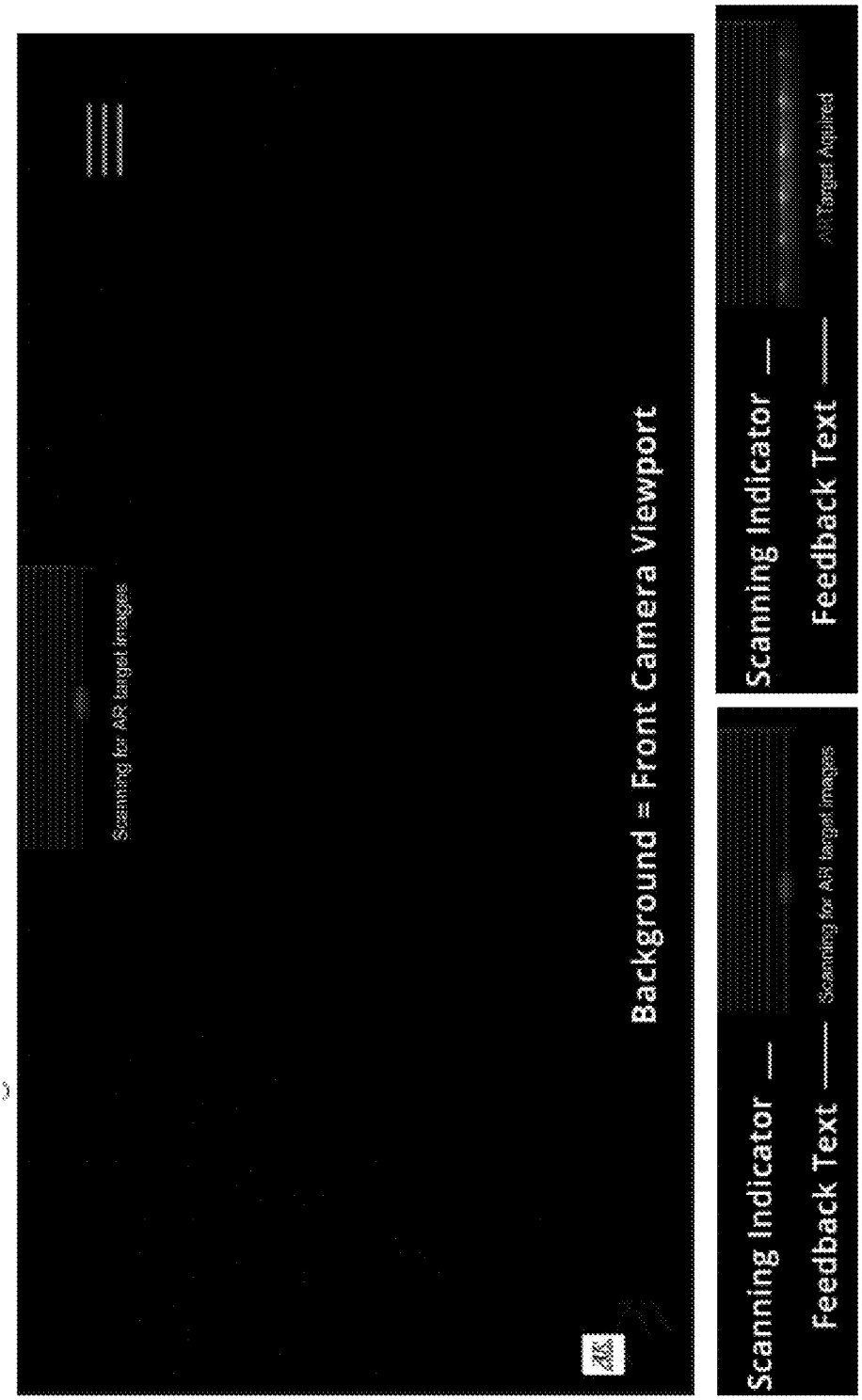
FIG. 27 is an example screen capture of a user interface for the AR application, according to one embodiment.
Figure 28:
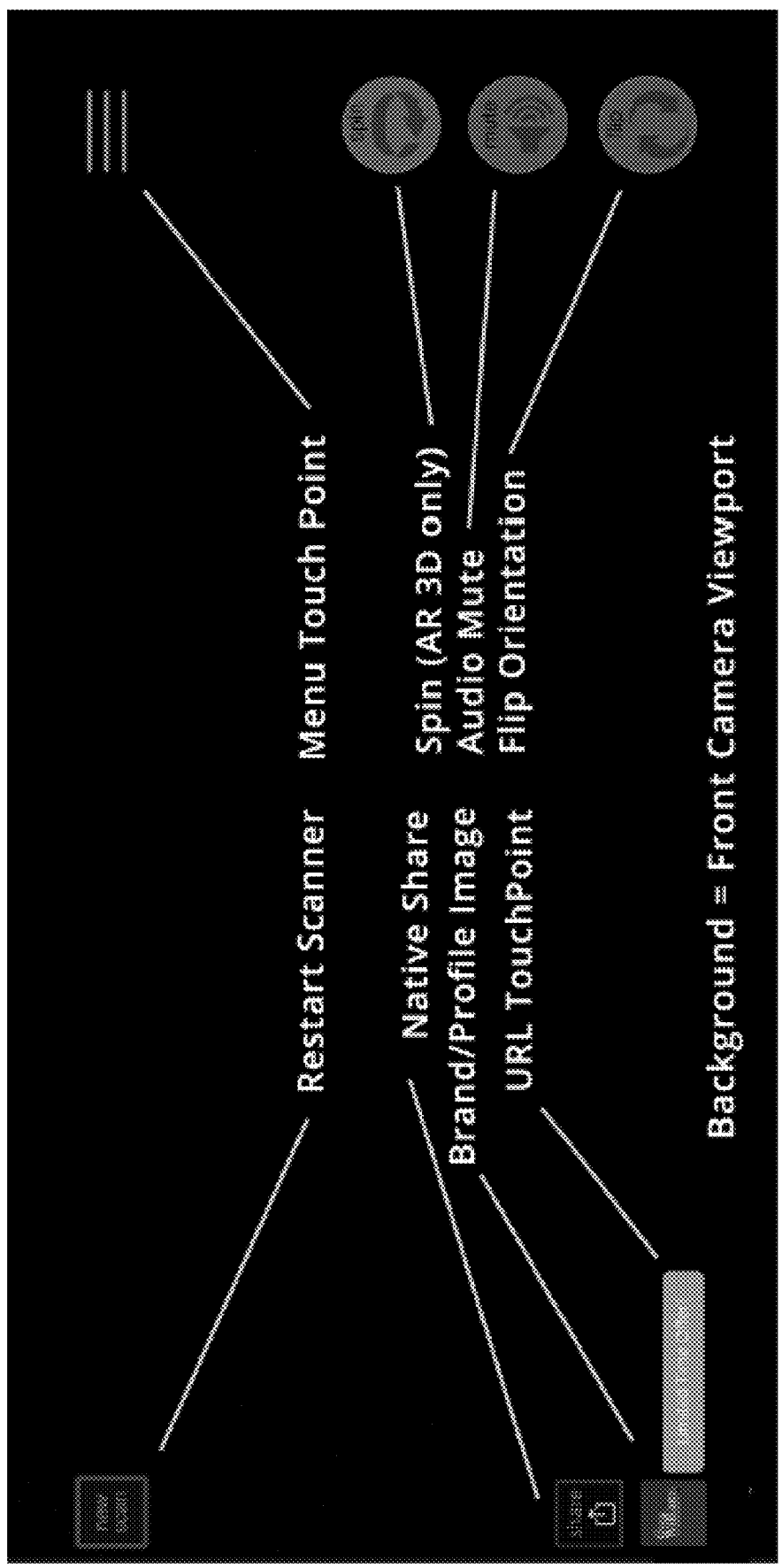
FIG. 28 is an example screen capture of a user interface, according to one embodiment.
Figure 29:
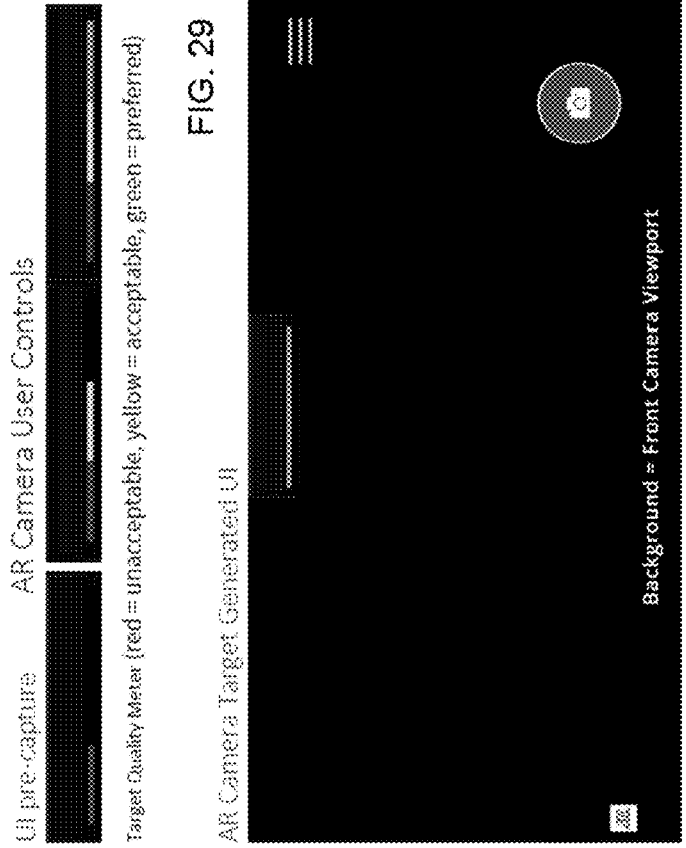
FIG. 29 is an example screen capture of a user interface, according to one embodiment.
Figure 29:
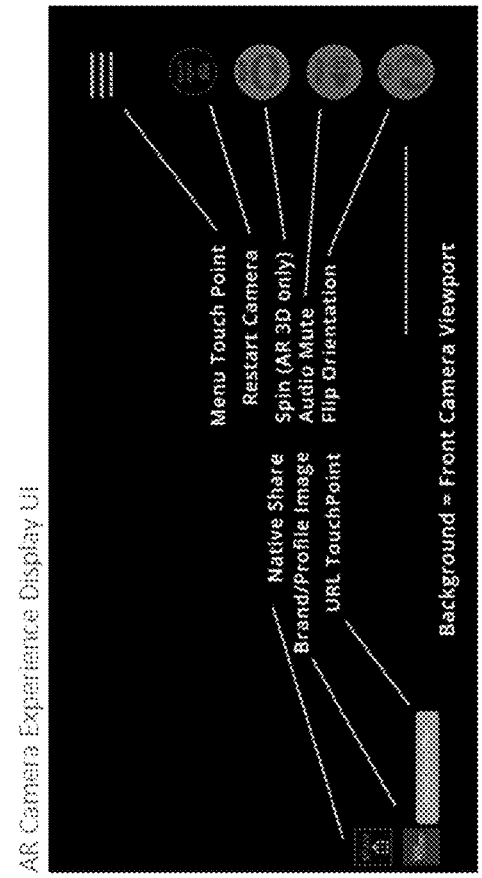

Shown in FIG. 27 is an example screen capture of a user interface for the AR application, according to one embodiment. FIG. 27 illustrates example cloud scan user controls provided by the application. FIG. 28 is an example screen capture of a user interface shown during execution of the cloud scan mode on display of an AR experience. FIG. 29 shows user interface displays for AR camera mode and experience display.

Figure 30:
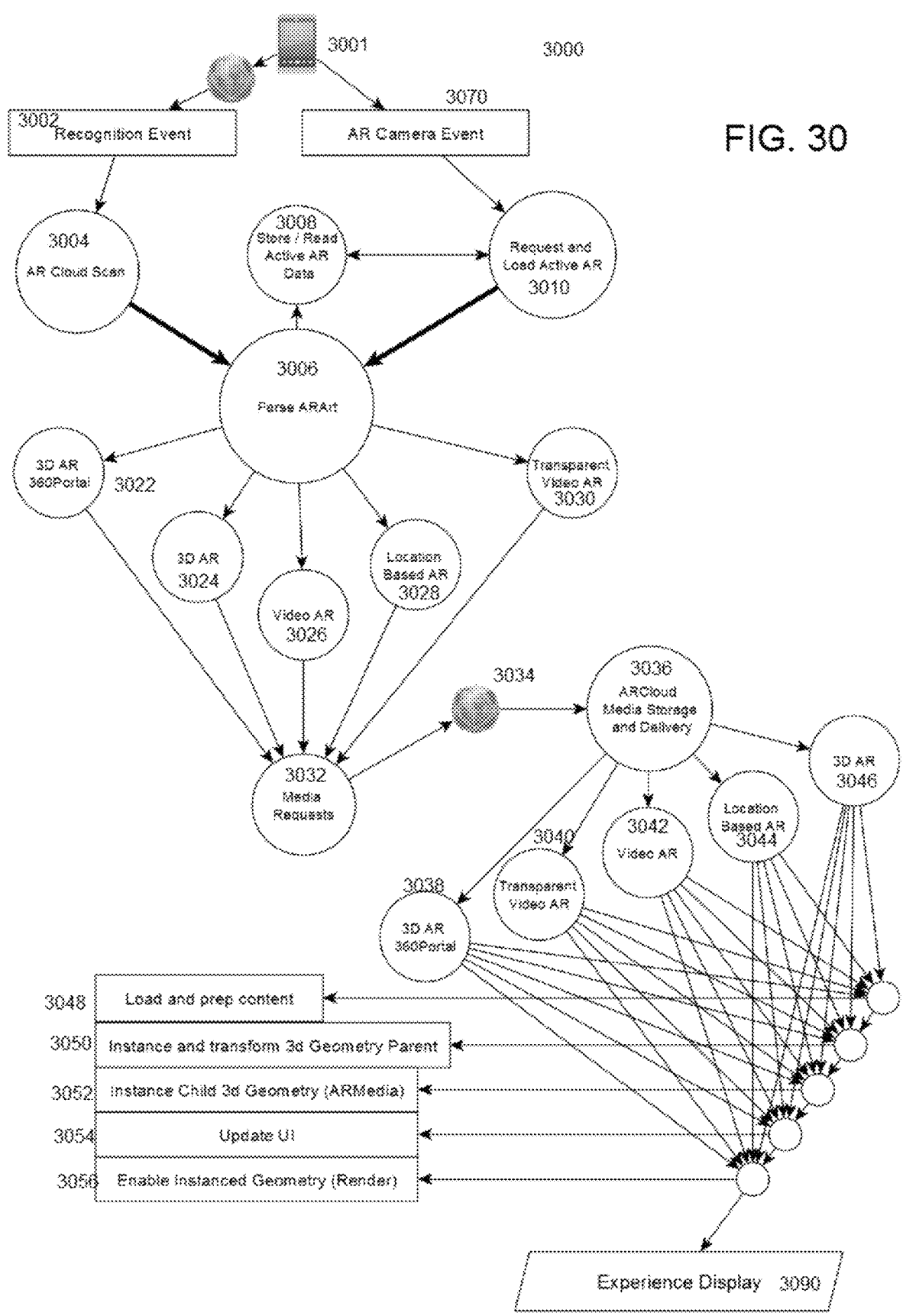
FIG. 30 is an example process for rendering an AR experience display, according to one embodiment.
Figure 31:
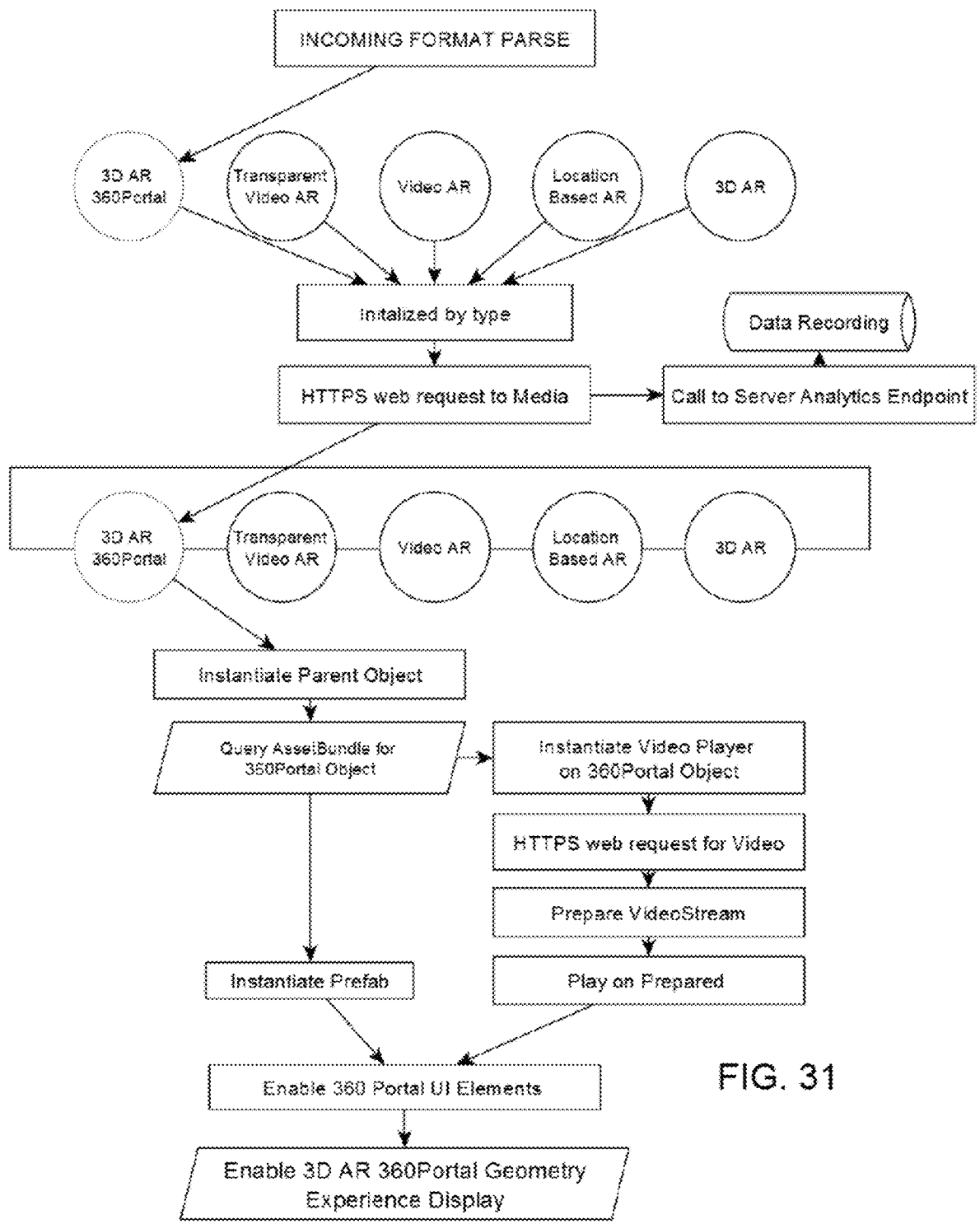
FIGS. 31-35 show example parsing data flows according to some embodiments.

Shown in FIG. 30 is an example process 3000 for rendering an AR experience display. According to one embodiment, process 3000 begins at 3001 with the user accessing a device to trigger a recognition event at 3002. The recognition event can trigger an AR cloud scan mode at 3004 which causes the retrieval of an AR data file. The data file can be parsed at 3006 (e.g., parse ARArt data file). At 3008, active AR data is read or stored. And active AR data is requested and loaded at 3010 which can result in communication of an AR data file that can also be parsed at 3006.

According to some embodiments, process 3000 continues on the respective branch based on the type of AR content identified in the AR file. In one example, this can be 3D AR 360 portal at 3022, 3D AR at 3024, video AR at 3026, location based AR at 3028, and/or transparent video AR at 3030, among other options.

Once the specific content type is identified, the associated media can be requested at 3032. According to other embodiments, multiple AR content types can be embedded in a given AR experience. For example, multiple media requests can be communicated via a communication network 3034 a media storage and delivery architecture at 3036. The architecture at 3036 is configured to capture and deliver the respective content requested (e.g. 3038, 3040, 3042, 3044, and/or 3046, among other options). For each experience the content identified in the communication is loaded and prepared for rendering (e.g., 3048, 3050, 3052, 3054, and 3056). In some examples this can include instance creation and transformation of the visualization (e.g., 3D geometry parent). In further examples this can include child 3D geometry (e.g., AR media). As needed, the user interface can be updated to accommodate any media type or the prepared content being delivered. For example once the preparation phases are completed the process flow has enabled instance geometry (e.g. rendering). The process flow can conclude at 3090 with display of the experience.

As shown the same processing steps can be access by the branch at 3070 AR Camera Event. In other embodiment a different execution order may be used, and/or various steps can be combined, omitted or executed in parallel.

Figure 32:
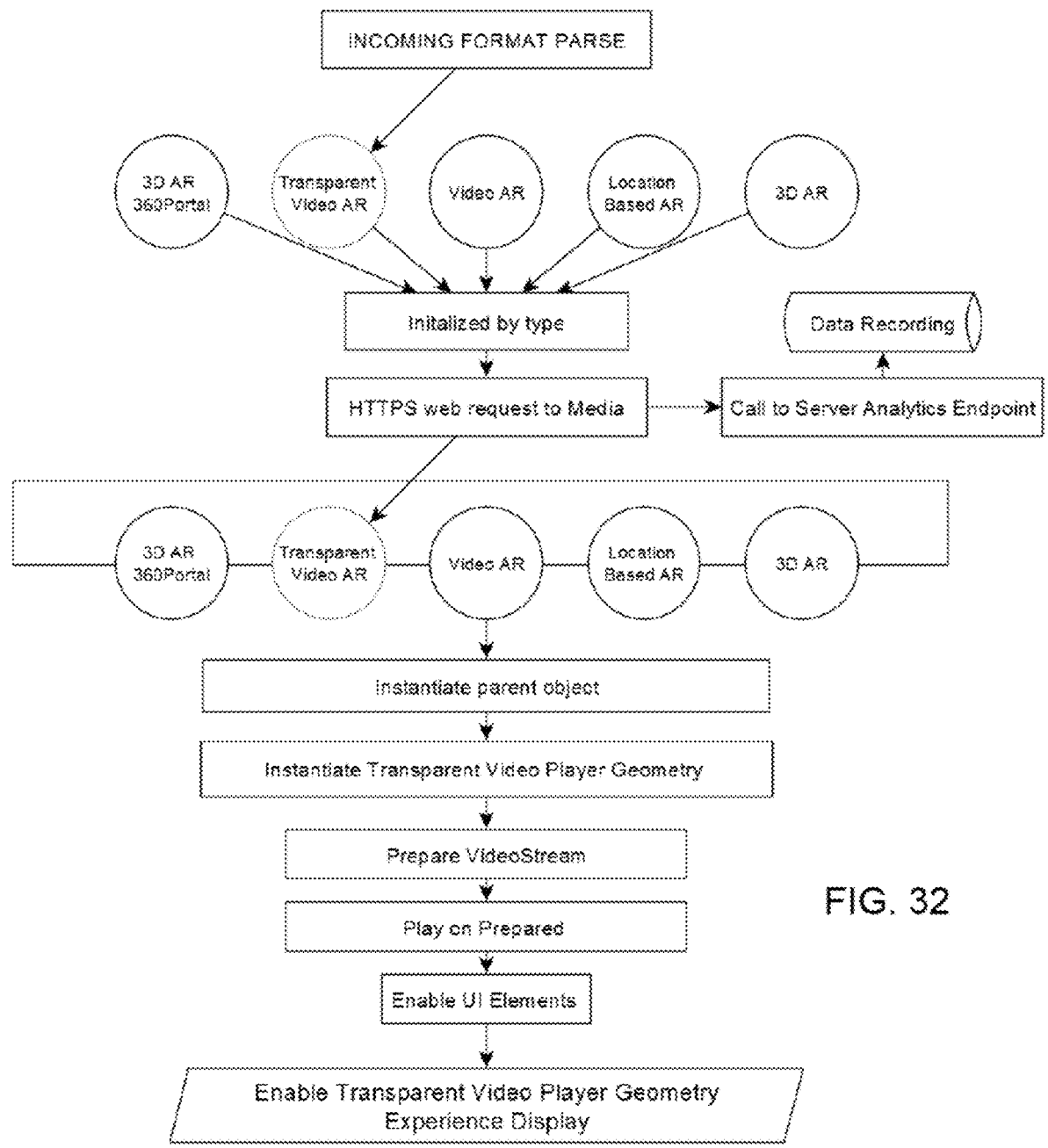
Figure 33:
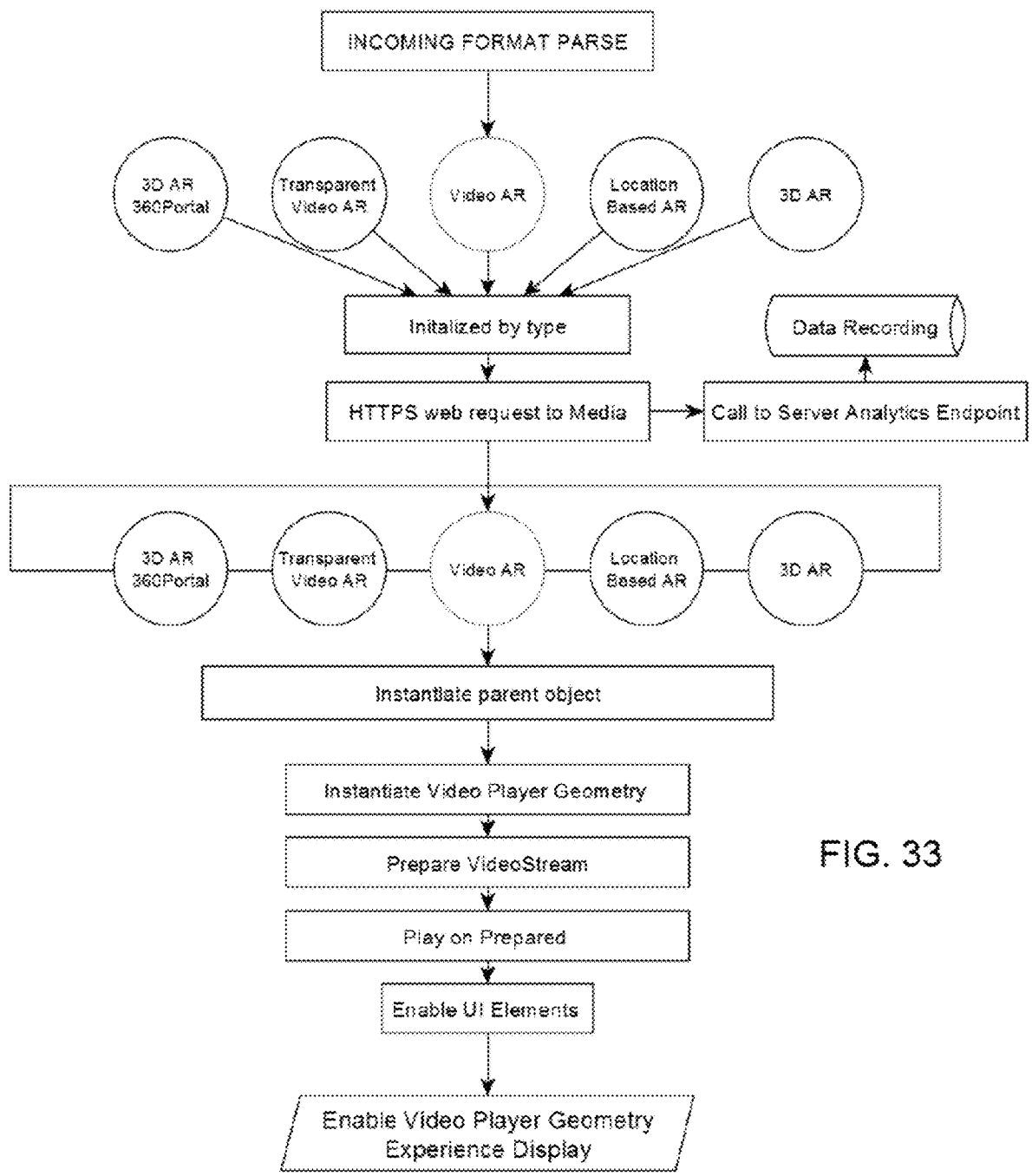
Figure 34:
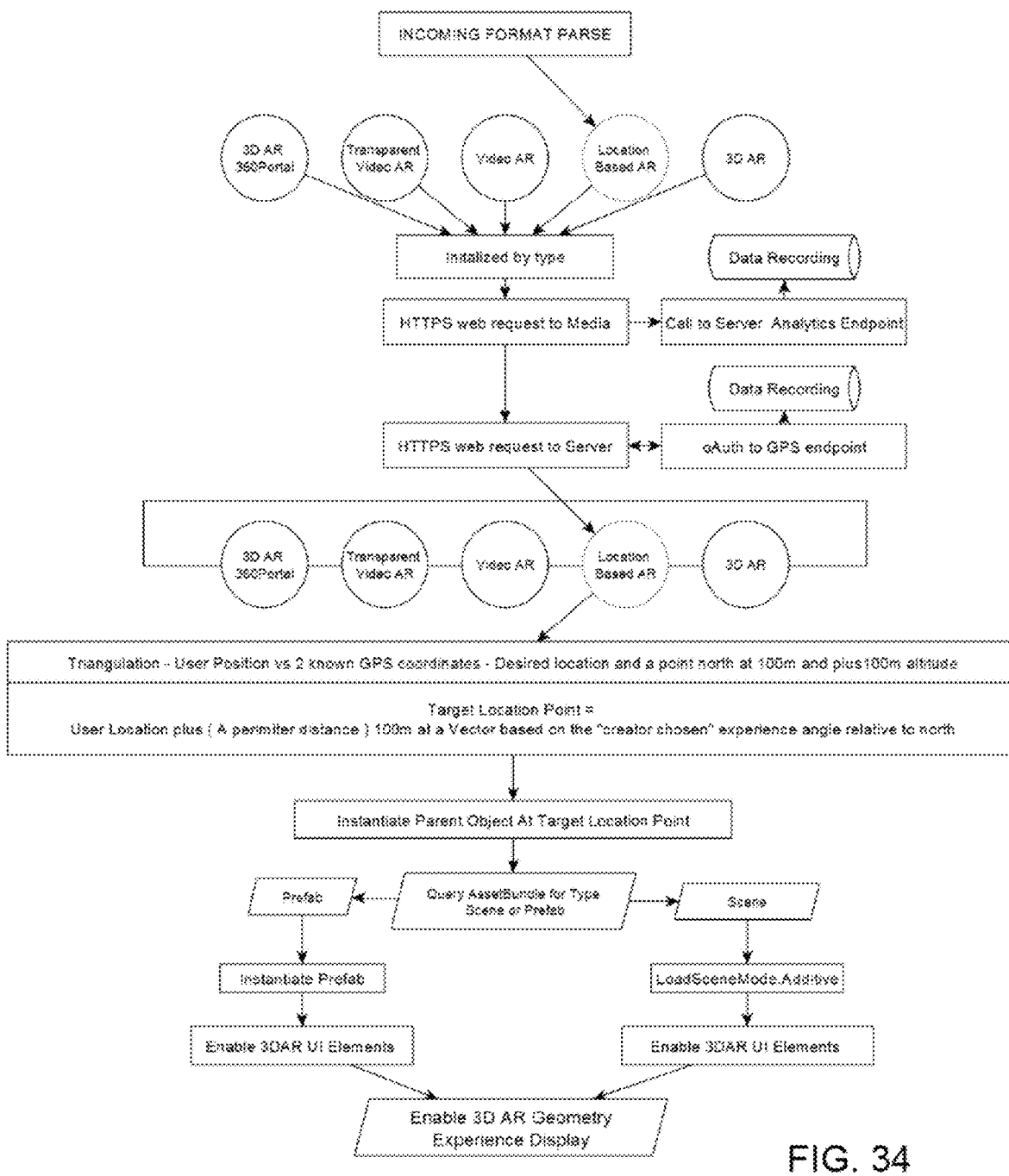
Figure 35:
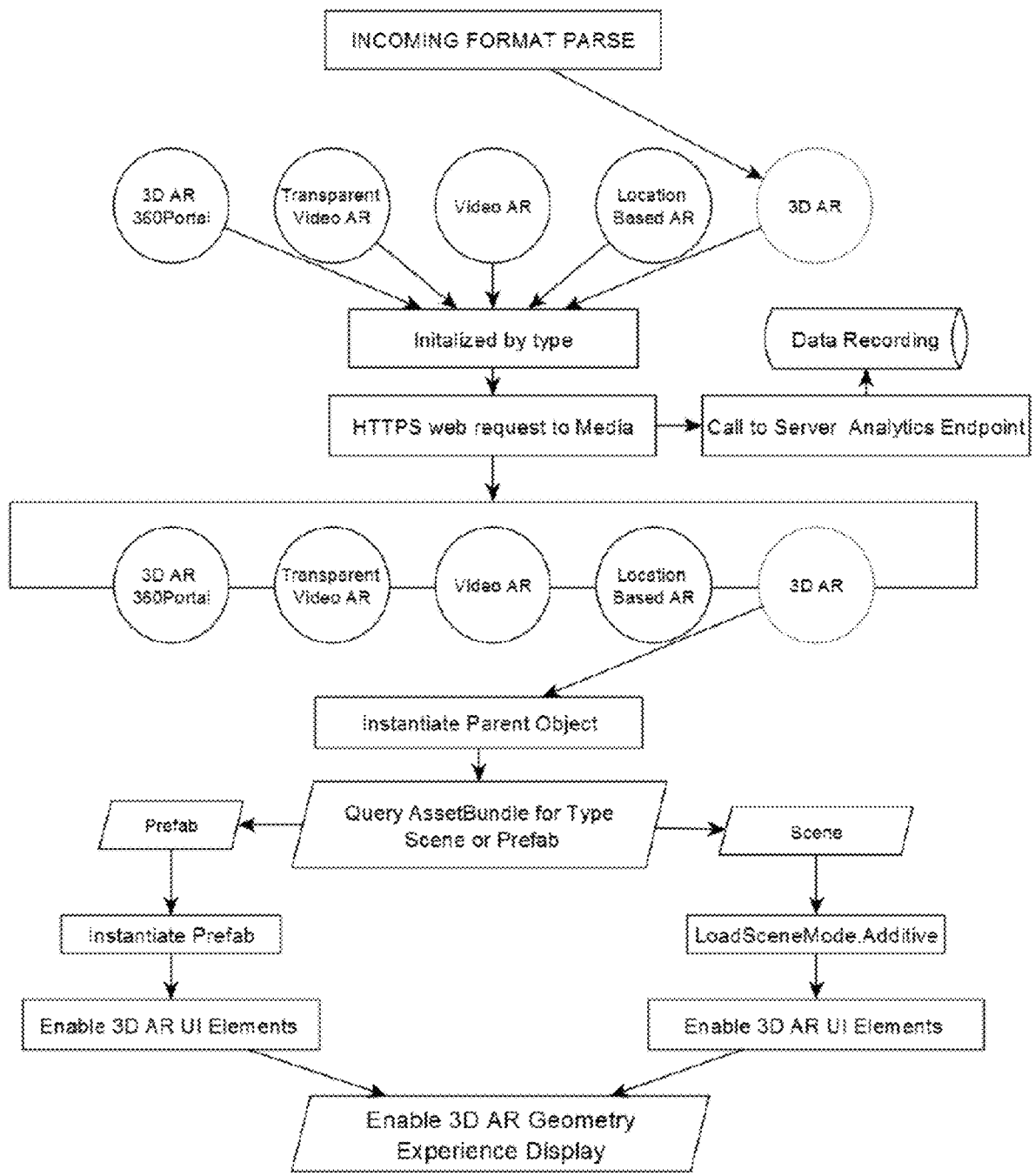

FIG. 31-35 show example details of parsing data flows according to some embodiments, which can be called, and for example, as part of the broader process flow shown in FIG. 30. For example, various steps shown in FIGS. 31-35 can be executed during the respective branches in FIG. 30 associated with AR content types (e.g., FIG. 31—3D AR 360 Portal; FIG. 32—transparent video AR; FIG. 33—video AR; FIG. 34—location based AR; and FIG. 35—3D AR, among other options). In other embodiments, each of the flows shown in FIGS. 31-35 can be executed separately, for example, by an AR application to render AR content.

Figure 36:
FIG. 36 is an example screen capture during 3D AR 360 portal content rendering, according to one embodiment.
Figure 37:
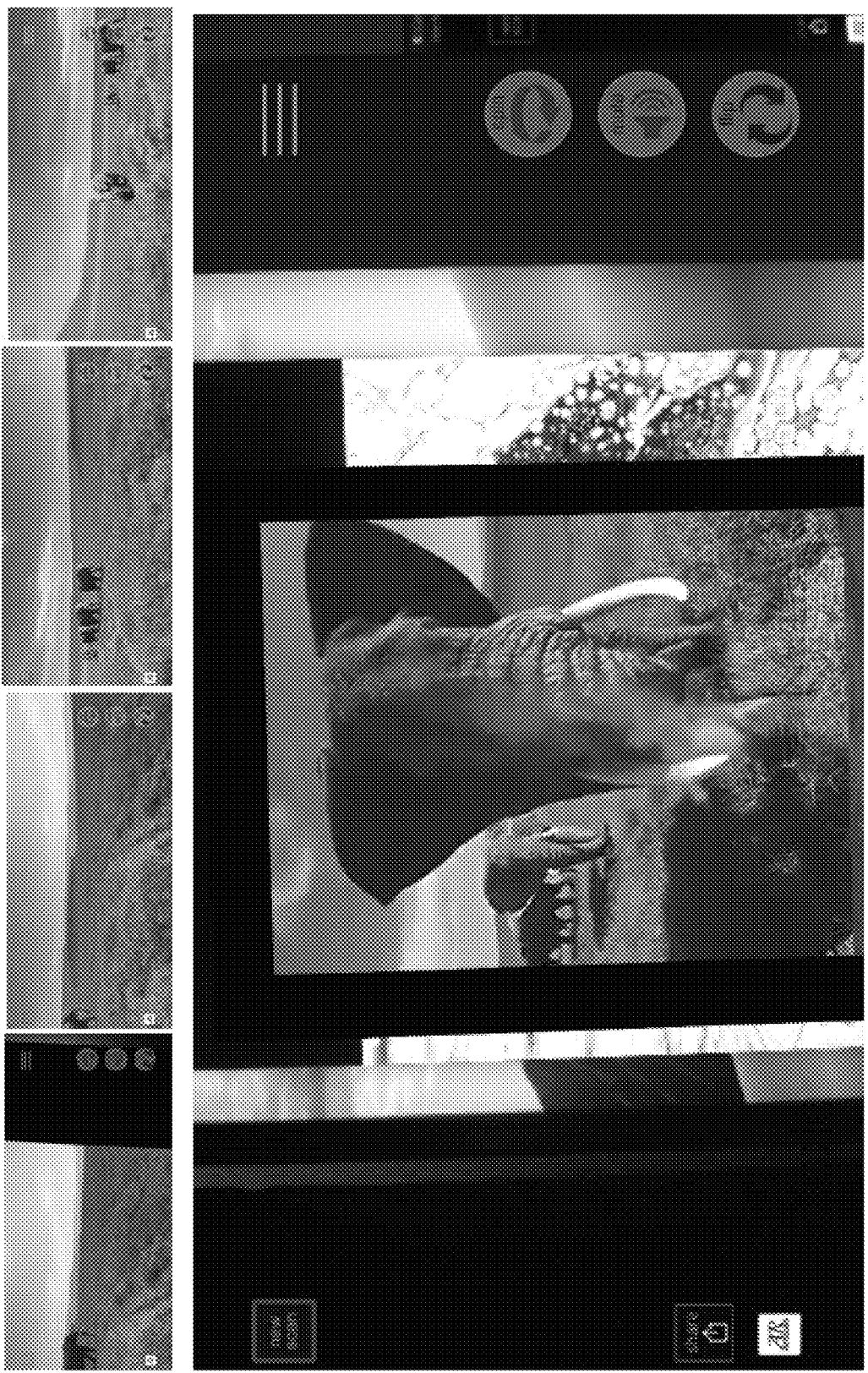
FIG. 37 is an example screen capture for entering and exiting the 360 visualization, according to one embodiment.
Figure 38:
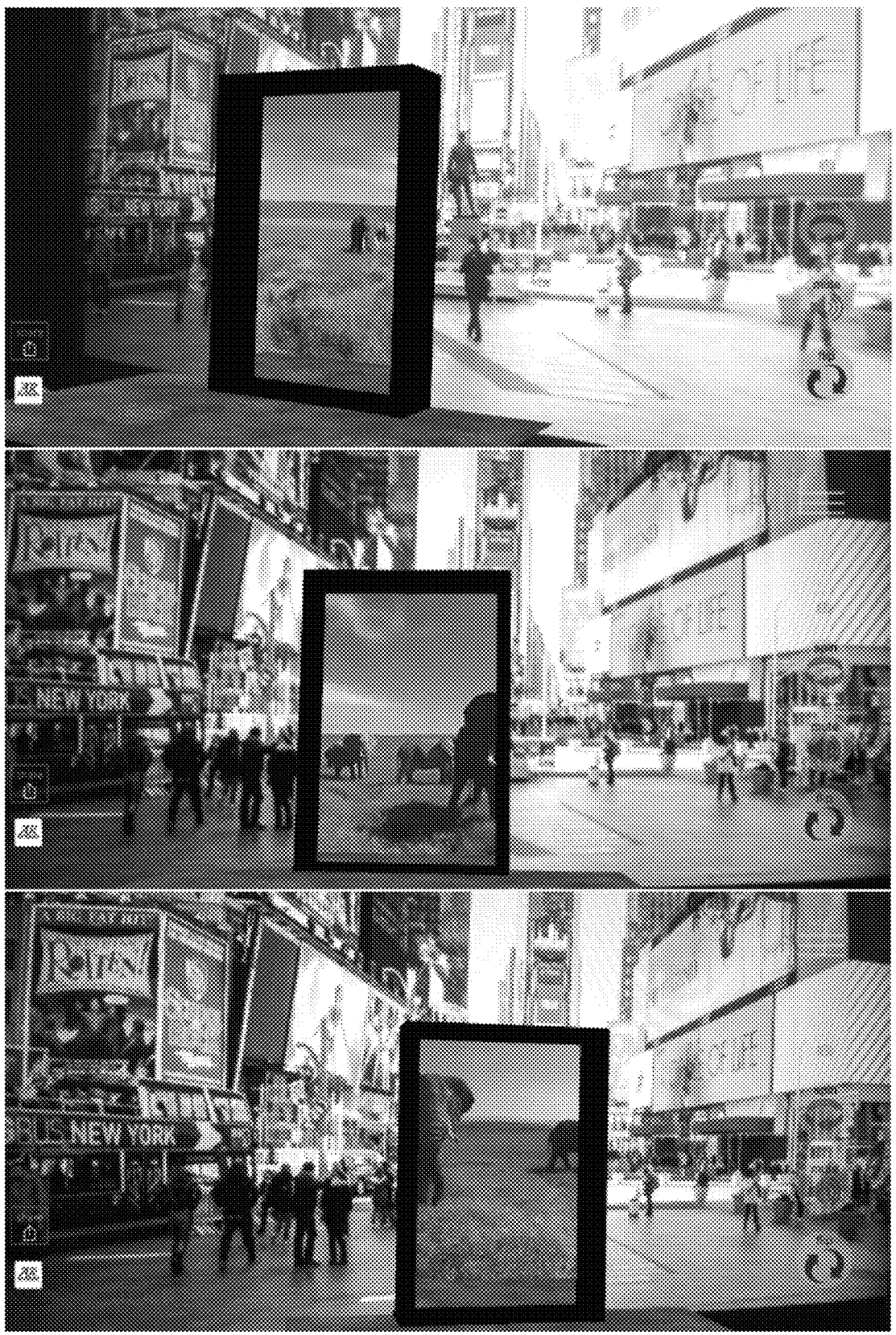
FIG. 38 is an example screen capture in Camera mode rendering 3D AR 360 portal content, according to one embodiment.
Figure 39:
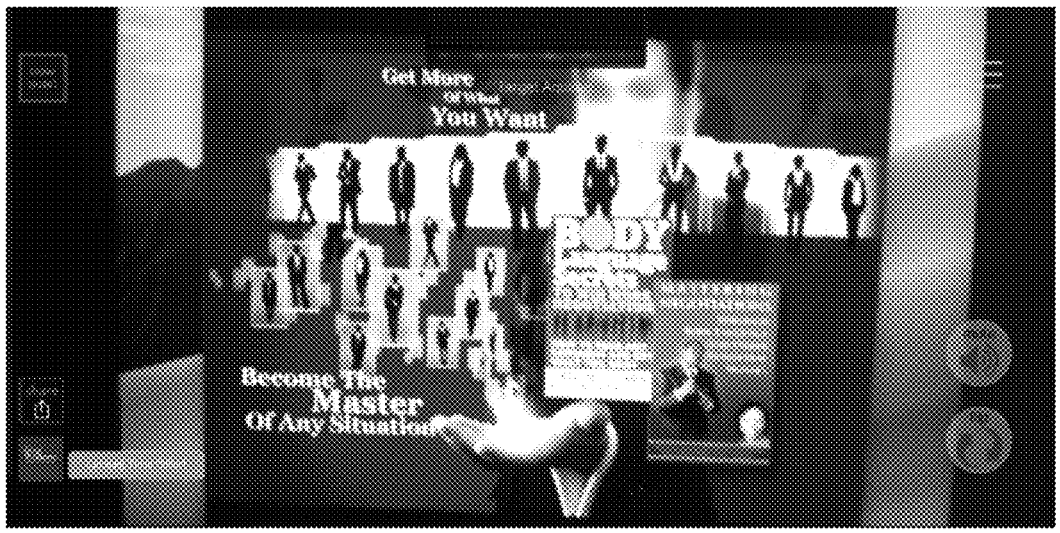
FIG. 39 is an example screen capture showing AR content rendered in a transparent Video AR-AR Cloud Scan mode, according to one embodiment.
Figure 39:
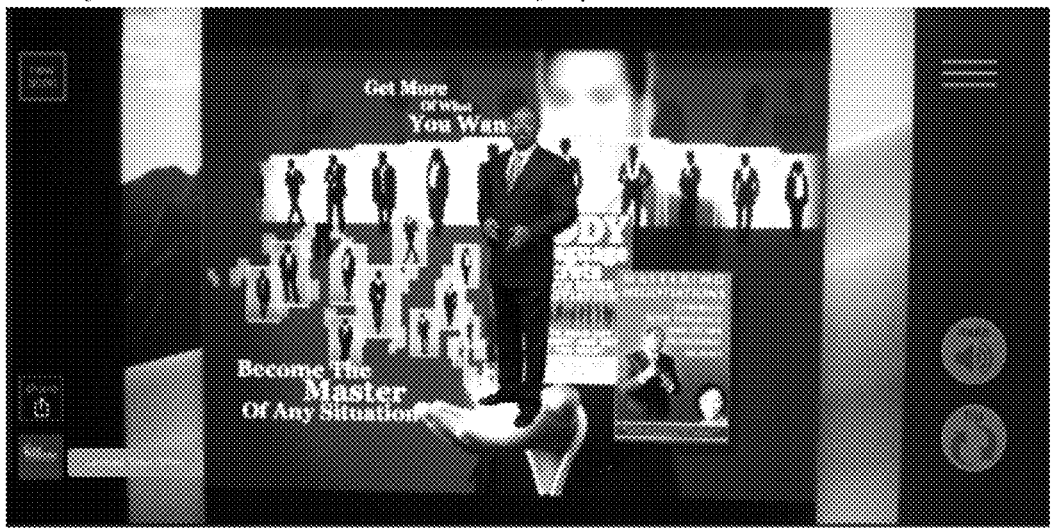
Figure 39:
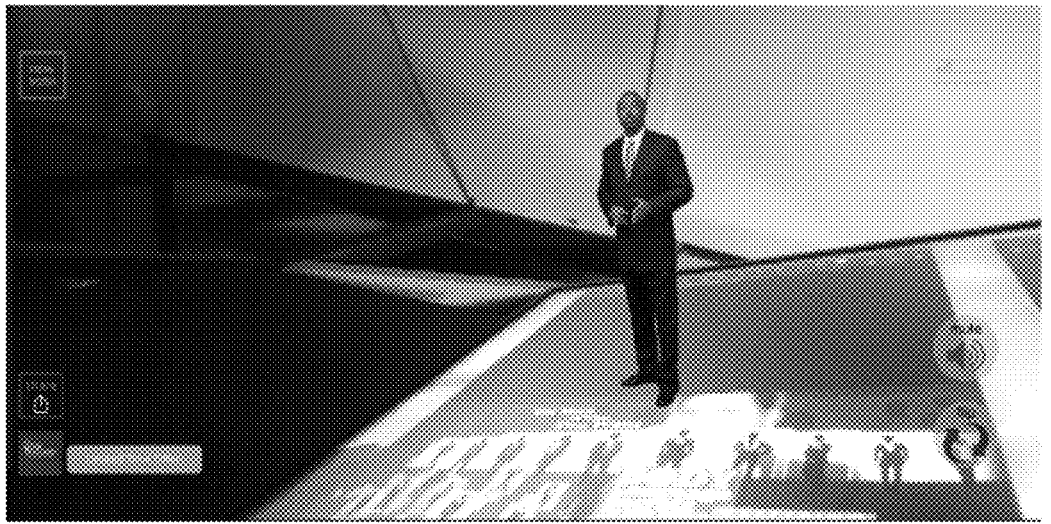
Figure 40:
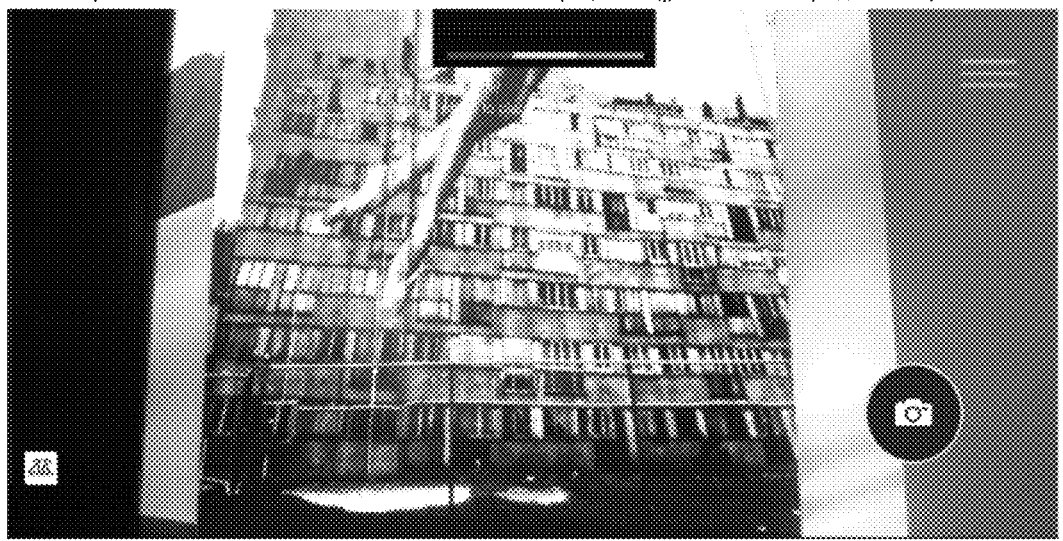
FIG. 40 is an example screen capture in camera mode, according to one embodiment.
Figure 40:
Figure 40:
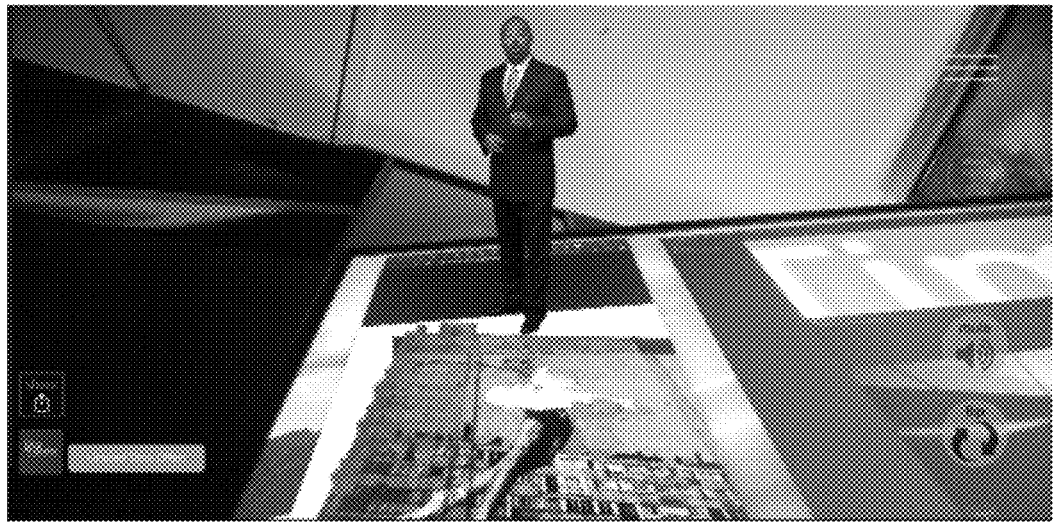
Figure 41:
FIGS. 41-44 are additional example screen captures for example modes, according to some embodiments.
Figure 41:
Figure 41:
Figure 42:
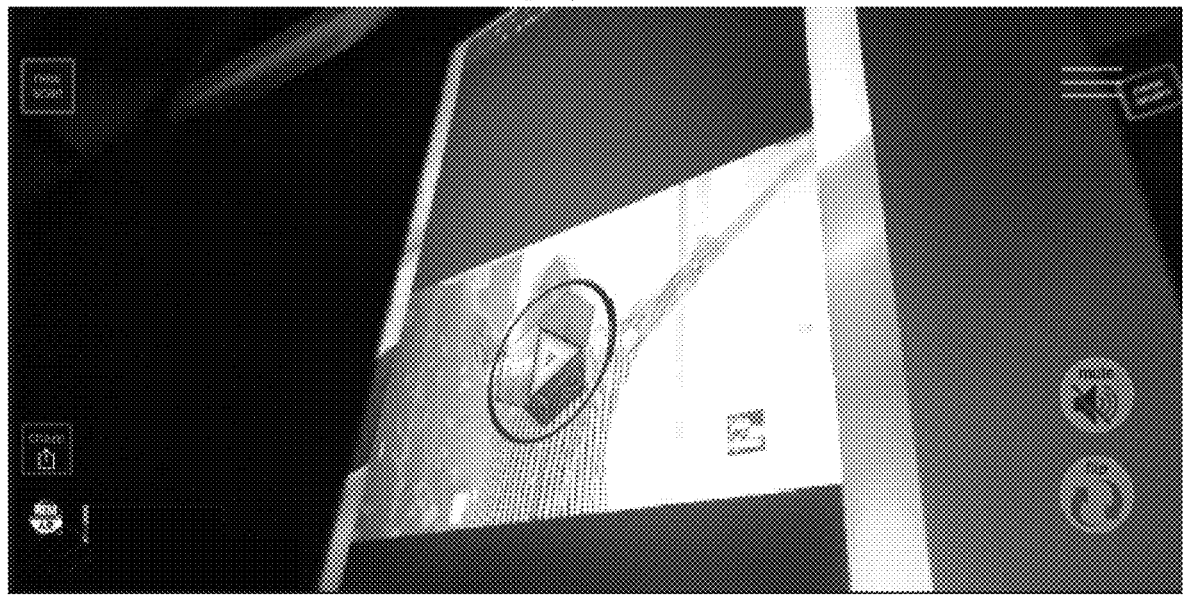
Figure 42:
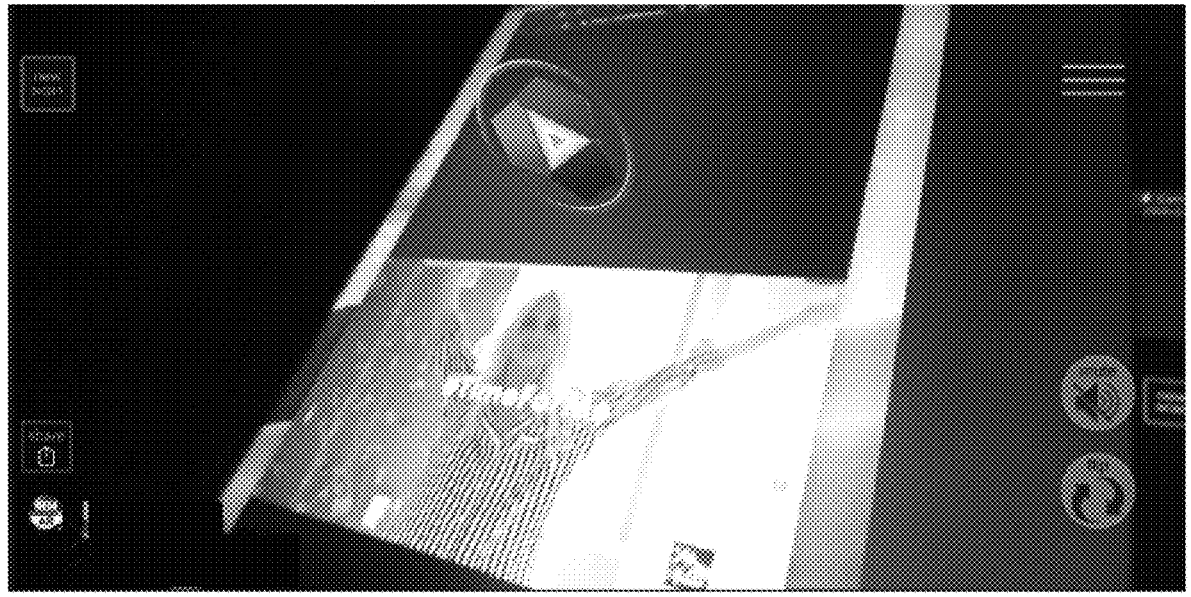
Figure 43:
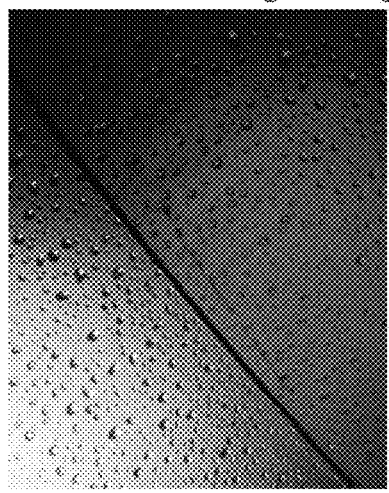
Figure 43:
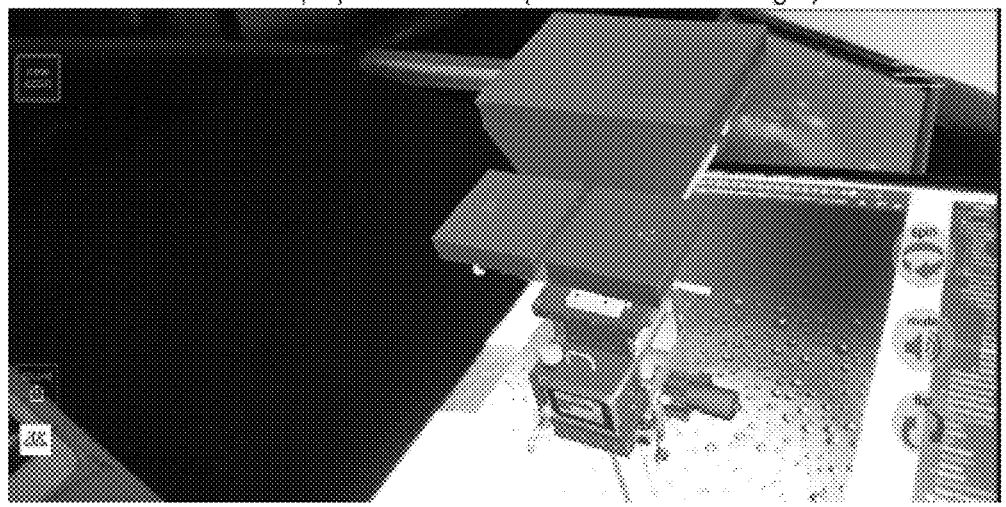
Figure 43:
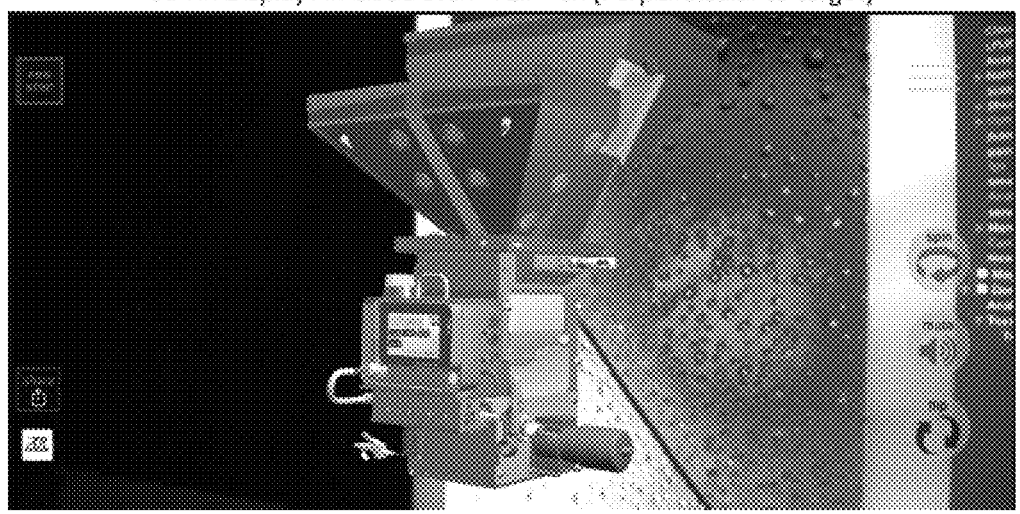
Figure 44:
Figure 44:
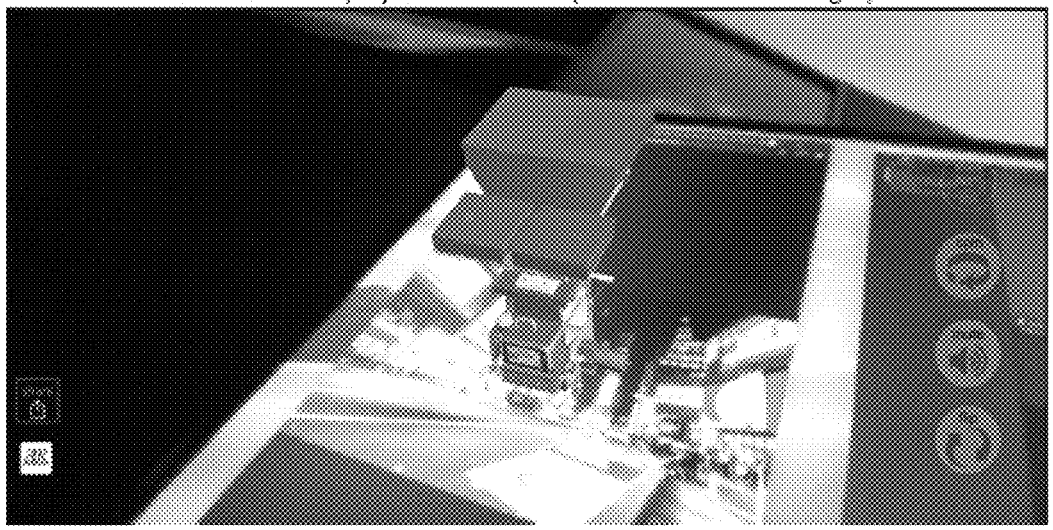
Figure 44:

FIG. 36 shows example screen captures during 3D AR 360 portal content render. FIG. 37 shows example screen captures for entering and exiting the 360 visualization. FIG. 38 shows example screen captures in Camera mode rendering 3D AR 360 portal content. FIG. 39 is an example screen capture showing AR content rendered in a transparent Video AR-AR Cloud Scan mode, and FIG. 40 shows screen captures in camera mode. Other screens and modes are shown in FIGS. 41-44 (e.g., FIGS. 41-42 Video AR; FIGS. 43-44 3D AR).

Figure 45:
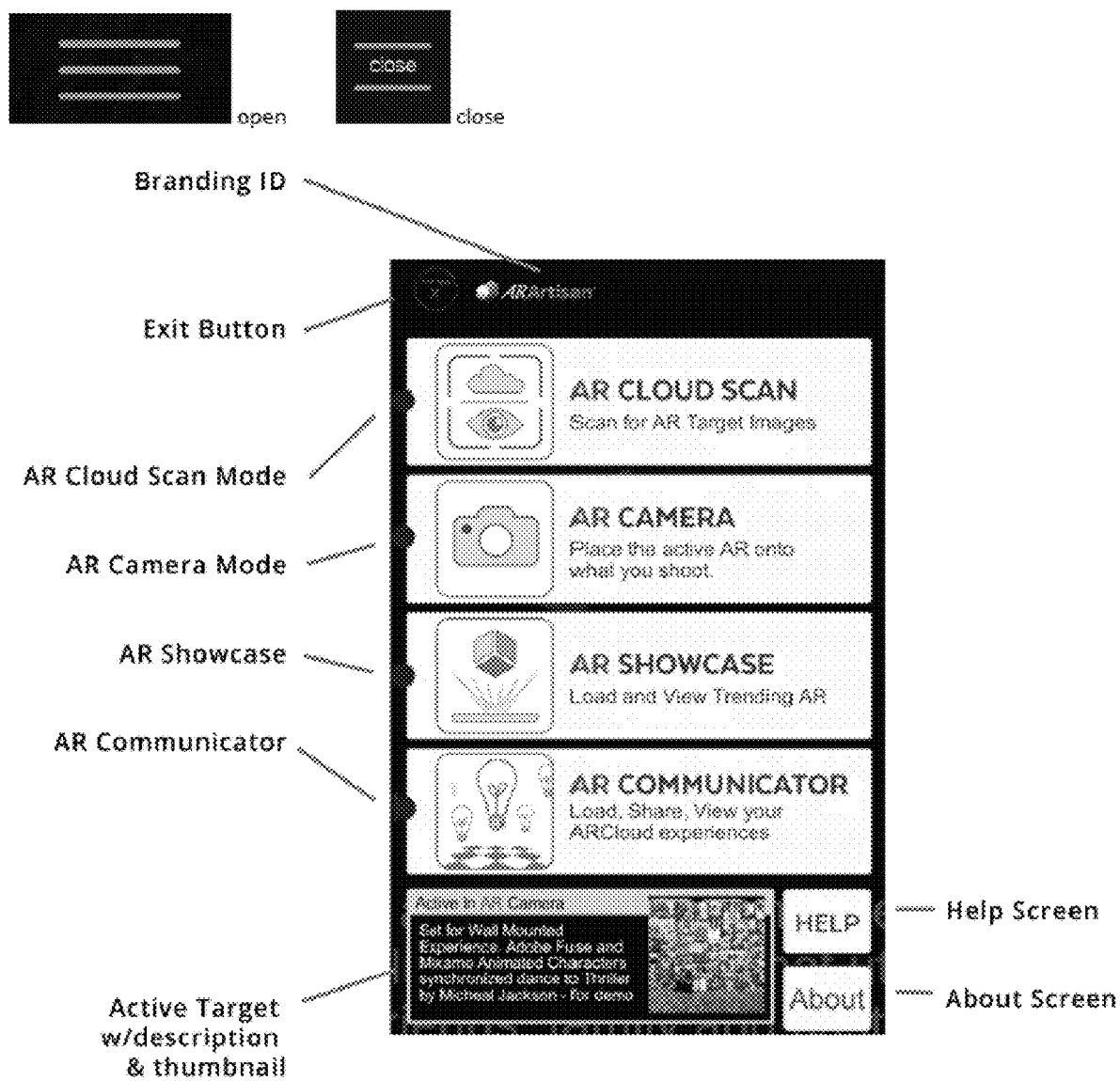
FIG. 45 illustrates user interface elements for an AR application, according to one embodiment.

FIG. 45 shows user interface elements for an AR application. Shown are navigation functions executable by the application responsive to selections in the user interface.

Figure 46:
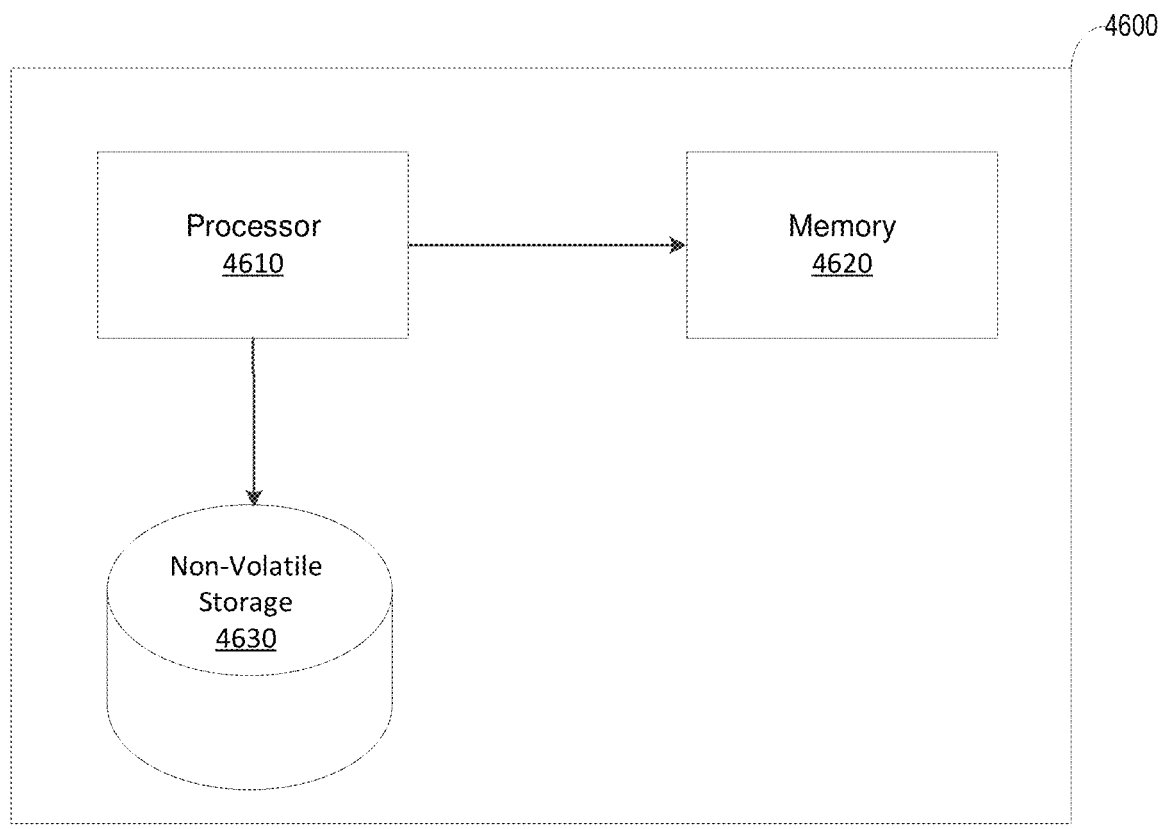
FIG. 46 is a block diagram of example computer system elements that can support the execution of an AR system via special purpose configuration and/or programming, according to one embodiment.

Modifications and variations of the discussed embodiments will be apparent to those of ordinary skill in the art and all such modifications and variations are included within the scope of the appended claims. Additionally, an illustrative implementation of a computer system 4600 that may be used in connection with any of the embodiments of the disclosure provided herein is shown in FIG. 46. The computer system 4600 may include one or more processors 4610 and one or more articles of manufacture that comprise non-transitory computer-readable storage media (e.g., memory 4620 and one or more non-volatile storage media 4630). The processor 4610 may control writing data to and reading data from the memory 4620 and the non-volatile storage device 4630 in any suitable manner. To perform any of the functionality described herein (e.g., image reconstruction, anomaly detection, etc.), the processor 4610 may execute one or more processor-executable instructions stored in one or more non-transitory computer-readable storage media (e.g., the memory 4620), which may serve as non-transitory computer-readable storage media storing processor-executable instructions for execution by the processor 4610.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described herein) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

The terms "approximately," "substantially," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

The invention claimed is:

1. An augmented reality generation and publication system, the AR system comprising:
at least one processor operatively connected to a memory;
a generation component, executed by the at least one processor, configured to present at least a minimal set of selectable options for creating an AR experience for at least a common set of AR functions, wherein a first option of the minimal set defines a content target, a second option of the minimal set specifies AR content and associated functions to associate with the content target, a third option of the minimal set defines access restrictions for the AR experience;
combine the minimal set of selectable options with pre-define programmatic skeletons, wherein the pre-defined programmatic skeletons are associated with respective ones of the common set of AR functions and respective programmatic skeletons are configured to define executable AR functions upon completion of the minimal set of selectable options;
wherein the generation component is further configured to generate from the programmatic skeletons and the minimal set of selectable options a universal format data file having a plurality of data structures for recording definitions for each selection of the minimal set of selectable options that are associated with pre-generated executable logic for each option and respective AR content;
an integration component, executed by the at least one processor, configured to define and manage mappings between the pre-generated executable logic for each option, the plurality of the data structures in the universal format data file, and transcoded AR content; and
wherein the generation component defines a system signature for the content target for subsequent matching to a device generated signature of the content target; and
wherein the system is configured to communicate the associated universal format data file responsive to a match between the system signature and the device signature of the content target to retrieve the AR content for rendering on the device.

2. The system of claim 1, further comprising a browser component configured to access AR experiences stored on the system.

3. The system of claim 2, wherein the browser component is configured to access analytic information to sort and display a subset of highly rated by access AR experiences.

4. The system of claim 1, wherein the generation component is configured to access defined AR content for direct rendering on a user device without image recognition.

5. The system of claim 4, wherein the generation component is configured to link a newly captured image on the device to the AR content being directly rendered; and store the newly captured image and AR content as a new AR experience.

6. The system of claim 1, further comprising an access control component configured to define a storage container for the user created AR experience; and define user access to the storage container.

7. The system of claim 6, wherein the access control component is further configured to control functions executable on the AR experiences within the storage container based on a user role.

8. The system of claim 1, further comprising a publication component configured to manage a status of the AR experience, wherein the status specifies a first access restriction for other users.

9. The system of claim 1, wherein the minimal set consists of the first option of the minimal set that defines the content target, the second option of the minimal set that specifies AR content and associated functions to associate with the content target, and the third option of the minimal set that defines access restrictions for the AR experience.

10. The system of claim 9, wherein the publication component is configured to select content containers and/or user groups for access to the AR experience.

11. A computer implemented method for augmented reality generation and publication, the method comprising:
operatively connected to a memory;
presenting, by at least one processor, at least a minimal set of selectable options for creating an AR experience for at least a common set of AR functions, wherein a first option of the minimal set defines a content target, a second option of the minimal set specifies AR content and associated functions to associate with the content target, and a third option of the minimal set defines access restrictions for the AR experience;
combining, by the at least one processor, the minimal set of selectable options with pre-define programmatic skeletons, wherein the pre-defined programmatic skeletons are associated with respective ones of the common set of AR functions and respective programmatic skeletons are configured to define executable AR functions upon completion of the minimal set of selectable options;
generating, by at least one processor, from the programmatic skeletons and the minimal set of selectable options a universal format data file having a plurality of data structures for recording definitions for each selection of the minimal set of selectable options that are associated with pre-generated executable logic for each option and respective AR content;
defining, by at least one processor, mappings between the pre-generated executable logic for each option, the plurality of the data structures in the universal format data file, and transcoded AR content;
defining, by at least one processor, a system signature for the content target for subsequent matching to a device generated signature of the content target; and
communicating, by at least one processor, the associated universal format data file responsive to a match between the system signature and the device signature of the content target to retrieve the AR content for rendering on a device.

12. The method of claim 11, further comprising accessing AR experiences stored on the system.

13. The method of claim 12, further comprising accessing analytic information to sort and display a subset of highly rated AR experiences.

14. The method of claim 11, further comprising accessing defined AR content for direct rendering on a user device without image recognition.

15. The method of claim 14, further comprising:
linking a newly captured image on the device to the AR content being directly rendered; and
storing the newly captured image and AR content as a new AR experience.

16. The method of claim 11, further comprising:
defining a storage container for the user created AR experience; and
defining user access to the storage container.

17. The method of claim 16, wherein the access control component is further configured to control functions executable on the AR experiences within the storage container based on a user role.

18. The method of claim 11, further comprising managing a status of the AR experience, wherein the status specifies a first access restriction for other users.

19. The method of claim 11, further comprising defining a public or private access to the AR experience.

20. The method of claim 19, further comprising selecting content containers and/or user groups for access to the AR experience.

* * * * *